(12) United States Patent
Muryanto et al.

(10) Patent No.: US 11,355,966 B2
(45) Date of Patent: Jun. 7, 2022

(54) CHARGING PAD WITH GUIDING CONTOURS TO ALIGN AN ELECTRONIC DEVICE ON THE CHARGING PAD AND EFFICIENTLY TRANSFER NEAR-FIELD RADIO-FREQUENCY ENERGY TO THE ELECTRONIC DEVICE

(71) Applicant: Energous Corporation, San Jose, CA (US)

(72) Inventors: Richard Muryanto, Union City, CA (US); Yunhong Liu, San Jose, CA (US); Gabriel Joseph Cohn, Mill Valley, CA (US)

(73) Assignee: ENERGOUS CORPORATION, San Jose, CA (US)

( * ) Notice: Subject to any disclaimer, the term of this patent is extended or adjusted under 35 U.S.C. 154(b) by 0 days.

(21) Appl. No.: 17/120,003

(22) Filed: Dec. 11, 2020

(65) Prior Publication Data

US 2021/0184509 A1 Jun. 17, 2021

Related U.S. Application Data

(60) Provisional application No. 62/947,947, filed on Dec. 13, 2019.

(51) Int. Cl.
*H02J 50/23* (2016.01)
*H04B 5/00* (2006.01)
*H02J 50/27* (2016.01)

(52) U.S. Cl.
CPC ............ *H02J 50/23* (2016.02); *H02J 50/27* (2016.02); *H04B 5/0037* (2013.01)

(58) Field of Classification Search
None
See application file for complete search history.

(56) References Cited

U.S. PATENT DOCUMENTS

| 787,412 A | 4/1905 | Tesla |
| 2,811,624 A | 10/1957 | Haagensen |

(Continued)

FOREIGN PATENT DOCUMENTS

| CN | 201278367 Y | 7/2009 |
| CN | 102227884 A | 10/2011 |

(Continued)

OTHER PUBLICATIONS

Energous Corp., IPRP, PCT/US2014/040697, Dec. 8, 2015, 9 pgs.

(Continued)

*Primary Examiner* — Jared Fureman
*Assistant Examiner* — Joel Barnett
(74) *Attorney, Agent, or Firm* — Morgan, Lewis & Bockius LLP

(57) ABSTRACT

An example system charges an electronic device using wirelessly transmitted radio-frequency power (RF) waves. The system includes the electronic device with one or more movable arms. At least one movable arm includes a receiving antenna element. The system further includes a charging pad that includes a housing. The housing includes at least one guiding contour on a surface that is configured for align a position of the electronic device on the surface of the housing. The charging pad further includes transmitting antenna elements that are selectively activated to transmit radio-frequency power waves to the receiving antenna element of the electronic device. The system also includes a transmitter controller integrated circuit (IC) configured to selectively activate a respective transmitting antenna element of the transmitting antenna elements. Activating the respective transmitting antenna element causes transmission of the radio-frequency power waves to the receiving antenna element of the electronic device.

51 Claims, 17 Drawing Sheets
(7 of 17 Drawing Sheet(s) Filed in Color)

(56) References Cited

U.S. PATENT DOCUMENTS

| | | |
|---|---|---|
| 2,863,148 A | 12/1958 | Gammon et al. |
| 3,167,775 A | 1/1965 | Guertler |
| 3,434,678 A | 3/1969 | Brown et al. |
| 3,696,384 A | 10/1972 | Lester |
| 3,754,269 A | 8/1973 | Clavin |
| 4,101,895 A | 7/1978 | Jones, Jr. |
| 4,360,741 A | 11/1982 | Fitzsimmons et al. |
| 4,944,036 A | 7/1990 | Hyatt |
| 4,995,010 A | 2/1991 | Knight |
| 5,142,292 A | 8/1992 | Chang |
| 5,200,759 A | 4/1993 | McGinnis |
| 5,211,471 A | 5/1993 | Rohrs |
| 5,276,455 A | 1/1994 | Fitzsimmons et al. |
| 5,548,292 A | 8/1996 | Hirshfield et al. |
| 5,556,749 A | 9/1996 | Mitsuhashi et al. |
| 5,568,088 A | 10/1996 | Dent et al. |
| 5,631,572 A | 5/1997 | Sheen et al. |
| 5,646,633 A | 7/1997 | Dahlberg |
| 5,697,063 A | 12/1997 | Kishigami et al. |
| 5,712,642 A | 1/1998 | Hulderman |
| 5,936,527 A | 8/1999 | Isaacman et al. |
| 5,982,139 A | 11/1999 | Parise |
| 6,046,708 A | 4/2000 | MacDonald, Jr. et al. |
| 6,061,025 A | 5/2000 | Jackson et al. |
| 6,127,799 A | 10/2000 | Krishnan |
| 6,127,942 A | 10/2000 | Welle |
| 6,163,296 A | 12/2000 | Lier et al. |
| 6,176,433 B1 | 1/2001 | Uesaka et al. |
| 6,271,799 B1 | 8/2001 | Rief |
| 6,289,237 B1 | 9/2001 | Mickle et al. |
| 6,329,908 B1 | 12/2001 | Frecska |
| 6,400,586 B2 | 6/2002 | Raddi et al. |
| 6,421,235 B2 | 7/2002 | Ditzik |
| 6,437,685 B2 | 8/2002 | Hanaki |
| 6,456,253 B1 | 9/2002 | Rummeli et al. |
| 6,476,795 B1 | 11/2002 | Derocher et al. |
| 6,501,414 B2 | 12/2002 | Amdt et al. |
| 6,583,723 B2 | 6/2003 | Watanabe et al. |
| 6,597,897 B2 | 7/2003 | Tang |
| 6,615,074 B2 | 9/2003 | Mickle et al. |
| 6,650,376 B1 | 11/2003 | Obitsu |
| 6,664,920 B1 | 12/2003 | Mott et al. |
| 6,680,700 B2 | 1/2004 | Hilgers |
| 6,798,716 B1 | 9/2004 | Charych |
| 6,803,744 B1 | 10/2004 | Sabo |
| 6,853,197 B1 | 2/2005 | McFarland |
| 6,856,291 B2 | 2/2005 | Mickle et al. |
| 6,911,945 B2 | 6/2005 | Korva |
| 6,960,968 B2 | 11/2005 | Odendaal et al. |
| 6,967,462 B1 | 11/2005 | Landis |
| 6,988,026 B2 | 1/2006 | Breed et al. |
| 7,003,350 B2 | 2/2006 | Denker et al. |
| 7,012,572 B1 | 3/2006 | Schaffner et al. |
| 7,027,311 B2 | 4/2006 | Vanderelli et al. |
| 7,068,234 B2 | 6/2006 | Sievenpiper |
| 7,068,991 B2 | 6/2006 | Parise |
| 7,079,079 B2 | 7/2006 | Jo et al. |
| 7,183,748 B1 | 2/2007 | Unno et al. |
| 7,191,013 B1 | 3/2007 | Miranda et al. |
| 7,193,644 B2 | 3/2007 | Carter |
| 7,196,663 B2 | 3/2007 | Bolzer et al. |
| 7,205,749 B2 | 4/2007 | Hagen et al. |
| 7,215,296 B2 | 5/2007 | Abramov et al. |
| 7,222,356 B1 | 5/2007 | Yonezawa et al. |
| 7,274,334 B2 | 9/2007 | O'Riordan et al. |
| 7,274,336 B2 | 9/2007 | Carson |
| 7,351,975 B2 | 4/2008 | Brady et al. |
| 7,359,730 B2 | 4/2008 | Dennis et al. |
| 7,372,408 B2 | 5/2008 | Gaucher |
| 7,392,068 B2 | 6/2008 | Dayan |
| 7,403,803 B2 | 7/2008 | Mickle et al. |
| 7,443,057 B2 | 10/2008 | Nunally |
| 7,451,839 B2 | 11/2008 | Perlman |
| 7,463,201 B2 | 12/2008 | Chiang et al. |
| 7,471,247 B2 | 12/2008 | Saily |
| 7,535,195 B1 | 5/2009 | Horovitz et al. |
| 7,614,556 B2 | 11/2009 | Overhultz et al. |
| 7,639,994 B2 | 12/2009 | Greene et al. |
| 7,643,312 B2 | 1/2010 | Vanderelli et al. |
| 7,652,577 B1 | 1/2010 | Madhow et al. |
| 7,679,576 B2 | 3/2010 | Riedel et al. |
| 7,702,771 B2 | 4/2010 | Ewing et al. |
| 7,786,419 B2 | 8/2010 | Hyde et al. |
| 7,812,771 B2 | 10/2010 | Greene et al. |
| 7,830,312 B2 | 11/2010 | Choudhury et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,904,117 B2 | 3/2011 | Doan et al. |
| 7,911,386 B1 | 3/2011 | Ito et al. |
| 7,925,308 B2 | 4/2011 | Greene et al. |
| 7,948,208 B2 | 5/2011 | Partovi et al. |
| 8,049,676 B2 | 11/2011 | Yoon et al. |
| 8,055,003 B2 | 11/2011 | Mittleman et al. |
| 8,070,595 B2 | 12/2011 | Alderucci et al. |
| 8,072,380 B2 | 12/2011 | Crouch |
| 8,092,301 B2 | 1/2012 | Alderucci et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,184,454 B2 | 5/2012 | Mao |
| 8,228,194 B2 | 7/2012 | Mickle |
| 8,234,509 B2 | 7/2012 | Gioscia et al. |
| 8,264,101 B2 | 9/2012 | Hyde et al. |
| 8,264,291 B2 | 9/2012 | Morita |
| 8,276,325 B2 | 10/2012 | Clifton et al. |
| 8,278,784 B2 | 10/2012 | Cook et al. |
| 8,284,101 B2 | 10/2012 | Fusco |
| 8,310,201 B1 | 11/2012 | Wright |
| 8,338,991 B2 | 12/2012 | Von Novak et al. |
| 8,362,745 B2 | 1/2013 | Tinaphong |
| 8,380,255 B2 | 2/2013 | Shearer et al. |
| 8,384,600 B2 | 2/2013 | Huang et al. |
| 8,410,953 B2 | 4/2013 | Zeine |
| 8,411,963 B2 | 4/2013 | Luff |
| 8,432,062 B2 | 4/2013 | Greene et al. |
| 8,432,071 B2 | 4/2013 | Huang et al. |
| 8,446,248 B2 | 5/2013 | Zeine |
| 8,447,234 B2 | 5/2013 | Cook et al. |
| 8,451,189 B1 | 5/2013 | Fluhler |
| 8,452,235 B2 | 5/2013 | Kirby et al. |
| 8,457,656 B2 | 6/2013 | Perkins et al. |
| 8,461,817 B2 | 6/2013 | Martin et al. |
| 8,467,733 B2 | 6/2013 | Leabman |
| 8,497,601 B2 | 7/2013 | Hall et al. |
| 8,497,658 B2 | 7/2013 | Von Novak et al. |
| 8,552,597 B2 | 8/2013 | Song et al. |
| 8,558,661 B2 | 10/2013 | Zeine |
| 8,560,026 B2 | 10/2013 | Chanterac |
| 8,564,485 B2 | 10/2013 | Milosavljevic et al. |
| 8,604,746 B2 | 12/2013 | Lee |
| 8,614,643 B2 | 12/2013 | Leabman |
| 8,621,245 B2 | 12/2013 | Shearer et al. |
| 8,626,249 B2 | 1/2014 | Kuusilinna et al. |
| 8,629,576 B2 | 1/2014 | Levine |
| 8,653,966 B2 | 2/2014 | Rao et al. |
| 8,655,272 B2 | 2/2014 | Saunamaki |
| 8,674,551 B2 | 3/2014 | Low et al. |
| 8,686,685 B2 | 4/2014 | Moshfeghi |
| 8,686,905 B2 | 4/2014 | Shtrom |
| 8,712,355 B2 | 4/2014 | Black et al. |
| 8,712,485 B2 | 4/2014 | Tam |
| 8,718,773 B2 | 5/2014 | Wills et al. |
| 8,729,737 B2 | 5/2014 | Schatz et al. |
| 8,736,228 B1 | 5/2014 | Freed et al. |
| 8,760,113 B2 | 6/2014 | Keating |
| 8,770,482 B2 | 7/2014 | Ackermann et al. |
| 8,772,960 B2 | 7/2014 | Yoshida |
| 8,823,319 B2 | 9/2014 | Von Novak, III et al. |
| 8,832,646 B1 | 9/2014 | Wendling |
| 8,854,176 B2 | 10/2014 | Zeine |
| 8,860,364 B2 | 10/2014 | Low et al. |

(56) References Cited

U.S. PATENT DOCUMENTS

| | | |
|---|---|---|
| 8,897,770 B1 | 11/2014 | Frolov et al. |
| 8,903,456 B2 | 12/2014 | Chu et al. |
| 8,917,057 B2 | 12/2014 | Hui |
| 8,923,189 B2 | 12/2014 | Leabman |
| 8,928,544 B2 | 1/2015 | Massie et al. |
| 8,937,408 B2 | 1/2015 | Ganem et al. |
| 8,946,940 B2 | 2/2015 | Kim et al. |
| 8,963,486 B2 | 2/2015 | Kirby et al. |
| 8,970,070 B2 | 3/2015 | Sada et al. |
| 8,989,053 B1 | 3/2015 | Skaaksrud et al. |
| 9,000,616 B2 | 4/2015 | Greene et al. |
| 9,001,622 B2 | 4/2015 | Perry |
| 9,006,934 B2 | 4/2015 | Kozakai et al. |
| 9,021,277 B2 | 4/2015 | Shearer et al. |
| 9,030,161 B2 | 5/2015 | Lu et al. |
| 9,059,598 B2 | 6/2015 | Kang et al. |
| 9,059,599 B2 | 6/2015 | Won et al. |
| 9,077,188 B2 | 7/2015 | Moshfeghi |
| 9,083,595 B2 | 7/2015 | Rakib et al. |
| 9,088,216 B2 | 7/2015 | Garrity et al. |
| 9,124,125 B2 | 9/2015 | Leabman et al. |
| 9,130,397 B2 | 9/2015 | Leabman et al. |
| 9,130,602 B2 | 9/2015 | Cook |
| 9,142,998 B2 | 9/2015 | Yu et al. |
| 9,143,000 B2 | 9/2015 | Leabman et al. |
| 9,143,010 B2 | 9/2015 | Urano |
| 9,153,074 B2 | 10/2015 | Zhou et al. |
| 9,178,389 B2 | 11/2015 | Hwang |
| 9,225,196 B2 | 12/2015 | Huang et al. |
| 9,240,469 B2 | 1/2016 | Sun et al. |
| 9,242,411 B2 | 1/2016 | Kritchman et al. |
| 9,244,500 B2 | 1/2016 | Cain et al. |
| 9,252,628 B2 | 2/2016 | Leabman et al. |
| 9,270,344 B2 | 2/2016 | Rosenberg |
| 9,276,329 B2 | 3/2016 | Jones et al. |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,401,977 B1 | 7/2016 | Gaw |
| 9,409,490 B2 | 8/2016 | Kawashima |
| 9,419,335 B2 | 8/2016 | Pintos |
| 9,419,443 B2 | 8/2016 | Leabman |
| 9,438,045 B1 | 9/2016 | Leabman |
| 9,438,046 B1 | 9/2016 | Leabman |
| 9,444,283 B2 | 9/2016 | Son et al. |
| 9,450,449 B1 | 9/2016 | Leabman et al. |
| 9,461,502 B2 | 10/2016 | Lee et al. |
| 9,520,725 B2 | 12/2016 | Masaoka et al. |
| 9,520,748 B2 | 12/2016 | Hyde et al. |
| 9,522,270 B2 | 12/2016 | Perryman et al. |
| 9,532,748 B2 | 1/2017 | Denison et al. |
| 9,537,354 B2 | 1/2017 | Bell et al. |
| 9,537,357 B2 | 1/2017 | Leabman |
| 9,537,358 B2 | 1/2017 | Leabman |
| 9,538,382 B2 | 1/2017 | Bell et al. |
| 9,544,640 B2 | 1/2017 | Lau |
| 9,559,553 B2 | 1/2017 | Bae |
| 9,564,773 B2 | 2/2017 | Pogorelik et al. |
| 9,571,974 B2 | 2/2017 | Choi et al. |
| 9,590,317 B2 | 3/2017 | Zimmerman et al. |
| 9,590,444 B2 | 3/2017 | Walley |
| 9,620,996 B2 | 4/2017 | Zeine |
| 9,647,328 B2 | 5/2017 | Dobric |
| 9,706,137 B2 | 7/2017 | Scanlon et al. |
| 9,711,999 B2 | 7/2017 | Hietala et al. |
| 9,723,635 B2 | 8/2017 | Nambord et al. |
| 9,793,758 B2 | 10/2017 | Leabman |
| 9,793,764 B2 | 10/2017 | Perry |
| 9,800,080 B2 | 10/2017 | Leabman et al. |
| 9,800,172 B1 | 10/2017 | Leabman |
| 9,806,564 B2 | 10/2017 | Leabman |
| 9,819,230 B2 | 11/2017 | Petras et al. |
| 9,824,815 B2 | 11/2017 | Leabman et al. |
| 9,825,674 B1 | 11/2017 | Leabman |
| 9,831,718 B2 | 11/2017 | Leabman et al. |
| 9,838,083 B2 | 12/2017 | Bell et al. |
| 9,843,213 B2 | 12/2017 | Leabman et al. |
| 9,843,229 B2 | 12/2017 | Leabman |
| 9,843,763 B2 | 12/2017 | Leabman et al. |
| 9,847,669 B2 | 12/2017 | Leabman |
| 9,847,677 B1 | 12/2017 | Leabman |
| 9,847,679 B2 | 12/2017 | Bell et al. |
| 9,853,361 B2 | 12/2017 | Chen et al. |
| 9,853,692 B1 | 12/2017 | Bell et al. |
| 9,859,756 B2 | 1/2018 | Leabman et al. |
| 9,859,758 B1 | 1/2018 | Leabman |
| 9,866,279 B2 | 1/2018 | Bell et al. |
| 9,867,032 B2 | 1/2018 | Verma et al. |
| 9,871,301 B2 | 1/2018 | Contopanagos |
| 9,876,380 B1 | 1/2018 | Leabman et al. |
| 9,876,394 B1 | 1/2018 | Leabman |
| 9,876,536 B1 | 1/2018 | Bell et al. |
| 9,876,648 B2 | 1/2018 | Bell |
| 9,882,394 B1 | 1/2018 | Bell et al. |
| 9,882,427 B2 | 1/2018 | Leabman et al. |
| 9,887,584 B1 | 2/2018 | Bell et al. |
| 9,887,739 B2 | 2/2018 | Leabman et al. |
| 9,891,669 B2 | 2/2018 | Bell |
| 9,893,554 B2 | 2/2018 | Bell et al. |
| 9,893,555 B1 | 2/2018 | Leabman et al. |
| 9,893,564 B2 | 2/2018 | de Rochemont |
| 9,899,744 B1 | 2/2018 | Contopanagos et al. |
| 9,899,844 B1 | 2/2018 | Bell et al. |
| 9,899,861 B1 | 2/2018 | Leabman et al. |
| 9,899,873 B2 | 2/2018 | Bell et al. |
| 9,912,199 B2 | 3/2018 | Leabman et al. |
| 9,916,485 B1 | 3/2018 | Lilly et al. |
| 9,917,477 B1 | 3/2018 | Bell et al. |
| 9,923,386 B1 | 3/2018 | Leabman et al. |
| 9,939,864 B1 | 4/2018 | Bell et al. |
| 9,941,747 B2 | 4/2018 | Bell et al. |
| 9,965,009 B1 | 5/2018 | Bell et al. |
| 9,966,765 B1 | 5/2018 | Leabman |
| 9,966,784 B2 | 5/2018 | Leabman |
| 9,967,743 B1 | 5/2018 | Bell et al. |
| 9,973,008 B1 | 5/2018 | Leabman |
| 10,003,211 B1 | 6/2018 | Leabman et al. |
| 10,008,777 B1 | 6/2018 | Broyde et al. |
| 10,008,889 B2 | 6/2018 | Bell et al. |
| 10,014,728 B1 | 7/2018 | Leabman |
| 10,027,159 B2 | 7/2018 | Hosseini |
| 10,038,337 B1 | 7/2018 | Leabman et al. |
| 10,050,462 B1 | 8/2018 | Leabman et al. |
| 10,056,782 B1 | 8/2018 | Leabman |
| 10,063,064 B1 | 8/2018 | Bell et al. |
| 10,063,105 B2 | 8/2018 | Leabman |
| 10,063,106 B2 | 8/2018 | Bell et al. |
| 10,068,703 B1 | 9/2018 | Contopanagos |
| 10,075,008 B1 | 9/2018 | Bell et al. |
| 10,079,515 B2 | 9/2018 | Hosseini et al. |
| 10,090,699 B1 | 10/2018 | Leabman |
| 10,090,714 B2 | 10/2018 | Bohn et al. |
| 10,090,886 B1 | 10/2018 | Bell et al. |
| 10,103,552 B1 | 10/2018 | Leabman et al. |
| 10,103,582 B2 | 10/2018 | Leabman et al. |
| 10,110,046 B1 | 10/2018 | Esquibel et al. |
| 10,122,219 B1 | 11/2018 | Hosseini et al. |
| 10,122,415 B2 | 11/2018 | Bell et al. |
| 10,124,754 B1 | 11/2018 | Leabman |
| 10,128,686 B1 | 11/2018 | Leabman et al. |
| 10,128,695 B2 | 11/2018 | Leabman et al. |
| 10,128,699 B2 | 11/2018 | Leabman |
| 10,134,260 B1 | 11/2018 | Bell et al. |
| 10,135,112 B1 | 11/2018 | Hosseini |
| 10,135,294 B1 | 11/2018 | Leabman |
| 10,135,295 B2 | 11/2018 | Leabman |
| 10,141,768 B2 | 11/2018 | Leabman et al. |
| 10,141,771 B1 | 11/2018 | Hosseini et al. |
| 10,141,791 B2 | 11/2018 | Bell et al. |
| 10,148,097 B1 | 12/2018 | Leabman et al. |
| 10,153,645 B1 | 12/2018 | Bell et al. |
| 10,153,653 B1 | 12/2018 | Bell et al. |

(56) References Cited

U.S. PATENT DOCUMENTS

| | | |
|---|---|---|
| 10,153,660 B1 | 12/2018 | Leabman et al. |
| 10,158,257 B2 | 12/2018 | Leabman |
| 10,158,259 B1 | 12/2018 | Leabman |
| 10,164,478 B2 | 12/2018 | Leabman |
| 10,170,917 B1 | 1/2019 | Bell et al. |
| 10,177,594 B2 | 1/2019 | Contopanagos |
| 10,181,756 B2 | 1/2019 | Bae et al. |
| 10,186,892 B2 | 1/2019 | Hosseini et al. |
| 10,186,893 B2 | 1/2019 | Bell et al. |
| 10,186,911 B2 | 1/2019 | Leabman |
| 10,186,913 B2 | 1/2019 | Leabman et al. |
| 10,193,396 B1 | 1/2019 | Bell et al. |
| 10,199,835 B2 | 2/2019 | Bell |
| 10,199,849 B1 | 2/2019 | Bell |
| 10,199,850 B2 | 2/2019 | Leabman |
| 10,205,239 B1 | 2/2019 | Contopanagos et al. |
| 10,206,185 B2 | 2/2019 | Leabman et al. |
| 10,211,674 B1 | 2/2019 | Leabman et al. |
| 10,211,680 B2 | 2/2019 | Leabman et al. |
| 10,211,682 B2 | 2/2019 | Bell et al. |
| 10,211,685 B2 | 2/2019 | Bell et al. |
| 10,218,207 B2 | 2/2019 | Hosseini et al. |
| 10,218,227 B2 | 2/2019 | Leabman et al. |
| 10,223,717 B1 | 3/2019 | Bell |
| 10,224,758 B2 | 3/2019 | Leabman et al. |
| 10,224,982 B1 | 3/2019 | Leabman |
| 10,230,266 B1 | 3/2019 | Leabman et al. |
| 10,243,414 B1 | 3/2019 | Leabman et al. |
| 10,256,657 B2 | 4/2019 | Hosseini et al. |
| 10,256,677 B2 | 4/2019 | Hosseini et al. |
| 10,263,432 B1 | 4/2019 | Leabman et al. |
| 10,263,476 B2 | 4/2019 | Leabman |
| 10,270,261 B2 | 4/2019 | Bell et al. |
| 10,277,054 B2 | 4/2019 | Hosseini |
| 10,291,055 B1 | 5/2019 | Bell et al. |
| 10,291,056 B2 | 5/2019 | Bell et al. |
| 10,291,066 B1 | 5/2019 | Leabman |
| 10,291,294 B2 | 5/2019 | Leabman |
| 10,298,024 B2 | 5/2019 | Leabman |
| 10,298,133 B2 | 5/2019 | Leabman |
| 10,305,315 B2 | 5/2019 | Leabman et al. |
| 10,312,715 B2 | 6/2019 | Leabman |
| 10,320,446 B2 | 6/2019 | Hosseini |
| 10,333,332 B1 | 6/2019 | Hosseini |
| 10,355,534 B2 | 7/2019 | Johnston et al. |
| 10,381,880 B2 | 8/2019 | Leabman et al. |
| 10,389,161 B2 | 8/2019 | Hosseini et al. |
| 10,396,588 B2 | 8/2019 | Leabman |
| 10,396,604 B2 | 8/2019 | Bell et al. |
| 10,439,442 B2 | 10/2019 | Hosseini et al. |
| 10,439,448 B2 | 10/2019 | Bell et al. |
| 10,447,093 B2 | 10/2019 | Hosseini |
| 10,476,312 B2 | 11/2019 | Johnston et al. |
| 10,483,768 B2 | 11/2019 | Bell et al. |
| 10,490,346 B2 | 11/2019 | Contopanagos |
| 10,491,029 B2 | 11/2019 | Hosseini |
| 10,498,144 B2 | 12/2019 | Leabman et al. |
| 10,511,097 B2 | 12/2019 | Komaros et al. |
| 10,511,196 B2 | 12/2019 | Hosseini |
| 10,516,289 B2 | 12/2019 | Leabman et al. |
| 10,516,301 B2 | 12/2019 | Leabman |
| 10,523,033 B2 | 12/2019 | Leabman |
| 10,523,058 B2 | 12/2019 | Leabman |
| 10,554,052 B2 | 2/2020 | Bell et al. |
| 10,594,165 B2 | 3/2020 | Hosseini |
| 10,615,647 B2 | 4/2020 | Johnston et al. |
| 10,680,319 B2 | 6/2020 | Hosseini et al. |
| 10,714,984 B2 | 7/2020 | Hosseini et al. |
| 10,734,717 B2 | 8/2020 | Hosseini |
| 10,778,041 B2 | 9/2020 | Leabman |
| 10,790,674 B2 | 9/2020 | Bell et al. |
| 10,840,743 B2 | 11/2020 | Johnston et al. |
| 10,879,740 B2 | 12/2020 | Hosseini |
| 10,923,954 B2 | 2/2021 | Leabman |
| 10,958,095 B2 | 3/2021 | Leabman et al. |
| 10,985,617 B1 | 4/2021 | Johnston et al. |
| 11,011,942 B2 | 5/2021 | Liu |
| 2002/0065052 A1 | 5/2002 | Pande et al. |
| 2002/0103447 A1 | 8/2002 | Terry |
| 2002/0171594 A1 | 11/2002 | Fang |
| 2003/0038750 A1 | 2/2003 | Chen |
| 2003/0058187 A1 | 3/2003 | Billiet et al. |
| 2004/0020100 A1 | 2/2004 | O'Brian et al. |
| 2004/0130425 A1 | 7/2004 | Dayan et al. |
| 2004/0130442 A1 | 7/2004 | Breed |
| 2004/0145342 A1 | 7/2004 | Lyon |
| 2004/0155832 A1 | 8/2004 | Yuanzhu |
| 2004/0207559 A1 | 10/2004 | Milosavljevic |
| 2004/0259604 A1 | 12/2004 | Mickle et al. |
| 2005/0007276 A1 | 1/2005 | Barrick et al. |
| 2005/0116683 A1 | 6/2005 | Cheng |
| 2005/0117660 A1 | 6/2005 | Vialle et al. |
| 2005/0134517 A1 | 6/2005 | Gotti |
| 2005/0227619 A1 | 10/2005 | Lee et al. |
| 2005/0237258 A1 | 10/2005 | Abramov et al. |
| 2006/0013335 A1 | 1/2006 | Leabman |
| 2006/0019712 A1 | 1/2006 | Choi |
| 2006/0030279 A1 | 2/2006 | Leabman et al. |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0119532 A1 | 6/2006 | Yun et al. |
| 2006/0160517 A1 | 7/2006 | Yoon |
| 2006/0199620 A1 | 9/2006 | Greene et al. |
| 2006/0238365 A1 | 10/2006 | Vecchione et al. |
| 2006/0266564 A1 | 11/2006 | Perlman et al. |
| 2006/0266917 A1 | 11/2006 | Baldis et al. |
| 2006/0284593 A1 | 12/2006 | Nagy et al. |
| 2007/0007821 A1 | 1/2007 | Rossetti |
| 2007/0019693 A1 | 1/2007 | Graham |
| 2007/0021140 A1 | 1/2007 | Keyes |
| 2007/0060185 A1 | 3/2007 | Simon et al. |
| 2007/0090997 A1 | 4/2007 | Brown et al. |
| 2007/0093269 A1 | 4/2007 | Leabman et al. |
| 2007/0097653 A1 | 5/2007 | Gilliland et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0164868 A1 | 7/2007 | Deavours et al. |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0210960 A1 | 9/2007 | Rofougaran et al. |
| 2007/0222681 A1 | 9/2007 | Greene et al. |
| 2007/0228833 A1 | 10/2007 | Stevens et al. |
| 2007/0229261 A1 | 10/2007 | Zimmerman et al. |
| 2007/0240297 A1 | 10/2007 | Yang et al. |
| 2007/0273486 A1 | 11/2007 | Shiotsu |
| 2007/0296639 A1 | 12/2007 | Hook et al. |
| 2007/0298846 A1 | 12/2007 | Greene et al. |
| 2008/0014897 A1 | 1/2008 | Cook et al. |
| 2008/0024376 A1 | 1/2008 | Norris et al. |
| 2008/0048917 A1 | 2/2008 | Achour et al. |
| 2008/0067874 A1 | 3/2008 | Tseng |
| 2008/0074324 A1 | 3/2008 | Puzella et al. |
| 2008/0089277 A1 | 4/2008 | Alexander et al. |
| 2008/0110263 A1 | 5/2008 | Klessel et al. |
| 2008/0122297 A1 | 5/2008 | Arai |
| 2008/0123383 A1 | 5/2008 | Shionoiri |
| 2008/0169910 A1 | 7/2008 | Greene et al. |
| 2008/0197802 A1 | 8/2008 | Onishi |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0233890 A1 | 9/2008 | Baker |
| 2008/0258993 A1 | 10/2008 | Gummalla et al. |
| 2008/0266191 A1 | 10/2008 | Hilgers |
| 2008/0278378 A1 | 11/2008 | Chang et al. |
| 2008/0309452 A1 | 12/2008 | Zeine |

(56) References Cited

U.S. PATENT DOCUMENTS

| | | |
|---|---|---|
| 2009/0002493 A1 | 1/2009 | Kates |
| 2009/0010316 A1 | 1/2009 | Rofougaran et al. |
| 2009/0019183 A1 | 1/2009 | Wu et al. |
| 2009/0036065 A1 | 2/2009 | Siu |
| 2009/0039828 A1 | 2/2009 | Jakubowski |
| 2009/0047998 A1 | 2/2009 | Alberth, Jr. |
| 2009/0058361 A1 | 3/2009 | John |
| 2009/0058731 A1 | 3/2009 | Geary et al. |
| 2009/0060012 A1 | 3/2009 | Gresset et al. |
| 2009/0067198 A1 | 3/2009 | Graham et al. |
| 2009/0067208 A1 | 3/2009 | Martin et al. |
| 2009/0073066 A1 | 3/2009 | Jordon et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 | 4/2009 | Porwal |
| 2009/0122847 A1 | 5/2009 | Nysen et al. |
| 2009/0128262 A1 | 5/2009 | Lee et al. |
| 2009/0174604 A1 | 7/2009 | Keskitalo |
| 2009/0200985 A1 | 8/2009 | Zane et al. |
| 2009/0206791 A1 | 8/2009 | Jung |
| 2009/0207092 A1 | 8/2009 | Nysen et al. |
| 2009/0218884 A1 | 9/2009 | Soar |
| 2009/0218891 A1 | 9/2009 | McCollough |
| 2009/0243397 A1 | 10/2009 | Cook et al. |
| 2009/0256752 A1 | 10/2009 | Akkermans et al. |
| 2009/0264069 A1 | 10/2009 | Yamasuge |
| 2009/0271048 A1 | 10/2009 | Wakamatsu |
| 2009/0281678 A1 | 11/2009 | Wakamatsu |
| 2009/0284082 A1 | 11/2009 | Mohammadian |
| 2009/0284220 A1 | 11/2009 | Toncich et al. |
| 2009/0284227 A1 | 11/2009 | Mohammadian et al. |
| 2009/0286475 A1 | 11/2009 | Toncich et al. |
| 2009/0286476 A1 | 11/2009 | Toncich et al. |
| 2009/0291634 A1 | 11/2009 | Saarisalo |
| 2009/0312046 A1 | 12/2009 | Clevenger et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019908 A1 | 1/2010 | Cho et al. |
| 2010/0033021 A1 | 2/2010 | Bennett |
| 2010/0034238 A1 | 2/2010 | Bennett |
| 2010/0044123 A1 | 2/2010 | Perlman et al. |
| 2010/0060534 A1 | 3/2010 | Oodachi |
| 2010/0066631 A1 | 3/2010 | Puzella et al. |
| 2010/0075607 A1 | 3/2010 | Hosoya |
| 2010/0079005 A1 | 4/2010 | Hyde et al. |
| 2010/0079011 A1 | 4/2010 | Hyde et al. |
| 2010/0087227 A1 | 4/2010 | Francos et al. |
| 2010/0090656 A1 | 4/2010 | Shearer et al. |
| 2010/0109443 A1 | 5/2010 | Cook et al. |
| 2010/0117926 A1 | 5/2010 | DeJean, II |
| 2010/0123618 A1 | 5/2010 | Martin et al. |
| 2010/0123624 A1 | 5/2010 | Minear et al. |
| 2010/0127660 A1 | 5/2010 | Cook et al. |
| 2010/0142418 A1 | 6/2010 | Nishioka et al. |
| 2010/0142509 A1 | 6/2010 | Zhu et al. |
| 2010/0148723 A1 | 6/2010 | Cook et al. |
| 2010/0151808 A1 | 6/2010 | Toncich et al. |
| 2010/0156741 A1 | 6/2010 | Vazquez et al. |
| 2010/0164296 A1 | 7/2010 | Kurs et al. |
| 2010/0164433 A1 | 7/2010 | Janefalker et al. |
| 2010/0167664 A1 | 7/2010 | Szini |
| 2010/0171461 A1 | 7/2010 | Baarman et al. |
| 2010/0171676 A1 | 7/2010 | Tani et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0210233 A1 | 8/2010 | Cook et al. |
| 2010/0213895 A1 | 8/2010 | Keating et al. |
| 2010/0214177 A1 | 8/2010 | Parsche |
| 2010/0222010 A1 | 9/2010 | Ozaki et al. |
| 2010/0225270 A1 | 9/2010 | Jacobs et al. |
| 2010/0227570 A1 | 9/2010 | Hendin |
| 2010/0244576 A1 | 9/2010 | Hillan et al. |
| 2010/0253281 A1 | 10/2010 | Li |
| 2010/0256831 A1 | 10/2010 | Abramo et al. |
| 2010/0259447 A1 | 10/2010 | Crouch |
| 2010/0264747 A1 | 10/2010 | Hall et al. |
| 2010/0277003 A1 | 11/2010 | Von Novak et al. |
| 2010/0279606 A1 | 11/2010 | Hillan et al. |
| 2010/0289341 A1 | 11/2010 | Ozaki et al. |
| 2010/0295372 A1 | 11/2010 | Hyde et al. |
| 2010/0309088 A1 | 12/2010 | Hyvonen et al. |
| 2010/0315045 A1 | 12/2010 | Zeine |
| 2010/0328044 A1 | 12/2010 | Waffenschmidt et al. |
| 2011/0009057 A1 | 1/2011 | Saunamaki |
| 2011/0013198 A1 | 1/2011 | Shirley |
| 2011/0018360 A1 | 1/2011 | Baarman et al. |
| 2011/0028114 A1 | 2/2011 | Kerselaers |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1 | 2/2011 | Baarman et al. |
| 2011/0043327 A1 | 2/2011 | Baarman et al. |
| 2011/0050166 A1 | 3/2011 | Cook et al. |
| 2011/0057607 A1 | 3/2011 | Carobolante |
| 2011/0057853 A1 | 3/2011 | Kim et al. |
| 2011/0062788 A1 | 3/2011 | Chen et al. |
| 2011/0074342 A1 | 3/2011 | MacLaughlin |
| 2011/0074349 A1 | 3/2011 | Ghovanloo |
| 2011/0109167 A1 | 5/2011 | Park et al. |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122018 A1 | 5/2011 | Tamg et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133691 A1 | 6/2011 | Hautanen |
| 2011/0151789 A1 | 6/2011 | Viglione et al. |
| 2011/0154429 A1 | 6/2011 | Stantchev |
| 2011/0156493 A1 | 6/2011 | Bennett |
| 2011/0156494 A1 | 6/2011 | Mashinsky |
| 2011/0156640 A1 | 6/2011 | Moshfeghi |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222154 A1* | 9/2011 | Choi ................... H04N 13/332 359/464 |
| 2011/0222272 A1 | 9/2011 | Yeh |
| 2011/0227725 A1 | 9/2011 | Muirhead |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Widmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |

(56) References Cited

U.S. PATENT DOCUMENTS

| | | |
|---|---|---|
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Baarman |
| 2011/0304437 A1 | 12/2011 | Beeler |
| 2011/0304521 A1 | 12/2011 | Ando et al. |
| 2012/0007441 A1 | 1/2012 | John |
| 2012/0013196 A1 | 1/2012 | Kim et al. |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0025622 A1 | 2/2012 | Kim et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0068906 A1 | 3/2012 | Asher et al. |
| 2012/0074891 A1 | 3/2012 | Anderson et al. |
| 2012/0075072 A1 | 3/2012 | Pappu |
| 2012/0080944 A1 | 4/2012 | Recker et al. |
| 2012/0080957 A1 | 4/2012 | Cooper et al. |
| 2012/0086284 A1 | 4/2012 | Capanella et al. |
| 2012/0086615 A1 | 4/2012 | Norair |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Clayton |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr. |
| 2012/0132647 A1 | 5/2012 | Beverly et al. |
| 2012/0133214 A1 | 5/2012 | Yun et al. |
| 2012/0142291 A1 | 6/2012 | Rath et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0149307 A1 | 6/2012 | Terada et al. |
| 2012/0150670 A1 | 6/2012 | Taylor et al. |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0179004 A1 | 7/2012 | Roesicke et al. |
| 2012/0181973 A1 | 7/2012 | Lyden |
| 2012/0182427 A1 | 7/2012 | Marshall |
| 2012/0188142 A1 | 7/2012 | Shashi et al. |
| 2012/0187851 A1 | 8/2012 | Huggins et al. |
| 2012/0193999 A1 | 8/2012 | Zeine |
| 2012/0200399 A1 | 8/2012 | Chae |
| 2012/0201153 A1 | 8/2012 | Bharadia et al. |
| 2012/0201173 A1 | 8/2012 | Jian et al. |
| 2012/0206299 A1 | 8/2012 | Valdes-Garcia |
| 2012/0211214 A1 | 8/2012 | Phan |
| 2012/0212071 A1 | 8/2012 | Miyabayashi et al. |
| 2012/0212072 A1 | 8/2012 | Miyabayashi et al. |
| 2012/0214462 A1 | 8/2012 | Chu et al. |
| 2012/0214536 A1 | 8/2012 | Kim et al. |
| 2012/0228392 A1 | 9/2012 | Cameron et al. |
| 2012/0228956 A1 | 9/2012 | Kamata |
| 2012/0231856 A1 | 9/2012 | Lee et al. |
| 2012/0235636 A1 | 9/2012 | Partovi |
| 2012/0242283 A1 | 9/2012 | Kim et al. |
| 2012/0248886 A1 | 10/2012 | Kesler et al. |
| 2012/0248888 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0265272 A1 | 10/2012 | Judkins |
| 2012/0267900 A1 | 10/2012 | Huffman et al. |
| 2012/0268238 A1 | 10/2012 | Park et al. |
| 2012/0270592 A1 | 10/2012 | Ngai |
| 2012/0274154 A1 | 11/2012 | DeLuca |
| 2012/0280650 A1 | 11/2012 | Kim et al. |
| 2012/0286582 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306284 A1 | 12/2012 | Lee et al. |
| 2012/0306433 A1 | 12/2012 | Kim et al. |
| 2012/0306572 A1 | 12/2012 | Hietala et al. |
| 2012/0306705 A1 | 12/2012 | Sakurai et al. |
| 2012/0306707 A1 | 12/2012 | Yang et al. |
| 2012/0306720 A1 | 12/2012 | Tanmi et al. |
| 2012/0307873 A1 | 12/2012 | Kim et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313446 A1 | 12/2012 | Park et al. |
| 2012/0313449 A1 | 12/2012 | Kurs |
| 2012/0313835 A1 | 12/2012 | Gebretnsae |
| 2012/0326660 A1 | 12/2012 | Lu et al. |
| 2013/0002550 A1 | 1/2013 | Zalewski |
| 2013/0005252 A1 | 1/2013 | Lee et al. |
| 2013/0018439 A1 | 1/2013 | Chow et al. |
| 2013/0024059 A1 | 1/2013 | Miller et al. |
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0044035 A1 | 2/2013 | Zhuang |
| 2013/0049471 A1 | 2/2013 | Oleynik |
| 2013/0049475 A1 | 2/2013 | Kim et al. |
| 2013/0049484 A1 | 2/2013 | Weissentern et al. |
| 2013/0057078 A1 | 3/2013 | Lee |
| 2013/0057205 A1 | 3/2013 | Lee et al. |
| 2013/0057210 A1 | 3/2013 | Negaard et al. |
| 2013/0057364 A1 | 3/2013 | Kesler et al. |
| 2013/0058379 A1 | 3/2013 | Kim et al. |
| 2013/0062959 A1 | 3/2013 | Lee et al. |
| 2013/0063082 A1 | 3/2013 | Lee et al. |
| 2013/0063143 A1 | 3/2013 | Adalsteinsson et al. |
| 2013/0063266 A1 | 3/2013 | Yunker et al. |
| 2013/0069444 A1 | 3/2013 | Waffenschmidt et al. |
| 2013/0076308 A1 | 3/2013 | Niskala et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119778 A1 | 5/2013 | Jung |
| 2013/0119929 A1 | 5/2013 | Partovi |
| 2013/0120052 A1 | 5/2013 | Siska |
| 2013/0120205 A1 | 5/2013 | Thomson et al. |

(56) References Cited

U.S. PATENT DOCUMENTS

| | | |
|---|---|---|
| 2013/0120206 A1 | 5/2013 | Biancotto et al. |
| 2013/0120217 A1 | 5/2013 | Ueda et al. |
| 2013/0130621 A1 | 5/2013 | Kim et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0162335 A1 | 6/2013 | Kim et al. |
| 2013/0169061 A1 | 7/2013 | Microshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0175877 A1 | 7/2013 | Abe et al. |
| 2013/0178253 A1 | 7/2013 | Karaoguz |
| 2013/0181881 A1 | 7/2013 | Christie et al. |
| 2013/0187475 A1 | 7/2013 | Vendik |
| 2013/0190031 A1 | 7/2013 | Persson et al. |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0207477 A1 | 8/2013 | Nam et al. |
| 2013/0207604 A1 | 8/2013 | Zeine |
| 2013/0207879 A1 | 8/2013 | Rada et al. |
| 2013/0210357 A1 | 8/2013 | Qin et al. |
| 2013/0221757 A1 | 8/2013 | Cho et al. |
| 2013/0222201 A1 | 8/2013 | Ma et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0249682 A1 | 9/2013 | Van Wiemeersch et al. |
| 2013/0250102 A1 | 9/2013 | Scanlon et al. |
| 2013/0254578 A1 | 9/2013 | Huang et al. |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278076 A1 | 10/2013 | Proud |
| 2013/0278209 A1 | 10/2013 | Von Novak et al. |
| 2013/0285464 A1 | 10/2013 | Miwa |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0288617 A1 | 10/2013 | Kim et al. |
| 2013/0293423 A1 | 11/2013 | Moshfeghi |
| 2013/0300356 A1 | 11/2013 | Yang |
| 2013/0307751 A1 | 11/2013 | Yu-Juin et al. |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0334883 A1 | 12/2013 | Kim et al. |
| 2013/0339108 A1 | 12/2013 | Ryder et al. |
| 2013/0343208 A1 | 12/2013 | Sexton et al. |
| 2013/0343251 A1 | 12/2013 | Zhang |
| 2013/0343585 A1 | 12/2013 | Bennett et al. |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0006017 A1 | 1/2014 | Sen |
| 2014/0008993 A1 | 1/2014 | Leabman |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yu et al. |
| 2014/0021908 A1 | 1/2014 | McCool |
| 2014/0024325 A1 | 1/2014 | Iun et al. |
| 2014/0035524 A1 | 2/2014 | Zeine |
| 2014/0035526 A1 | 2/2014 | Tripathi et al. |
| 2014/0035786 A1 | 2/2014 | Ley |
| 2014/0043248 A1 | 2/2014 | Yeh |
| 2014/0049422 A1 | 2/2014 | Von Novak et al. |
| 2014/0054971 A1 | 2/2014 | Kissin |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0082435 A1 | 3/2014 | Kitgawa |
| 2014/0086125 A1 | 3/2014 | Polo et al. |
| 2014/0086592 A1 | 3/2014 | Nakahara et al. |
| 2014/0091756 A1 | 4/2014 | Ofstein et al. |
| 2014/0091968 A1 | 4/2014 | Harel et al. |
| 2014/0091974 A1 | 4/2014 | Desclos et al. |
| 2014/0103869 A1 | 4/2014 | Radovic |
| 2014/0104157 A1 | 4/2014 | Burns |
| 2014/0111147 A1 | 4/2014 | Soar |
| 2014/0111153 A1 | 4/2014 | Kwon et al. |
| 2014/0113689 A1 | 4/2014 | Lee |
| 2014/0117946 A1 | 5/2014 | Muller et al. |
| 2014/0118140 A1 | 5/2014 | Amis |
| 2014/0128107 A1 | 5/2014 | An |
| 2014/0132210 A1 | 5/2014 | Partovi |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0145884 A1 | 5/2014 | Dang et al. |
| 2014/0152117 A1 | 6/2014 | Sanker |
| 2014/0159651 A1 | 6/2014 | Von Novak et al. |
| 2014/0159652 A1 | 6/2014 | Hall et al. |
| 2014/0159662 A1 | 6/2014 | Furui |
| 2014/0159667 A1 | 6/2014 | Kim et al. |
| 2014/0169385 A1 | 6/2014 | Hadani et al. |
| 2014/0175893 A1 | 6/2014 | Sengupta et al. |
| 2014/0176054 A1 | 6/2014 | Porat et al. |
| 2014/0176061 A1 | 6/2014 | Cheatham, III et al. |
| 2014/0176082 A1 | 6/2014 | Visser |
| 2014/0177399 A1 | 6/2014 | Teng et al. |
| 2014/0183964 A1 | 7/2014 | Walley |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0191818 A1 | 7/2014 | Waffenschmidt et al. |
| 2014/0194092 A1 | 7/2014 | Wanstedt et al. |
| 2014/0194095 A1 | 7/2014 | Wanstedt et al. |
| 2014/0197691 A1 | 7/2014 | Wang |
| 2014/0203629 A1 | 7/2014 | Hoffman et al. |
| 2014/0206384 A1 | 7/2014 | Kim et al. |
| 2014/0210281 A1 | 7/2014 | Ito et al. |
| 2014/0217955 A1 | 8/2014 | Lin |
| 2014/0217967 A1 | 8/2014 | Zeine et al. |
| 2014/0225805 A1 | 8/2014 | Pan et al. |
| 2014/0232320 A1 | 8/2014 | Ento July et al. |
| 2014/0232610 A1 | 8/2014 | Shigemoto et al. |
| 2014/0239733 A1 | 8/2014 | Mach et al. |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0266946 A1 | 9/2014 | Bily et al. |
| 2014/0273819 A1 | 9/2014 | Nadakuduti et al. |
| 2014/0273892 A1 | 9/2014 | Nourbakhsh |
| 2014/0281655 A1 | 9/2014 | Angle et al. |
| 2014/0292090 A1 | 10/2014 | Cordeiro et al. |
| 2014/0292451 A1 | 10/2014 | Zimmerman |

(56) References Cited

U.S. PATENT DOCUMENTS

| | | |
|---|---|---|
| 2014/0300452 A1 | 10/2014 | Rofe et al. |
| 2014/0312706 A1 | 10/2014 | Fiorello et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |
| 2014/0333142 A1 | 11/2014 | Desrosiers |
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0368048 A1 | 12/2014 | Leabman et al. |
| 2014/0368161 A1 | 12/2014 | Leabman et al. |
| 2014/0368405 A1 | 12/2014 | Ek et al. |
| 2014/0375139 A1 | 12/2014 | Tsukamoto |
| 2014/0375253 A1 | 12/2014 | Leabman et al. |
| 2014/0375258 A1 | 12/2014 | Arkhipenkov |
| 2014/0375261 A1 | 12/2014 | Manova-Elssibony et al. |
| 2015/0001949 A1 | 1/2015 | Leabman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Uurgovan et al. |
| 2015/0015180 A1 | 1/2015 | Miller et al. |
| 2015/0015182 A1 | 1/2015 | Brandtman et al. |
| 2015/0015192 A1 | 1/2015 | Leabman et al. |
| 2015/0021990 A1 | 1/2015 | Myer et al. |
| 2015/0022008 A1 | 1/2015 | Leabman et al. |
| 2015/0022010 A1 | 1/2015 | Leabman et al. |
| 2015/0022194 A1 | 1/2015 | Almalki et al. |
| 2015/0023204 A1 | 1/2015 | Wil et al. |
| 2015/0028688 A1 | 1/2015 | Masaoka |
| 2015/0028694 A1 | 1/2015 | Leabman et al. |
| 2015/0028697 A1 | 1/2015 | Leabman et al. |
| 2015/0028875 A1 | 1/2015 | Irie et al. |
| 2015/0035378 A1 | 2/2015 | Calhoun et al. |
| 2015/0035709 A1 | 2/2015 | Lim |
| 2015/0035715 A1 | 2/2015 | Kim et al. |
| 2015/0039482 A1 | 2/2015 | Fuinaga |
| 2015/0041459 A1 | 2/2015 | Leabman et al. |
| 2015/0042265 A1 | 2/2015 | Leabman et al. |
| 2015/0044977 A1 | 2/2015 | Ramasamy et al. |
| 2015/0046526 A1 | 2/2015 | Bush et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0091520 A1 | 4/2015 | Blum et al. |
| 2015/0091706 A1 | 4/2015 | Chemishkian et al. |
| 2015/0097442 A1 | 4/2015 | Muurinen |
| 2015/0097663 A1 | 4/2015 | Sloo et al. |
| 2015/0102764 A1 | 4/2015 | Leabman et al. |
| 2015/0102769 A1 | 4/2015 | Leabman et al. |
| 2015/0102942 A1 | 4/2015 | Houser et al. |
| 2015/0102973 A1 | 4/2015 | Hand et al. |
| 2015/0108848 A1 | 4/2015 | Joehren |
| 2015/0109181 A1 | 4/2015 | Hyde et al. |
| 2015/0115877 A1 | 4/2015 | Aria et al. |
| 2015/0115878 A1 | 4/2015 | Park |
| 2015/0116153 A1 | 4/2015 | Chen et al. |
| 2015/0128733 A1 | 5/2015 | Taylor et al. |
| 2015/0130285 A1 | 5/2015 | Leabman et al. |
| 2015/0130293 A1 | 5/2015 | Hajimiri et al. |
| 2015/0137612 A1 | 5/2015 | Yamakawa et al. |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162662 A1 | 6/2015 | Chen et al. |
| 2015/0162751 A1 | 6/2015 | Leabman et al. |
| 2015/0162779 A1 | 6/2015 | Lee et al. |
| 2015/0171512 A1 | 6/2015 | Chen et al. |
| 2015/0171513 A1 | 6/2015 | Chen et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0180133 A1 | 6/2015 | Hunt |
| 2015/0180249 A1 | 6/2015 | Jeon et al. |
| 2015/0180284 A1 | 6/2015 | Kang et al. |
| 2015/0181117 A1 | 6/2015 | Park et al. |
| 2015/0187491 A1 | 7/2015 | Yanagawa |
| 2015/0188352 A1 | 7/2015 | Peek et al. |
| 2015/0199665 A1 | 7/2015 | Chu |
| 2015/0201385 A1 | 7/2015 | Mercer et al. |
| 2015/0207333 A1 | 7/2015 | Baarman et al. |
| 2015/0207542 A1 | 7/2015 | Zeine |
| 2015/0222126 A1 | 8/2015 | Leabman et al. |
| 2015/0233987 A1 | 8/2015 | Von Novak, III et al. |
| 2015/0234144 A1 | 8/2015 | Cameron et al. |
| 2015/0236520 A1 | 8/2015 | Baarman |
| 2015/0236877 A1 | 8/2015 | Peng et al. |
| 2015/0244070 A1 | 8/2015 | Cheng et al. |
| 2015/0244080 A1 | 8/2015 | Gregoire |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1 | 9/2015 | Walley et al. |
| 2015/0256097 A1 | 9/2015 | Gudan et al. |
| 2015/0260835 A1 | 9/2015 | Widmer et al. |
| 2015/0262465 A1 | 9/2015 | Pritchett |
| 2015/0263534 A1 | 9/2015 | Lee et al. |
| 2015/0263548 A1 | 9/2015 | Cooper |
| 2015/0270618 A1 | 9/2015 | Zhu et al. |
| 2015/0270622 A1 | 9/2015 | Takasaki et al. |
| 2015/0270741 A1 | 9/2015 | Leabman et al. |
| 2015/0278558 A1 | 10/2015 | Priev et al. |
| 2015/0280429 A1 | 10/2015 | Makita et al. |
| 2015/0280484 A1 | 10/2015 | Radziemski et al. |
| 2015/0288074 A1 | 10/2015 | Harper et al. |
| 2015/0288438 A1 | 10/2015 | Maltsev et al. |
| 2015/0311585 A1 | 10/2015 | Church et al. |
| 2015/0312721 A1 | 10/2015 | Singh |
| 2015/0318729 A1 | 11/2015 | Leabman |
| 2015/0326024 A1 | 11/2015 | Bell et al. |
| 2015/0326070 A1 | 11/2015 | Petras et al. |
| 2015/0326072 A1 | 11/2015 | Petras et al. |
| 2015/0326143 A1 | 11/2015 | Petras et al. |
| 2015/0327085 A1 | 11/2015 | Hadani |
| 2015/0333528 A1 | 11/2015 | Leabman |
| 2015/0333573 A1 | 11/2015 | Leabman |
| 2015/0333800 A1 | 11/2015 | Perry et al. |
| 2015/0339497 A1 | 11/2015 | Kurian |
| 2015/0340759 A1 | 11/2015 | Bridgelall et al. |
| 2015/0340903 A1 | 11/2015 | Bell et al. |
| 2015/0341087 A1 | 11/2015 | Moore et al. |
| 2015/0358222 A1 | 12/2015 | Berger et al. |
| 2015/0365137 A1 | 12/2015 | Miller et al. |
| 2015/0365138 A1 | 12/2015 | Miller et al. |
| 2016/0005068 A1 | 1/2016 | Im et al. |
| 2016/0012695 A1 | 1/2016 | Bell et al. |
| 2016/0013560 A1 | 1/2016 | Daniels |
| 2016/0013661 A1 | 1/2016 | Kurs et al. |
| 2016/0013677 A1 | 1/2016 | Bell et al. |
| 2016/0013855 A1 | 1/2016 | Campos |
| 2016/0020636 A1 | 1/2016 | Khlat |
| 2016/0028403 A1 | 1/2016 | McCaughan et al. |
| 2016/0033254 A1 | 2/2016 | Zeine et al. |
| 2016/0042206 A1 | 2/2016 | Pesavento et al. |
| 2016/0043571 A1 | 2/2016 | Kesler et al. |
| 2016/0043572 A1 | 2/2016 | Cooper et al. |
| 2016/0054440 A1 | 2/2016 | Younis |
| 2016/0056635 A1 | 2/2016 | Bell |
| 2016/0056640 A1 | 2/2016 | Mao |
| 2016/0062319 A1* | 3/2016 | Kim ............ H02J 7/025 368/204 |
| 2016/0065005 A1 | 3/2016 | Won et al. |
| 2016/0079799 A1 | 3/2016 | Khlat |
| 2016/0087483 A1 | 3/2016 | Hietala et al. |
| 2016/0087486 A1 | 3/2016 | Pogorelik et al. |
| 2016/0094091 A1 | 3/2016 | Shin et al. |
| 2016/0094092 A1 | 3/2016 | Davlantes et al. |
| 2016/0099601 A1 | 4/2016 | Leabman et al. |
| 2016/0099611 A1 | 4/2016 | Leabman et al. |

(56) References Cited

U.S. PATENT DOCUMENTS

| | | |
|---|---|---|
| 2016/0099612 A1 | 4/2016 | Leabman et al. |
| 2016/0099614 A1 | 4/2016 | Leabman et al. |
| 2016/0099755 A1 | 4/2016 | Leabman et al. |
| 2016/0099757 A1 | 4/2016 | Leabman et al. |
| 2016/0112787 A1 | 4/2016 | Rich |
| 2016/0126749 A1 | 5/2016 | Shichino et al. |
| 2016/0126752 A1 | 5/2016 | Vuori et al. |
| 2016/0126776 A1 | 5/2016 | Kim et al. |
| 2016/0141908 A1 | 5/2016 | Jaki et al. |
| 2016/0164563 A1 | 6/2016 | Khawand et al. |
| 2016/0172890 A1 | 6/2016 | Jeong |
| 2016/0174162 A1 | 6/2016 | Nadakuduti et al. |
| 2016/0181849 A1 | 6/2016 | Govindaraj |
| 2016/0181867 A1 | 6/2016 | Daniel et al. |
| 2016/0181873 A1 | 6/2016 | Mitcheson et al. |
| 2016/0197511 A1* | 7/2016 | Atasoy .............. H02J 50/10 |
| | | 307/104 |
| 2016/0197522 A1 | 7/2016 | Zeine et al. |
| 2016/0202343 A1 | 7/2016 | Okutsu |
| 2016/0204642 A1 | 7/2016 | Oh |
| 2016/0218545 A1 | 7/2016 | Schroeder et al. |
| 2016/0233582 A1 | 8/2016 | Piskun |
| 2016/0238365 A1 | 8/2016 | Wixey et al. |
| 2016/0240908 A1 | 8/2016 | Strong |
| 2016/0248276 A1 | 8/2016 | Hong et al. |
| 2016/0294225 A1 | 10/2016 | Blum et al. |
| 2016/0299210 A1 | 10/2016 | Zeine |
| 2016/0301240 A1 | 10/2016 | Zeine |
| 2016/0322868 A1 | 11/2016 | Akuzawa et al. |
| 2016/0323000 A1 | 11/2016 | Liu et al. |
| 2016/0336804 A1 | 11/2016 | Son et al. |
| 2016/0339258 A1 | 11/2016 | Perryman et al. |
| 2016/0344098 A1 | 11/2016 | Ming |
| 2016/0359367 A1 | 12/2016 | Rothschild |
| 2016/0380464 A1 | 12/2016 | Chin et al. |
| 2016/0380466 A1 | 12/2016 | Yang et al. |
| 2017/0005481 A1* | 1/2017 | Von Novak, III ...... H02J 7/025 |
| 2017/0005516 A9 | 1/2017 | Leabman et al. |
| 2017/0005524 A1 | 1/2017 | Akuzawa et al. |
| 2017/0005530 A1 | 1/2017 | Zeine et al. |
| 2017/0012448 A1 | 1/2017 | Miller et al. |
| 2017/0025887 A1 | 1/2017 | Hyun et al. |
| 2017/0025903 A1 | 1/2017 | Song et al. |
| 2017/0026087 A1 | 1/2017 | Tanabe |
| 2017/0040700 A1 | 2/2017 | Leung |
| 2017/0043675 A1 | 2/2017 | Jones et al. |
| 2017/0047784 A1 | 2/2017 | Jung et al. |
| 2017/0063168 A1 | 3/2017 | Uchida |
| 2017/0077733 A1 | 3/2017 | Jeong et al. |
| 2017/0077765 A1 | 3/2017 | Bell et al. |
| 2017/0077979 A1 | 3/2017 | Papa et al. |
| 2017/0077995 A1 | 3/2017 | Leabman |
| 2017/0085120 A1 | 3/2017 | Leabman et al. |
| 2017/0085437 A1 | 3/2017 | Condeixa et al. |
| 2017/0092115 A1 | 3/2017 | Sloo et al. |
| 2017/0110886 A1 | 4/2017 | Reynolds et al. |
| 2017/0110910 A1 | 4/2017 | Zeine et al. |
| 2017/0127196 A1 | 5/2017 | Blum et al. |
| 2017/0134686 A9 | 5/2017 | Leabman |
| 2017/0141582 A1 | 5/2017 | Adolf et al. |
| 2017/0141583 A1 | 5/2017 | Adolf et al. |
| 2017/0163076 A1 | 6/2017 | Park et al. |
| 2017/0168595 A1 | 6/2017 | Sakaguchi et al. |
| 2017/0179763 A9 | 6/2017 | Leabman |
| 2017/0214422 A1 | 7/2017 | Na et al. |
| 2017/0274787 A1 | 9/2017 | Salter et al. |
| 2017/0338695 A1 | 11/2017 | Port |
| 2018/0006611 A1 | 1/2018 | de Jong et al. |
| 2018/0040929 A1 | 2/2018 | Chappelle |
| 2018/0048178 A1 | 2/2018 | Leabman |
| 2018/0090992 A1 | 3/2018 | Shrivastava et al. |
| 2018/0226840 A1 | 8/2018 | Leabman |
| 2018/0227018 A1 | 8/2018 | Moshfeghi |
| 2018/0241255 A1 | 8/2018 | Leabman |
| 2018/0262050 A1 | 9/2018 | Yankowitz |
| 2018/0262060 A1* | 9/2018 | Johnston .............. H02J 7/025 |
| 2018/0301934 A1 | 10/2018 | Prabhala et al. |
| 2018/0309314 A1 | 10/2018 | White et al. |
| 2018/0343040 A1 | 11/2018 | Luzinski et al. |
| 2018/0375368 A1 | 12/2018 | Leabman et al. |
| 2018/0376235 A1 | 12/2018 | Leabman |
| 2019/0052979 A1 | 2/2019 | Chen et al. |
| 2019/0074728 A1 | 3/2019 | Leabman |
| 2019/0074862 A1 | 3/2019 | Wang et al. |
| 2019/0131827 A1 | 5/2019 | Johnston |
| 2019/0288567 A1 | 9/2019 | Leabman et al. |
| 2019/0296586 A1 | 9/2019 | Moshfeghi |
| 2019/0326782 A1 | 10/2019 | Graham et al. |
| 2019/0372384 A1 | 12/2019 | Hosseini et al. |
| 2019/0386522 A1 | 12/2019 | Park et al. |
| 2019/0393729 A1 | 12/2019 | Contopanagos et al. |
| 2019/0393928 A1 | 12/2019 | Leabman |
| 2020/0006988 A1 | 1/2020 | Leabman |
| 2020/0021128 A1 | 1/2020 | Bell et al. |
| 2020/0091608 A1 | 3/2020 | Alpman et al. |
| 2020/0112204 A1 | 4/2020 | Hosseini et al. |
| 2020/0153117 A1 | 5/2020 | Papio-Toda et al. |
| 2020/0203837 A1 | 6/2020 | Komaros et al. |
| 2020/0235614 A1 | 7/2020 | Swan et al. |
| 2020/0244104 A1 | 7/2020 | Katajamaki et al. |
| 2020/0244111 A1 | 7/2020 | Johnston et al. |
| 2020/0252141 A1 | 8/2020 | Edini |
| 2020/0274397 A1 | 8/2020 | Hwang et al. |
| 2021/0184509 A1 | 6/2021 | Muryanto et al. |

FOREIGN PATENT DOCUMENTS

| | | |
|---|---|---|
| CN | 102292896 A | 12/2011 |
| CN | 102860037 A | 1/2013 |
| CN | 103151848 A | 6/2013 |
| CN | 103348563 A | 10/2013 |
| CN | 203826555 U | 9/2014 |
| CN | 104090265 A | 10/2014 |
| CN | 104167773 A | 11/2014 |
| CN | 104347915 A | 2/2015 |
| CN | 105765821 A | 7/2016 |
| CN | 106329116 A | 1/2017 |
| CN | 103380561 B | 9/2017 |
| DE | 20016655 U1 | 2/2002 |
| DE | 102013216953 A1 | 2/2015 |
| EP | 1028482 A2 | 8/2000 |
| EP | 1081506 A1 | 3/2001 |
| EP | 2346136 A1 | 7/2011 |
| EP | 2397973 A1 | 2/2012 |
| EP | 2545635 A2 | 1/2013 |
| EP | 2747195 A1 | 6/2014 |
| EP | 3067983 A1 | 9/2016 |
| EP | 3118970 A1 | 1/2017 |
| EP | 3145052 A1 | 3/2017 |
| GB | 2404497 A | 2/2005 |
| GB | 2556620 A | 6/2018 |
| JP | 2000323916 A | 11/2000 |
| JP | 2002319816 A | 10/2002 |
| JP | 2006157586 A | 6/2006 |
| JP | 2007043432 A | 2/2007 |
| JP | 2008167017 A | 7/2008 |
| JP | 2009525715 A | 7/2009 |
| JP | 2009201328 A | 9/2009 |
| JP | 2012016171 A | 1/2012 |
| JP | 2012095226 A | 5/2012 |
| JP | 2012157167 A | 8/2012 |
| JP | 2013099249 A | 5/2013 |
| JP | 2013162624 A | 8/2013 |
| JP | 2014075927 A | 4/2014 |
| JP | 2014112063 A | 6/2014 |
| JP | 2014176131 A | 9/2014 |
| JP | 2015027345 A | 2/2015 |
| JP | 2015128349 A | 7/2015 |
| JP | 2015128370 A | 7/2015 |
| JP | WO2015177859 A1 | 4/2017 |
| KR | 20060061776 A | 6/2006 |
| KR | 20070044302 A | 4/2007 |
| KR | 100755144 B1 | 9/2007 |
| KR | 20110132059 A | 12/2011 |

(56) References Cited

FOREIGN PATENT DOCUMENTS

| | | |
|---|---|---|
| KR | 20110135540 A1 | 12/2011 |
| KR | 20120009843 A | 2/2012 |
| KR | 20120108759 A | 10/2012 |
| KR | 20130026977 A | 3/2013 |
| KR | 20140023409 A | 2/2014 |
| KR | 20140023410 A | 3/2014 |
| KR | 20140085200 A | 7/2014 |
| KR | 20140148270 A | 12/2014 |
| KR | 20150077678 A | 7/2015 |
| KR | 20160087671 A | 7/2016 |
| KR | 20180108317 A | 10/2018 |
| RU | 2658332 C1 | 6/2018 |
| WO | WO 199508125 A1 | 3/1995 |
| WO | WO 199831070 A1 | 7/1998 |
| WO | WO 199952173 A1 | 10/1999 |
| WO | WO 2000111716 A1 | 2/2001 |
| WO | WO 2003091943 A1 | 11/2003 |
| WO | WO 2004077550 A1 | 9/2004 |
| WO | WO 2006122783 A2 | 11/2006 |
| WO | WO 2007070571 A2 | 6/2007 |
| WO | WO 2008024993 A2 | 2/2008 |
| WO | WO 2008156571 A2 | 12/2008 |
| WO | WO 2010022181 A1 | 2/2010 |
| WO | WO 2010039246 A1 | 4/2010 |
| WO | WO 2010138994 A1 | 12/2010 |
| WO | WO 2011112022 A2 | 9/2011 |
| WO | WO 2012177283 A1 | 12/2012 |
| WO | WO 2013031988 A1 | 3/2013 |
| WO | WO 2013035190 A1 | 3/2013 |
| WO | WO 2013038074 A2 | 3/2013 |
| WO | WO 2013042399 A1 | 3/2013 |
| WO | WO 2013052950 A1 | 4/2013 |
| WO | WO 2013105920 A2 | 7/2013 |
| WO | WO 2013175596 A1 | 11/2013 |
| WO | WO 2014068992 A1 | 5/2014 |
| WO | WO 2014075103 A1 | 5/2014 |
| WO | WO 2014113093 A1 | 7/2014 |
| WO | WO 2014132258 A1 | 9/2014 |
| WO | WO 2014134996 A1 | 9/2014 |
| WO | WO 2014182788 A2 | 11/2014 |
| WO | WO 2014182788 A3 | 11/2014 |
| WO | WO 2014197472 A1 | 12/2014 |
| WO | WO 2014209587 A1 | 12/2014 |
| WO | WO 2015038773 A1 | 3/2015 |
| WO | WO 2015097809 A1 | 7/2015 |
| WO | WO 2015130902 A1 | 9/2015 |
| WO | WO 2015161323 A1 | 10/2015 |
| WO | WO 2016024869 A1 | 2/2016 |
| WO | WO 2016048512 A1 | 3/2016 |
| WO | WO 2016088261 A1 | 6/2016 |
| WO | WO 2016187357 A1 | 11/2016 |

OTHER PUBLICATIONS

Energous Corp., IPRP, PCT/US2014/040705, Dec. 8, 2015, 6 pgs.
Energous Corp., IPRP, PCT/US2014/045119, Jan. 12, 2016, 9 pgs.
Energous Corp., IPRP, PCT/US2014/048002, Feb. 12, 2015 8 pgs.
Energous Corp., IPRP, PCT/US2014/049669, Feb. 9, 2016, 8 pgs.
Energous Corp., IPRP, PCT/US2014/059317, Arp. 12, 2016, 10 pgs.
Energous Corp., IPRP, PCT/US2014/059340, Apr. 12, 2016, 11 pgs.
Energous Corp., IPRP, PCT/US2014/059871, Apr. 12, 2016, 9 pgs.
Energous Corp., IPRP, PCT/US2014/062661, May, 3, 2016, 10 pgs.
Energous Corp., IPRP, PCT/US2014/068282, Jun. 7, 2016, 10 pgs.
Energous Corp., IPRP, PCT/US2014/068586, Jun. 14, 2016, 8 pgs.
Energous Corp., IPRP, PCT/US2015/067242, Jun. 27, 2017, 7 pgs.
Energous Corp., IPRP, PCT/US2015/067243, Jun. 27, 2017, 7 pgs.
Energous Corp., IPRP, PCT/US2015/067245, Jun. 27, 2017, 7 pgs.
Energous Corp., IPRP, PCT/US2015/067246, Jun. 27, 2017, 9 pgs.
Energous Corp., IPRP, PCT/US2015/067249, Jun. 27, 2017, 7 pgs.
Energous Corp., IPRP, PCT/US2015/067250, Mar. 30, 2016, 10 pgs.
Energous Corp., IPRP, PCT/US2015/067271, Jul. 4, 2017, 5 pgs.
Energous Corp., IPRP, PCT/US2015/067275, Jul. 4, 2017, 7 pgs.
Energous Corp., IPRP, PCT/US2015/067279, Jul. 4, 2017, 7 pgs.
Energous Corp., IPRP, PCT/US2015/067282, Jul. 4, 2017, 6 pgs.
Energous Corp., IPRP, PCT/US2015/067287, Jul. 4, 2017, 7 pgs.
Energous Corp., IPRP, PCT/US2015/067291, Jul. 4, 2017, 4 pgs.
Energous Corp., IPRP, PCT/US2015/067294, Jul. 4, 2017, 6 pgs.
Energous Corp., IPRP, PCT/US2015/067325, Jul. 4, 2017, 8 pgs.
Energous Corp., IPRP, PCT/US2015/067334, Jul. 4, 2017, 5 pgs.
Energous Corp., IPRP, PCT/US2016/068495, Jun. 26, 2018, 7 pgs.
Energous Corp., IPRP, PCT/US2016/068551, Jun. 26, 2018, 6 pgs.
Energous Corp., IPRP, PCT/US2016/068987, Jul. 3, 2018, 7 pgs.
Energous Corp., IPRP, PCT/US2016/068993, Jul. 3, 2018, 10 pgs.
Energous Corp., IPRP, PCT/US2017/046800, Feb. 12, 2019, 10 pgs.
Energous Corp., IPRP, PCT/US2017/065886, Jun. 18, 2019, 10 pgs.
Energous Corp., IPRP, PCT/US2018/012806, Jul. 9, 2019, 6 pgs.
Energous Corp., IPRP, PCT/US2018/025465, Oct. 10, 2019, 8 pgs.
Energous Corp., IPRP, PCT/US2018/031768, Nov. 12, 2019, 8 pgs.
Energous Corp., IPRP, PCT/US2018/031786, Apr. 14, 2020, 7 pgs.
Energous Corp., IPRP, PCT/US2018/039334, Dec. 24, 2019, 8 pgs.
Energous Corp., IPRP, PCT/US2018/051082, Mar. 17, 2020, 9 pgs.
Energous Corp., IPRP, PCT/US2018/058178, May 5, 2020, 7 pgs.
Energous Corp., IPRP, PCT/US2019/015820, Aug. 4, 2020, 7 pgs.
Energous Corp., IPRP, PCT/US2019/021817, Sep. 15, 2020, 7 pgs.
Energous Corp., ISRWO, PCT/US2014/037072, Sep. 12, 2014, 8 pgs.
Energous Corp., ISRWO, PCT/US2014/037109, Apr. 8, 2016, 12 pgs.
Energous Corp., ISRWO, PCT/US2014/037170, Sep. 15, 2014, 11 pgs.
Energous Corp., ISRWO, PCT/US2014/040648, Oct. 2014, 11 pgs.
Energous Corp., ISRWO, PCT/US2014/040697, Oct. 1, 2014, 12 pgs.
Energous Corp., ISRWO, PCT/US2014/040705, Sep. 23, 2014, 8 pgs.
Energous Corp., ISRWO, PCT/US2014/041323, Oct. 10, 2014, 10 pgs.
Energous Corp., ISRWO, PCT/US2014/041342, Jan. 27, 2015, 10 pgs.
Energous Corp., ISRWO, PCT/US2014/041534, Oct. 13, 2014, 10 pgs.
Energous Corp., ISRWO, PCT/US2014/041546, Oct. 16, 2014, 12 pgs.
Energous Corp., ISRWO, PCT/US2014/041558, Oct. 10, 2014, 8 pgs.
Energous Corp., ISRWO, PCT/US2014/044810 Oct. 21, 2014, 12 pgs.
Energous Corp., ISRWO, PCT/US2014/045102, Oct. 28, 2014, 14 pgs.
Energous Corp., ISRWO, PCT/US2014/045119, Oct. 13, 2014, 11 pgs.
Energous Corp., ISRWO, PCT/US2014/045237, Oct. 13, 2014, 16 pgs.
Energous Corp., ISRWO, PCT/US2014/046941, Nov. 6, 2014, 11 pgs.
Energous Corp., ISRWO, PCT/US2014/046956, Nov. 12, 2014, 10 pgs.
Energous Corp., ISRWO, PCT/US2014/046961, Nov. 24, 2014, 16 pgs.
Energous Corp., ISRWO, PCT/US2014/047963, Nov. 7, 2014, 13 pgs.
Energous Corp., ISRWO, PCT/US2014/048002, Nov. 13, 2014, 11 pgs.
Energous Corp., ISRWO, PCT/US2014/049666, Nov. 10, 2014, 7 pgs.
Energous Corp., ISRWO, PCT/US2014/049669, Nov. 13, 2014, 10 pgs.
Energous Corp., ISRWO, PCT/US2014/049673, Nov. 18, 2014, 10 pgs.
Energous Corp., ISRWO, PCT/US2014/054891, Dec. 18, 2014, 12 pgs.
Energous Corp., ISRWO, PCT/US2014/054897, Feb. 17, 2015, 10 pgs.
Energous Corp., ISRWO, PCT/US2014/054953, Dec. 4, 2014, 7 pgs.

(56) References Cited

OTHER PUBLICATIONS

Energous Corp., ISRWO, PCT/US2014/055195, Dec. 22, 2014, 11 pgs.
Energous Corp., ISRWO, PCT/US2014/059317, Feb. 24, 2015, 13 pgs.
Energous Corp., ISRWO, PCT/US2014/059340, Jan. 15, 2015, 13 pgs.
Energous Corp., ISRWO, PCT/US2014/059871, Jan. 23, 2015, 12 pgs.
Energous Corp., ISRWO, PCT/US2014/062661, Jan. 27, 2015, 12 pgs.
Energous Corp., ISRWO, PCT/US2014/062672, Jan. 26, 2015, 11 pgs.
Energous Corp., ISRWO, PCT/US2014/062682, Feb. 12, 2015, 10 pgs.
Energous Corp., ISRWO, PCT/US2014/068282, Mar. 19, 2015, 13 pgs.
Energous Corp., ISRWO, PCT/US2014/068568, Mar. 20, 2015, 10 pgs.
Energous Corp., ISRWO, PCT/US2014/068586, Mar. 20, 2015, 11 pgs.
Energous Corp., ISRWO, PCT/US2015/067242, Mar. 16, 2016, 9 pgs.
Energous Corp., ISRWO, PCT/US2015/067243, Mar. 10, 2016, 11 pgs.
Energous Corp., ISRWO, PCT/US2015/067245, Mar. 17, 2016, 8 pgs.
Energous Corp., ISRWO, PCT/US2015/067246, May 11, 2016, 18 pgs.
Energous Corp., ISRWO, PCT/US2015/067249, Mar. 29, 2016, 8 pgs.
Energous Corp., ISRWO, PCT/US2015/067250, Mar. 30, 2016, 11 pgs.
Energous Corp., ISRWO, PCT/US2015/067271, Mar. 11, 2016, 6 pgs.
Energous Corp., ISRWO, PCT/US2015/067275, Mar. 3, 2016, 8 pgs.
Energous Corp., ISRWO, PCT/US2015/067279, Mar. 11, 2015, 13 pgs.
Energous Corp., ISRWO, PCT/US2015/067282, Jul. 5, 2016, 7 pgs.
Energous Corp., ISRWO, PCT/US2015/067287, Feb. 2, 2016, 8 pgs.
Energous Corp., ISRWO, PCT/US2015/067291, Mar. 4, 2016, 10 pgs.
Energous Corp., ISRWO, PCT/US2015/067294, Mar. 29, 2016, 7 pgs.
Energous Corp., ISRWO, PCT/US2015/067325, Mar. 10, 2016, 9 pgs.
Energous Corp., ISRWO, PCT/US2015/067334, Mar. 3, 2016, 6 pgs.
Energous Corp., ISRWO, PCT/US2016/068495, Mar. 30, 2017, 9 pgs.
Energous Corp., ISRWO, PCT/US2016/068498, May 17, 2017, 8 pgs.
Energous Corp., ISRWO, PCT/US2016/068504, Mar. 30, 2017, 8 pgs.
Energous Corp., ISRWO, PCT/US2016/068551, Mar. 17, 2017, 8 pgs.
Energous Corp., ISRWO, PCT/US2016/068565, Mar. 8, 2017, 11 pgs.
Energous Corp., ISRWO, PCT/US2016/068987, May 8, 2017, 10 pgs.
Energous Corp., ISRWO, PCT/US2016/068993, Mar. 13, 2017, 12 pgs.
Energous Corp., ISRWO, PCT/US2016/069313, Nov. 13, 2017, 10 pgs.
Energous Corp., ISRWO, PCT/US2016/069316, Mar. 16, 2017, 15 pgs.
Energous Corp., ISRWO, PCT/US2017/046800, Sep. 11, 2017, 13 pgs.
Energous Corp., ISRWO, PCT/US2017/065886, Apr. 6, 2018, 13 pgs.
Energous Corp., ISRWO, PCT/US2018/012806, Mar. 23, 2018, 9 pgs.
Energous Corp., ISRWO, PCT/US2018/025465, Jun. 22, 2018, 9 pgs.
Energous Corp., ISRWO, PCT/US2018/031768, Jul. 3, 2018, 9 pgs.
Energous Corp., ISRWO, PCT/US2018/031786, Aug. 8, 2018, 9 pgs.
Energous Corp., ISRWO, PCT/US2018/039334, Sep. 11, 2018, 9 pgs.
Energous Corp., ISRWO, PCT/US2018/051082, Dec. 12, 2018, 9 pgs.
Energous Corp., ISRWO, PCT/US2018/058178, Mar. 13, 2019, 10 pgs.
Energous Corp., ISRWO, PCT/US2018/064289, Apr. 25, 2019, 12 pgs.
Energous Corp., ISRWO, PCT/US2019/015820, May 14, 2019, 9 pgs.
Energous Corp., ISRWO, PCT/US2019/021817, Apr. 6, 2019, 11 pgs.
Energous Corp., ISRWO, PCT/US2019/039014, Oct. 4, 2019, 15 pgs.
Energous Corp., ISRWO, PCT/US2019/061445, Jan. 7, 2020, 19 pgs.
Energous Corp., ISRWO, PCT/US2020/064592, Mar. 24, 2021, 10 pgs.
Energous Corp., ISRWO, PCT/US2020/067566, Apr. 27, 2021, 12 pgs.
Order Granting Reexamination Request, App No. 90/013793 Aug. 31, 2016, 23 pgs.
Notice of Intent to Issue Reexam Certificate: 90/013793 Feb. 2, 2017, 8 pgs.
*Ossia Inc.* vs *Energous Corp.*, Declaration of Stephen B. Heppe in Support of Petition for Post- Grant Review of US Patent 9124125, PGR2016-00023, May 31, 2016, 144 pgs.
*Ossia Inc.* vs *Energous Corp.*, Declaration of Stephen B. Heppe in Support of Petition for Post- Grant Review of US Patent 9124125, PGR2016-00024, May 31, 2016, 122 pgs.
*Ossia Inc.* vs *Energous Corp.*, Patent Owner Preliminary Response, Sep. 8, 2016, 95 pgs.
*Ossia Inc.* vs *Energous Corp.*, Petition for Post Grant Review of U.S. Pat. No. 9,124,125, May 31, 2016, 86 pgs.
*Ossia Inc.* vs *Energous Corp.*, Petition for Post-Grant Review of U.S. Pat. No. 9,124,125, May 31, 2016, 92 pgs.
*Ossia Inc.* vs *Energous Corp.*, PGR2016-00023-Institution Decision, Nov. 29, 2016, 29 pgs.
*Ossia Inc.* vs *Energous Corp.*, PGR2016-00024-Institution Decision, Nov. 29, 2016, 50 pgs.
*Ossia Inc.* vs *Energous Corp.*, PGR2016-00024-Judgement-Adverse, Jan. 20, 2017, 3 pgs.
Adamiuk et al. "Compact, Dual-Polarized UWB-Antanna, Embedded in a Dielectric," IEEE Transactions on Antenna and Propagation, IEEE Service Center, Piscataway, NJ, US vol. 56, No. 2, Feb. 1, 2010, 8 pgs.
Gill et al. "A System for Change Detection and Human Recognition in Voxel Space using the Microsoft Kinect Sensor," 2011 IEEE Applied Imagery Pattern Recognition Workshop. 8 pgs.
Han et al. Enhanced Computer Vision with Microsoft Kinect Sensor: A Review, IEEE Transactions on Cybernetics vol. 43, No. 5. pp. 1318-1334, Oct. 3, 2013.
Hsieh et al. "Development of a Retrodirective Wireless Microwave Power Transmission System", IEEE, 2003 pgs 393-396.
Leabman "Adaptive Band-partitioning for Interference Cancellation in Communication System," Thesis Massachusetts Institute of Technology, Feb. 1997, pgs 1-70.
Li et al. High-Efficiency Switching-Mode Charger System Design Considerations with Dynamic Power Path Management, Mar./Apr. 2012 Issue, 8 pgs.
Mao et al. "BeamStar: An Edge-Based Approach to Routing in Wireless Sensors Networks", IEEE Transactions on Mobile Computing, IEEE Service Center, Los Alamitos, CA US, vol. 6, No. 11, Nov. 1, 2007, 13 pgs.

(56) References Cited

OTHER PUBLICATIONS

Mascarenas et al. "Experimental Studies of Using Wireless Energy Transmission for Powering Embedded Sensor Nodes," Nov. 28, 2009, Journal of Sound and Vibration, 13 pgs.
Mishra et al. "SIW-based Slot Array Antenna and Power Management Circuit for Wireless Energy Harvesting Applications", IEEE APSURSI, Jul. 2012, 2 pgs.
Nenzi et al "U-Helix: On-Chip Short Conical Antenna", 2013 7th European Conference on Antennas and Propagation (EUCAP), ISBN:978-1-4673-2187-7, IEEE, Apr. 8, 2013, 5 pgs.
Qing et al. "UHF Near-Field Segmented Loop Antennas with Enlarged Interrogation Zone," 2012 IEEE International Workshop on Antenna Technology (iWAT), Mar. 1, 2012, pp. 132-135, XP055572059, ISBN: 978-1-4673-0035-3.
Singh "Wireless Power Transfer Using Metamaterial Bonded Microstrip Antenna for Smart Grid WSN", Fourth International Conference on Advances in Computing and Communications (ICACC), Aug. 27-29, 2014, Abstract 1 pg.
Smolders "Broadband Microstrip Array Antennas" Institute of Electrical 1-15 and Electronics Engineers, Digest of the Antennas and Propagation Society International Symposium. Seattle, WA, Jun. 19-24, 1994, Abstract 3 pgs.
Van Veen et al., "Beamforming: A Versatile Approach to Spatial Filtering", IEEE, ASSP Magazine, Apr. 1988, pp. 4-24.
Wei et al. "Design of a Wideband Horizontally Polarized Omnidirectional Printed Loop Antenna," IEEE Antennas and Wireless Propagation Letters, vol. 11, Jan. 3, 2012, 4 pgs.
Zeng et al. "A Compact Fractal Loop Rectenna for RF Energy Harvesting," IEEE Antennas and Wireless Propagation Letters, vol. 16, Jun. 26, 2017, 4 pgs.
Zhai et al. "A Practical Wireless Charging System Based on Ultra-Wideband Retro-Reflective Beamforming" 2010 IEEE Antennas and Propagation Society International Symposium, Toronto, ON 2010, 4 pgs.

\* cited by examiner

CHARGING PAD WITH GUIDING CONTOURS TO ALIGN AN ELECTRONIC DEVICE ON THE CHARGING PAD AND EFFICIENTLY TRANSFER NEAR-FIELD RADIO-FREQUENCY ENERGY TO THE ELECTRONIC DEVICE

RELATED APPLICATIONS

This application claims priority from U.S. Provisional Application Ser. No. 62/947,947, filed Dec. 13, 2019, which is incorporated by reference herein for all purposes.

TECHNICAL FIELD

The embodiments herein generally relate to antennas and charging pads used in wireless power transmission systems and, more specifically, to a charging pad with guiding contours to align an electronic device on the charging pad, and efficiently transfer near-field radio-frequency energy to the electronic device (e.g., transmitting elements of the pad can transmit the near-field radio-frequency energy to receiving elements embedded in movable arms (such as arms of smart glasses)).

BACKGROUND

Conventional charging pads utilize inductive coils to generate a magnetic field that is used to charge a device. Users typically must place the device at a specific position on the charging pad and are unable to move the device to different positions on the pad, without interrupting or terminating the charging of the device. This results in a frustrating experience for many users as they may be unable to place the device at the exact right position on the pad in which to start charging and/or efficiently charge their device.

This issue is particularly problematic for electronic devices that include movable arms (such as movable arms of smart glasses), as the position of receiving elements residing or embedded in these movable arms constantly changes, making it even more difficult for users to place such devices at the exact right position on the pad.

SUMMARY

Accordingly, there is a need for wireless charging systems (e.g., RF charging pads) that are able to selectively activate antenna elements so that the charging pad is capable of efficiently charging a device that is placed at any position on the pad, and so that the charging pad is able to charge an electronic device that has movable arms that might be placed at a number of different positions on the pad. In some embodiments, these systems and methods for charging an electronic device using wirelessly transmitted radio-frequency power (RF) waves include the electronic device (e.g., smart glasses) with one or more movable arms. At least one movable arm of the electronic device includes a receiving antenna element. The system includes a charging pad that includes a housing with a surface. The housing includes at least one guiding contour on the surface configured to align placement of the electronic device on the surface of the housing. The charging pad includes transmitting antenna elements that are selectively activated to transmit radio-frequency power waves to the receiving antenna element of the electronic device. Some embodiments of the charging pad may include switches coupled between one or more power amplifiers and the transmitting antenna elements of the charging pad. The switches allow for selective activation of the transmitting antenna elements based on the placement of the electronic device and/or the receiving antenna elements that can be embedded in movable arms of the electronic device. Such systems and methods of use thereof help to eliminate user dissatisfaction with conventional charging pads, and help to enable efficient wireless charging of electronic devices that include movable arms. By selectively activating transmitting antenna elements and providing guiding contours on the pad to ensure that the electronic device is aligned to enable efficient charging (discussed in more detail below), such systems and methods of use thereof help improve coupling efficiency and RF power transmissions by ensuring that energy transfer is maximized even if movable arms of the electronic device are variously positioned relation to an RF charging pad, thus eliminating wasteful transmissions that may not be efficiently received.

In some embodiments, the charging pad may include splitters coupled between one or more power amplifiers and transmitting antenna elements of the pad. In such embodiments, the splitters provide power from the one or more power amplifiers to at least two transmitting antenna elements of the charging pad. In this way, power may be provided to different zones (e.g., via the transmitting antenna elements) of the charging pad regardless of the position of the electronic device's movable arms relative to the charging pad. In some embodiments, the splitters are configured as passive components and provide power to the at least two transmitting antenna elements without the use of the switches and/or software algorithms to selectively activate transmitting antenna elements. Using the splitters as passive components can simplify the system, without introducing additional electromagnetic interference (EMI) and electromagnetic compatibility (EMC) issues. In some embodiments, the splitters are selectively activated to provide current and/or power to one or more switch circuits and/or transmitting antenna elements. In some embodiments, the splitters and the switches are combined to selectively activate transmitting antenna elements, as well as provide power to at least two transmitting antenna elements regardless of the positions of the electronic device's movable arms relative to the pad.

(A1) In accordance with some embodiments, a system is provided for charging an electronic device using wirelessly transmitted radio-frequency power (RF) waves. The system includes an electronic device with one or more movable arms. At least one movable arm of the electronic device includes a receiving antenna element. The system further includes a charging pad that includes a housing with a surface and transmitting antenna elements that are each selectively activated to transmit radio-frequency power waves to the receiving antenna element of the electronic device. The housing of charging pad further includes at least one guiding contour on the surface. The at least one guiding contour aligns a position of the electronic device on the surface of the housing. The system further includes a transmitter controller integrated circuit (IC) configured to selectively activate particular transmitting antenna elements of the charging pad based on a determination that the particular transmitting antenna elements satisfy matching criteria. Activating the particular transmitting antenna elements causes the particular transmitting antenna elements to transmit the radio-frequency power waves to the first receiving antenna element of the electronic device.

(A2) In accordance with some embodiments, a system is provided for charging an electronic device using wirelessly transmitted radio-frequency power (RF) waves. The system includes an electronic device with one or more movable arms. At least one movable arm of the electronic device includes a receiving antenna element. The system further includes a charging pad that includes a housing with a surface and transmitting antenna elements that are each selectively activated to transmit radio-frequency power waves to the receiving antenna element of the electronic device. The housing of charging pad further includes at least one guiding contour on the surface. The at least one guiding contour aligns a position of the electronic device on the surface of the housing. The system further includes a means for coupling the receiving antenna element of the electronic device to particular transmitting antenna elements of the charging pad. The means for coupling selectively activates the particular transmitting antenna elements of the charging pad based on a determination that the respective transmitting antenna element satisfies matching criteria. Activating the particular transmitting antenna elements of the charging pad causes the particular transmitting antenna elements of the charging pad to transmit the radio-frequency power waves to the receiving antenna element of the electronic device.

(A3) In accordance with some embodiments, a method of charging an electronic device using wirelessly transmitted radio-frequency power waves. The method includes providing an electronic device that including one or more movable arms. At least one movable arm includes a first receiving antenna element. The method further includes providing a charging pad. The charging pad includes a housing having a surface. The housing includes at least one guiding contour on the surface. The at least one guiding contour is configured for aligning a position of the electronic device on the surface of the housing. The charging pad also includes two or more transmitting antenna elements that are each selectively activated to transmit radio-frequency power waves to the first receiving antenna element of the electronic device. The method further incudes selectively activating a respective transmitting antenna element of the two or more transmitting antenna elements based on a determination that the respective transmitting antenna element satisfies matching criteria. Activating the respective transmitting antenna element causes the respective transmitting antenna element to transmit the radio-frequency power waves to the first receiving antenna element of the electronic device.

(A4) In accordance with some embodiments, a non-transitory computer-readable storage medium comprising executable instructions to be executed by one or more processors that are coupled with a radio frequency (RF) charging pad that includes one or more transmitting antenna elements. The executable instructions, when executed by one or more processors, cause the one or more processors to, at the RF charging pad that includes a housing having a surface, the housing including at least one guiding contour on the surface, the at least one guiding contour configured for aligning a position of an electronic device on the surface of the housing; and two or more transmitting antenna elements that are each selectively activated to transmit radio-frequency power waves to a first receiving antenna element of the electronic device; identify the position the electronic device on the surface of the housing; the electronic device including one or more movable arms; wherein at least one movable arm includes the first receiving antenna element. The executable instructions further cause the one or more processors to selectively activate a respective transmitting antenna element of two or more transmitting antenna elements of the RF charging pad based on a determination that the respective transmitting antenna element satisfies matching criteria. Activating the respective transmitting antenna element causes the respective transmitting antenna element to transmit the radio-frequency power waves to the first receiving antenna element of the electronic device.

(A5) In some embodiments of any of A1-A4, the at least one guiding contour aligns the position of the electronic device on the surface of the housing such that the receiving antenna element included in the at least one movable arm of the electronic device is a predetermined distance from the respective transmitting antenna element of the two or more transmitting antenna elements or has a predetermined coupling efficiency greater than 40%. The transmitter controller IC determining that the matching criteria are satisfied upon detecting that the at least one movable arm of the electronic device is (i) the predetermined distance from the respective transmitting antenna element of the two or more transmitting antenna elements and (ii) couples with the respective transmitting antenna element of the two or more transmitting antenna elements at a predetermined coupling efficiency greater than 40%.

(A6) In some embodiments of any of A1-A5, the predetermined distance from the center of the surface of the housing is less than 5 mm (e.g., 4.5 mm, 4.0 mm, 3.5 mm, or another lower, but still suitable distance) and the predetermined coupling efficiency is at least 42%.

(A7) In some embodiments of any of A1-A6, the predetermined distance from the center of the surface of the housing is less than 2 mm (e.g., 1.5 mm, 1.0 mm, 0.5 mm, or another lower, but still suitable distance) and the predetermined coupling efficiency is at least 60%.

(A6) In some embodiments of any of A1-A7, the predetermined distance from the center of the surface of the housing is less than 0.1 mm (e.g., 0.09 mm, 0.08 mm, 0.07 mm, or another suitable distance) and the predetermined coupling efficiency is at least 70%.

(A9) In some embodiments of any of A1-A8, the electronic device includes a second movable arm of the one or more movable arms and the second movable arm includes another receiving antenna element.

(A10) In some embodiments of any of A1-A9, the first receiving antenna element includes a first meandering pattern of a conductive contact that has a first number of turns and the second receiving antenna element includes a second meandering pattern of a conductive contact that has a second number of turns.

(A11) In some embodiments of any of A1-A10, the first meandering pattern of the conductive contact and the second meandering pattern of the conductive contact are the same.

(A12) In some embodiments of any of A1-A11, the first meandering pattern of the conductive contact and the second meandering pattern of the conductive contact are distinct.

(A13) In some embodiments of any of A1-A12, the first meandering pattern of the conductive contact has a first number of turns and the second meandering pattern of the conductive contact has a second number of turns.

(A14) In some embodiments of any of A1-A13, the first meandering pattern of the conductive contact has a larger surface area than the second meandering pattern of the conductive contact.

(A15) In some embodiments of any of A1-A14, the first receiving antenna element and the second receiving antenna element are configured to receive the radio-frequency power waves transmitted from the respective transmitting antenna element.

(A16) In some embodiments of any of A1-A15, the transmitter controller integrated circuit selectively activates a different transmitting antenna element to provide power to the second receiving antenna based on a determination that the different transmitting antenna element satisfies matching criteria.

(A17) In some embodiments of any of A1-A16, the transmitter controller integrated circuit selectively activates the respective transmitting antenna to provide power to the second receiving antenna based on a determination that the respective transmitting antenna element satisfies matching criteria.

(A18) In some embodiments of any of A1-A17, the at least one movable arm folds into a first or second configuration. When the at least one movable arm is folded in either the first or second configuration, the first receiving antenna element is coupled with the respective transmitting antenna element of the two or more transmitting antenna elements at the predetermined coupling efficiency.

(A19) In some embodiments of any of A1-A18, the respective and the different transmitting antenna elements each include symmetrically shaped radiators.

(A20) In some embodiments of any of A1-A19, the respective and the different transmitting antenna elements each include asymmetrically shaped radiators.

(A21) In some embodiments of any of A1-A20, the at least one guiding contour is a border, the border lining at least one edge the housing.

(A22) In some embodiments of any of A1-A21, the at least one guiding contour is a rise and the rise is centrally located on the surface.

(A23) In some embodiments of any of A1-A22, the at least one guiding contour is a cradle configured to receive the electronic device.

(A24) In some embodiments of any of A1-A23, the surface is made of a radio-frequency-transparent dielectric material that is positioned directly above the two or more transmitting antenna elements.

(A25) In some embodiments of any of A1-A24, the transmitter controller IC is in communication with a power splitter that is configured to provide current from a power amplifier to respective switches each associated with the respective and the different transmitting antenna elements.

(A26) In some embodiments of any of A1-A25, activating at least one of the respective or the different transmit antennas includes sending control instructions to one or both the switches and the power amplifier.

(A27) In some embodiments of any of A1-A26, the electronic device is selected from the group consisting of: smart watches, headphones, or, smart door handle.

(A28) In some embodiments of any of A1-A27, the first receiving antenna element is a monopole antenna.

(A29) In some embodiments of any of A1-A28, at least one transmitting antenna element of the two or more transmitting antenna elements is symmetrical to the first receiving antenna element.

(A30) In some embodiments of any of A1-A29, the symmetry is based at least in part on respective meandering patterns of the at least one transmitting antenna element and the first receiving antenna element.

Thus, wireless charging systems configured in accordance with the principles described herein are able to charge an electronic device that has movable arms that can be placed at any position on the RF charging pad.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and not intended to circumscribe or limit the inventive subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

Figure 1:
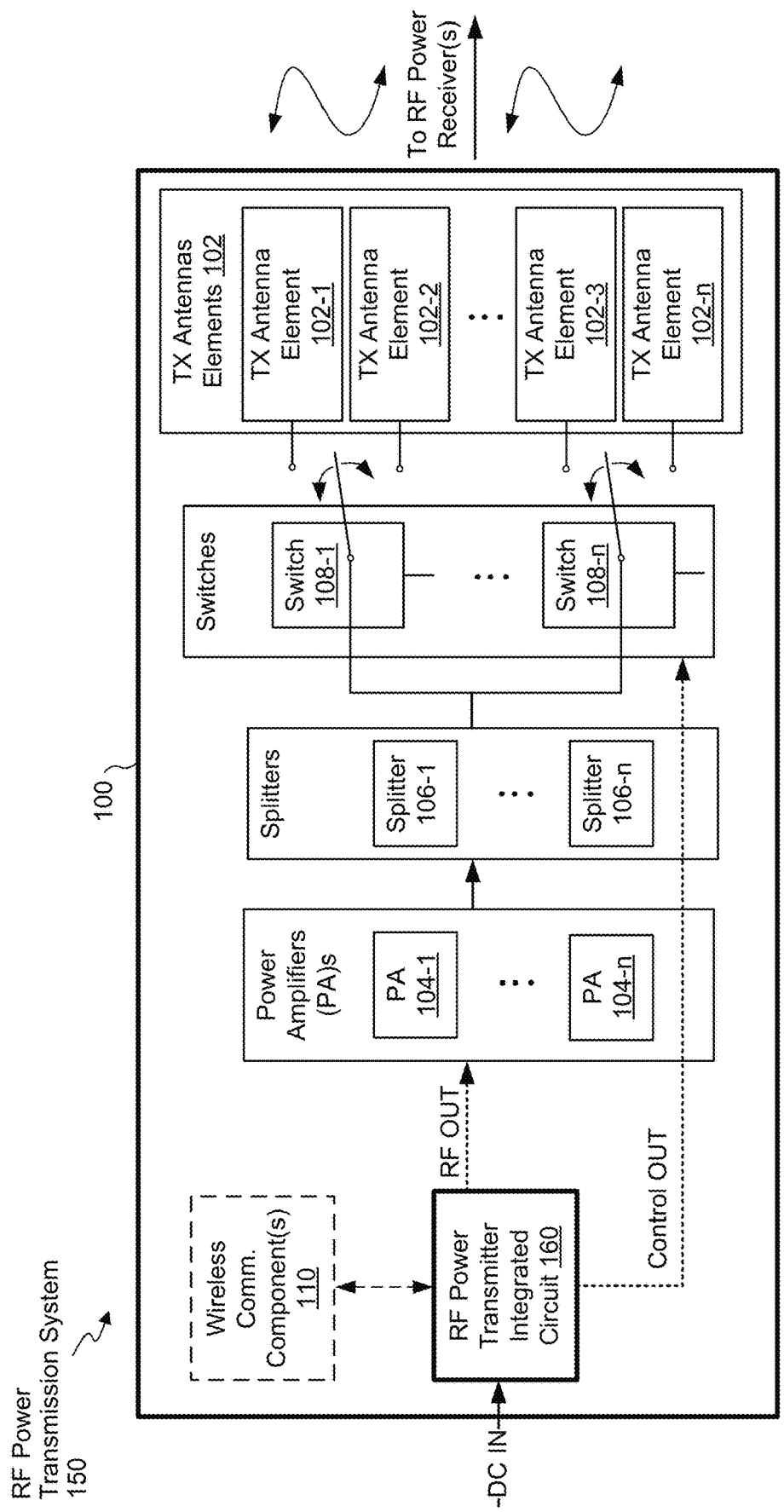
FIG. 1 is a high-level block diagram of an RF charging pad in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a

DESCRIPTION OF EMBODIMENTS

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

FIG. 1 is a high-level block diagram of an RF wireless power transmission system 150 in accordance with some embodiments. In some embodiments, the RF wireless power transmission system 150 includes a transmission pad 100 (also referred to herein as RF charging pad 100 or RF transmission pad 100). In some embodiments, the RF charging pad 100 includes two or more transmitting antenna elements 102 that are selectively powered/fed by one or more power amplifiers (PA)s 104-1, . . . 104n. In some embodiments, at least one transmitting (TX) antenna element (e.g., 102-1, 102-2, 102-3, . . . 102n) is activated by one or more switch circuits 108-1, . . . 108n coupled to the PAs 104 via one or more splitters 106-1, . . . 106n. Alternatively or additionally, in some embodiments, splitters 106 provide power from the PAs 104 to one or more switch circuits (e.g., 108-1 . . . 108n). In some embodiments, the RF charging pad 100 includes an RF power transmitter integrated circuit 160 (also referred to herein as transmitter controller IC). In some embodiments, the RF charging pad 100 includes one or more communications components 110 (e.g., wireless communication components, such as WI-FI or BLUETOOTH radios), discussed in more detail below. In some embodiments, the RF charging pad 100 includes a power input configured to be electrically coupled to a power source.

As discussed below, there are a number of different embodiments used to convey current from the PAs 104 to the TX antenna elements 102. In a first embodiment, each individual PA 104 is coupled with a splitter 106 (e.g., PA 104-1 is coupled with splitter 106-1), which allows for conveying current from a single PA to multiple different TX antenna elements 102. In a second embodiment, each PA 104 is coupled with a splitter 106 and with a switch 108, so that individual TX antenna elements 102 can individually be activated to transmit wireless power while reducing the number of PAs 104 needed (e.g., a switch to one of the TX antenna elements can be opened or sent to ground to ensure that no current is provided to that TX antenna element, even though a same PA 104 is being used to convey current to another TX antenna element along the same splitter 106). In a third embodiment, each PA 104 is coupled with a switch 108, so that individual TX antenna elements 102 can individually be activated to transmit wireless power conveyed by a dedicated PA 104. (e.g., a switch to one of the TX antenna elements can be opened or sent to ground to ensure that no current is provided to that TX antenna element, each TX antenna element 102 coupled to a dedicated PA 104).

In the first embodiment, the RF charging pad 100 includes one or more splitters 106 without one or more switch circuits 108. The one or more splitters 106 are coupled between the one or more PAs 104 and the TX antenna elements 102. In some embodiments, the splitters provide current from the one or more PAs to at least two TX antenna elements of the charging pad 100. In some embodiments, the one or more splitters 106 equally distribute the current from the one or more PAs 104 to the TX antenna elements 102. For example, a splitter 106 coupled between the a PA 104 and at least two TX antenna elements 102 provides current to the at least two TX antenna elements 102. In some embodiments, the one or more splitters 106 are configured as passive components that do not use software and/or algorithms to provide current to the at least two TX antenna elements 102. Using the one or more splitters 106 as passive components simplifies the system and removes additional Electromagnetic interference (EMI) and electromagnetic compatibility (EMC) issues. However, using the one or more splitters 106 as passive components does not allow for selective activation of the at least two TX antenna elements 102 or zone (e.g., current is split among the at least two TX antenna elements 102 without a switching mechanism to provide and/or remove the current from TX antenna elements 102).

Additionally or alternatively, the first embodiment includes one or more splitters 106 that are not passive components (e.g., use software and/or algorithms to provide current to the at least two TX antenna elements 102). In some embodiments, the one or more splitters 106 are communication with the transmitter controller IC 160 and are used to selectively provide and/or remove (e.g., divert) current from the one or more PAs 104 to one or more TX antenna elements 102 or zones of the charging pad. In some embodiments, the transmitter controller IC 160 is configured to send control instructions to the one or more splitters 106 to selectively provide and/or remove (e.g., divert) current from the one or more PAs 104 to the one or more TX antenna elements 102 or zones of the charging pad. The transmitter controller IC 160 is configured to selectively provide current to the one or more TX antenna elements 102 based on satisfaction of matching criteria as discussed below. In some embodiments, the one or more splitters 106 selectively provide current from the one or more PAs 104 to reduce the number of active or used PAs 104 and/or remove the current from one or more TX antenna elements 102 (e.g., to dedicate a PA to a TX antenna element 102 or to prevent current from being provided to one or more TX antenna elements 102). The non-passive one or more splitters 106 equally distribute the current from the one or more PAs 104 to the one or more TX antenna elements 102 (e.g. depending on the selectively activated TX antenna elements).

In the second embodiment, the RF charging pad 100 includes the one or more splitters 106 coupled between the one or more PAs 104 and one or more switch circuits 108. In some embodiments, the one or more splitters 106 and/or the one or more switch circuits 108 are in communication with the transmitter controller IC 160. The one or more splitters 106 are configured to provide current from the one or more PAs 104 to switch circuits 108 associated with the one or more TX antenna elements 102 as described in the first embodiment. In other words, the one or more splitters 106 may be used as passive and/or non-passive components and provide current from the one or more PAs 104 to the one or more switch circuits 108 and/or TX antenna elements 102 as described above.

For example, a charging pad 100 may include a single PA 104 and one or more splitters 106 that are used to provide current to multiple switch circuits 108 and/or TX antenna elements 102 associated with the one or more TX antenna elements 102 or zones of the RF charging pad 100. The one or more splitters 106 may be passive components that provide the current to switch circuits 108 that are used to selectively activate TX antenna elements 102 (e.g., via control instructions sent by the transmitter controller IC 160 to the one or more switch circuits 108 and/or one or more PAs 104, as described below in the third embodiment). In this way, the RF charging pad 100 prioritizes one or more TX antenna elements 102 and/or avoids providing current to a TX antenna elements 102. Additionally or alternatively, the one or more splitters 106 may be non-passive components that selectively provide current or one or more switch circuits 108 and/or TX antenna elements 102 as described above in the first embodiment (e.g., control instructions sent by the transmitter controller IC 160 to the one or more splitters 106).

In this way, the charging pad 100, via transmitter controller IC 160, provides and/or removes power to one or more TX antenna elements 102 or zones, reduces the number of active or used PAs 104, dedicates one or more PAs 104 to one or more TX antenna elements 102 or zones, and/or allows for improved distribution (e.g., improved coupling efficiency) of usable power by selecting one or more TX antenna elements 102 or zones. Using one or more PA 104 with splitters 106 along with the switching mechanism(s) (e.g., switch circuits 108) to activate one or more TX antenna elements 102 and/or zones provide coverage over the entire RF charging pad 100 area (e.g. surface area discussed in FIG. 2).

In the third embodiment, the RF charging pad 100 includes one or more switch circuits 108 without one or more splitters 106. The one or more switch circuits 108 are coupled between the one or more PAs 104 and the TX antenna elements 102. Additionally, the one or more switch circuits 108 are in communication with the transmitter controller IC 160. The RF charging pad 100, via transmitter controller IC 160, operates the one or more switch circuits 108 to selectively activate the TX antenna elements 102 (e.g., by providing power from one or more PAs 104 to the selectively activated the TX antenna elements 102). In some embodiments, RF power is controlled and modulated at the RF charging pad 100 via switch circuits 108 as to enable the RF wireless power transmission system 150 to send RF power to one or more wireless receiving devices via the TX antenna elements 102. In some embodiments, the transmitter controller IC 160 is configured to selectively activate one or more TX antenna elements 102 based on satisfaction of matching criteria as discussed below. Activating the one or more TX antenna elements 102 includes sending control instructions to one or more switch circuits 108 and/or one or more PAs 104. In some embodiments, activating the one or more TX antenna element 102 causes the transmission the one or more RF power waves from the one or more TX antenna elements.

In each of these described embodiments, a single PA 104 may be used to provide power to the selectively activated the TX antenna elements 102. For example, a single PA 104 can be used with one or more splitters 106 to provide power to TX antenna elements 102, one or more switch circuits 108 to provide power to TX antenna elements 102, and/or any combination thereof. Using a single PA with one or more splitters 106 and/or one or more switch circuits 108 allows the RF charging pad 100 to efficiently transfer energy to the electronic device 202 as discussed below. Further, the use of a single PA 104 has the added advantage of reducing the cost of the RF charging pad 100 that results in a better price point for users.

In some embodiments, the optional communication component(s) 110 enable communication between the RF charging pad 100 and one or more communication networks. In some embodiments, the communication component(s) 110 are capable of data communications using any of a variety of custom or standard wireless protocols (e.g., IEEE 802.15.4, Wi-Fi, ZigBee, 6 LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

In some instances, the communication component(s) 110 are not able to communicate with wireless power receivers for various reasons, e.g., because there is no power available for the communication component(s) to use for the transmission of data signals or because the wireless power receiver itself does not actually include any communication component of its own. As such, it is important to design near-field charging pads that are still able to uniquely identify different types of devices and, when a wireless power receiver is detected, determine if that wireless power receiver is authorized to receive wireless power. For instance, the embodiments described herein can be used in conjunction with the signature-signal-generating and -receiving circuits described in commonly-owned U.S. patent application Ser. Nos. 16/024,640 and 16/045,637, which are hereby incorporated by reference for all purposes. In particular, reflected power can be collected and analyzed to identify signature signals and to thereby determine whether an authorized device is present and/or also whether an object other than a wireless power receiver is present as explained in FIGS. 3A-3H and 9A-9B of commonly-owned U.S. patent application Ser. Nos. 16/024,640 and 16/045,637.

Figure 2:
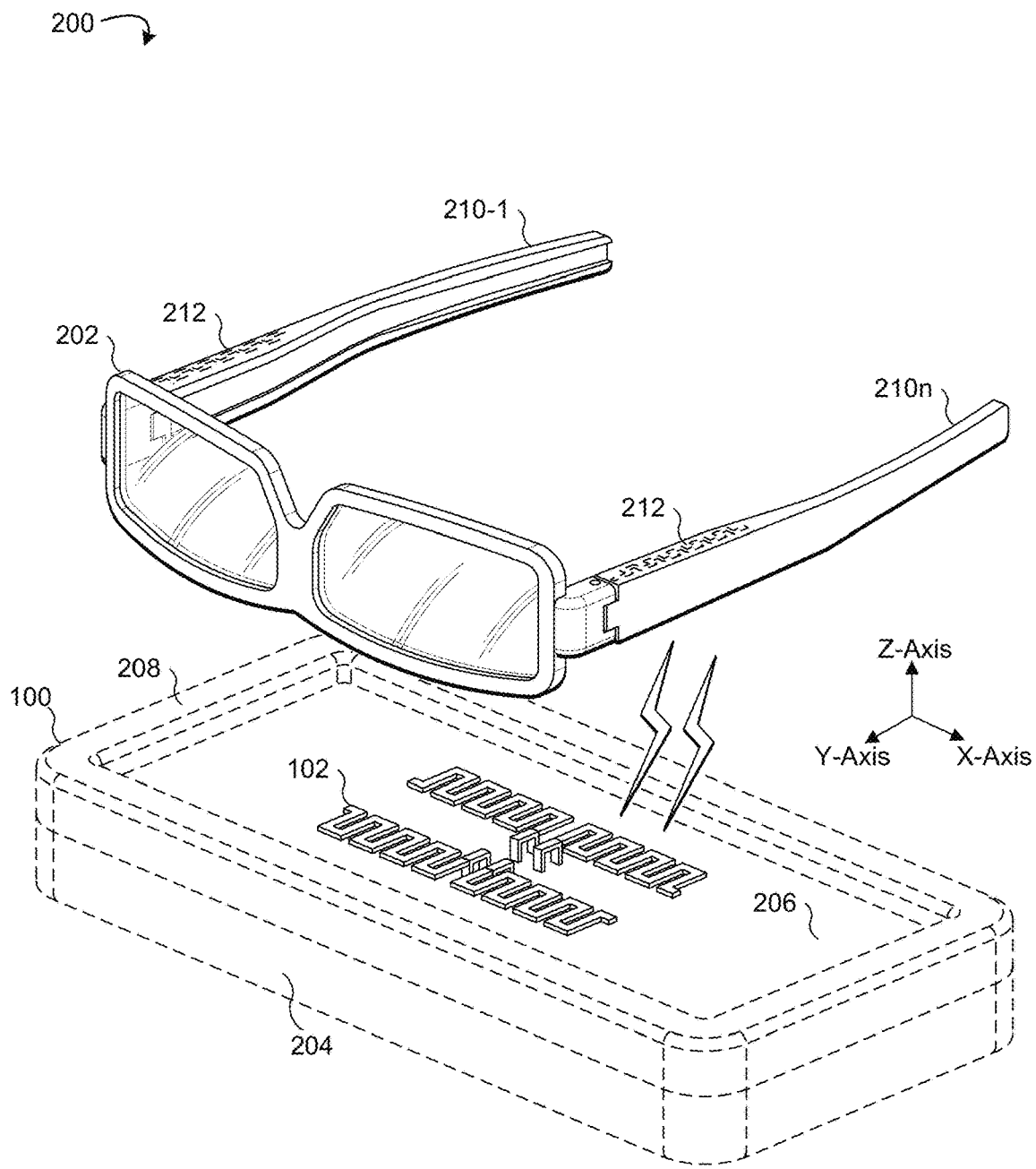
FIG. 2 illustrates a system for charging an electronic device on an RF charging pad, in accordance with some embodiments.

FIG. 2 illustrates a system for charging an electronic device in accordance with some embodiments. In some embodiments, system 200 includes RF charging pad 100 and electronic device 202. In some embodiments, RF charging pad 100 includes at least two TX antenna elements 102. In some embodiments, the at least two TX antenna elements 102 are a same type of antenna (e.g., a meandering line antenna with a conductive line that has a number of turns). In some embodiments, the at least two TX antenna elements 102 are symmetrically-shaped. For example, as illustrated in FIG. 2, the at least two TX antenna elements 102 are symmetrically-shaped along the x and y axes.

In other embodiments, the at least two TX antenna elements 102 can be asymmetrically-shaped, e.g., by having different numbers of turns along the respective TX antenna elements, by having a different length for each of the respective TX antenna elements, by having different section lengths after each of the turns, by having different heights (along the y-axis), etc. In some of these other embodiments, the at least two TX antenna elements 102 can be asymmetrically-shaped, while two other transmitter antenna elements 102 can still be symmetrically-shaped, such that the charging pad 100 includes pairs of TX antenna elements 102 that are symmetrically- and asymmetrically-shaped.

In some embodiments, the at least two TX antenna elements 102 are in a meandering pattern of a conductive contact/line (e.g., winding, snaking and/or curving pattern of a metallic wire, which is an example of the conductive contact/line). For instance, each of the at least two TX antenna elements 102 are in a winding pattern and include an n-number of turns from the starting point.

In some embodiments, the RF charging pad 100 includes a housing 204. In some embodiments, the housing 204 has a surface 206 that includes at least one guiding contour 208. In some embodiments, the at least one guiding contour 208

(e.g., depicted in FIG. 2 as a raised edge along a perimeter of the charging pad 100) is configured to align a position of the electronic device 202 on the surface 206 of the housing 204. In some embodiments, the guiding contour 208 is configured to align one or more of (i) a body portion of the electronic device 202 (e.g., a frame portion of the smart glasses 202), and (ii) movable arms of the element device 202 when those movable arms are in their respective fully folded positions (e.g., fully folded such that the movable arms are folded so that they contact the body portion of the electronic device, or contact the other movable arm after it has contacted the body portion of the electronic device). In some embodiments, the at least one guiding contour 208 aligns the position of the electronic device (e.g., body portion and/or movable arms in their fully folded positions) on the surface of the RF charging pad 100 to satisfy the matching criteria (as discussed below) and enable the transfer of energy and/or to improve the efficiency of the energy transferred. In some embodiments, the surface 206 is made of a radio-frequency-transparent dielectric material that is positioned directly above the at least two or more TX antenna elements 102. In some embodiments, the antennas operate in frequency bands of generally 900 MHz, 2.4 GHz, or 5.7 GHz bands.

In some embodiments, electronic device 202 includes one or more movable arms 210-1, . . . 210n. In some embodiments, the one or more movable arms 210 are coupled to the electronic device 202. In some embodiments, the electronic device 202 is a pair of glasses (e.g., eyeglasses, sunglasses, etc.), a smart watch, headphones, smart door and/or handle, and/or other powered devices that include movable arms (e.g., various toys including remote control helicopters with movable arms in the form of rotor blades). For instance, as illustrated in FIG. 2, electronic device 202 is a pair of glasses. In some embodiments, the one or more movable arms 210 include a receiving (RX) antenna element 212. For instance, in some embodiments, an electronic device 202 can have more than one movable arm and a single RX antenna element 212. In some embodiments, the receiving antenna is internally and/or externally connected to the one or more movable arms 210. In some embodiments, each movable arm of the one or more movable arms 210 includes a RX antenna element 212. In some embodiments, the RX antenna element 212 of the one or more movable arms 210 is configured to receive transmitted RF power waves from the at least two TX antenna elements 102. In some embodiments, the RX antenna element 212 of the one or more movable arms 210 uses the energy transferred from the at least two TX antenna elements 102 of the RF charging pad 100 to charge a battery and/or to directly power the electronic device 202. In some embodiments, the antennas operate in frequency bands of generally 900 MHz, 2.4 GHz, or 5.7 GHz bands. RX antenna elements 212 are discussed in further detain in FIGS. 5A and 5B.

In some embodiments, the RX antenna element 212 is connected at any location and/or portion of the one or more movable arms 210. For example, as illustrated in FIG. 2, the RX antenna element 212 is located on the top of the movable arms 210 and along the length (e.g., on the z-axis and along the y-axis, as shown). In some embodiments, the RX antenna element 212 is located at an end, at the center, on the top, bottom, the inside, and/or the outside of the one or movable arms 210. In some embodiments, RX antenna elements 212 placed in each movable arm of the one or more movable arms 210 are placed at the same location. For example, as shown in FIG. 2, RX antenna elements 212 are each located at an end of the one or more movable arms 210.

In other embodiments, RX antenna elements 212 placed in each movable arm of the one or more movable arms 210 are placed at different locations.

In some embodiments the RX antenna element 212 couples to a respective transmitting element of the two or more TX antenna elements (e.g., TX antenna elements 102) to transfer energy from the RF charging pad 100 to the electronic device 202. In some embodiments, the respective transmitting element is selected by the RF charging pad 100 (via transmitter controller IC 160). In some embodiments, the transmitter controller IC 160 is configured to selectively activate a respective TX antenna element of the two or more TX antenna elements (e.g., TX antenna element 102 is activated when the transmitter controller IC 160 instructs that current should be provided to the respective TX antenna element, e.g., by providing an instruction to one or more of a PA 104, a splitter 106, and/or a switch 108) based on a determination that the respective TX antenna element satisfies matching criteria (e.g., with a RX antenna element 212). In some embodiments, the matching criteria are satisfied when the transmitter controller IC 160 determines that the RX antenna element 212 is within a predetermined distance from the respective TX antenna element (which can be a TX antenna element 102 that is closest to a RX antenna element 212) of the two or more TX antenna elements 102. For example, in some embodiments, the respective TX antenna element 102 is the TX antenna element that has the least distance between the RX antenna element 212. Additionally or alternatively, in some embodiments, the transmitter controller IC 160 determines that the matching criteria are satisfied upon detecting that the RX antenna element 212 in the at least one movable arm of the electronic device couples with the respective TX antenna element of the two or more TX antenna elements 102 at a predetermined coupling efficiency greater than 40%.

In some embodiments, distance between the RX antenna element 212 and the respective TX antenna element 102 and/or the location of the RX antenna element 212 is determined by the transmitter controller IC 160 based on the power received by the RX antenna element 212. Alternatively and/or additionally, in some embodiments, satisfaction of the matching criteria is determined by information (e.g., location, charge, etc.) received via wireless communication components 110 of the RF charging pad 100 (e.g., electronic device 202 may provide information via WIFI, BLUETOOTH, and/or other wireless data connections). For example, in some embodiments, the RF charging pad 100 and the electronic device 202 exchange messages via wireless communication, and these messages may indicate location information that is used to select the respective TX antenna element 102. In some embodiments, the transmitter controller IC 160 detects that no RX antenna element 212 is close/nearby and thereafter provides appropriate instructions (e.g., to one or more of the PA 104, splitter 106, and switch 108) to cease providing current to the TX antenna element 102.

In some embodiments, the transmitter controller IC 160 is configured to selectively activate more than one TX antenna element of the two or more TX antenna elements 102. In some embodiments, the transmitter controller IC 160 selectively activates different TX antenna elements (e.g., variations as discussed above). In some embodiments, the transmitter controller IC 160 is configured to selectively activate respective TX antenna elements of the two or more TX antenna elements 102 for multiple RX antenna elements 212 of an electronic device 202. Additionally and/or alternatively, in some embodiments, the transmitter controller IC 160 is configured to selectively activate respective TX antenna elements of the two or more TX antenna elements 102 for multiple electronic devices 202 that include a RX antenna elements 212. For example, the RF charging pad 100 may provide usable energy to multiple electronic devices, such as multiple pairs of smart glasses, simultaneously.

In some embodiments, the transmitter controller IC 160 detects and/or identifies one or more transmission zones (e.g., each respective TX antenna element 102 is associated with a zone of the pad 204 that is above the respective TX antenna element, such that, for the example depicted in FIG. 2, each respective TX antenna element 102 would be associated with approximately one-quarter of a surface area of the pad 204) that are closest/nearest to a RX antenna element 212 based on the power received by the RX antenna element 212. Alternatively and/or additionally, in some embodiments, the RF charging pad 100 receives (via wireless communication components 110) information (e.g., location, charge, etc.) from the electronic device 202. For example, in some embodiments, the transmitter and the receiver exchange messages via wireless communication, and these messages may indicate location information that is used to select the respective transmitting antenna 102. In some embodiments, the transmitter controller IC 160 detects and/or identifies one or more transmission zones that are closest/nearest to a RX antenna element 212 based on the information received from the electronic device 202.

In some embodiments, the at least one guiding contour 208 aligns the position of the electronic device 202 (e.g., (i) a body portion of the electronic device 202 and/or (ii) movable arms of the element device 202 when those movable arms are (in their respective fully folded positions) on the surface 206 of the housing 204 such that a RX antenna element 212 included in the at least one movable arm 210 of the electronic device 202 satisfies the matching criteria. In some embodiments, at least one guiding contour 208 aligns the electronic device 202 such that the RX antenna element 212 is a predetermined distance from at least one TX antenna element of the two or more TX antenna elements 102. In some embodiments, the at least one guiding contour 208 aligns the electronic device 202 such that the RX antenna element 212 is within at least one zone of the RF charging pad 100 that includes at least one TX antenna element of the two or more TX antenna elements 102. Additionally or alternatively, in some embodiments, the at least one guiding contour 208 aligns the electronic device 202 such that the RX antenna element 212 included in the at least one movable arm of the electronic device 202 couples with at least one TX antenna element of the two or more TX antenna elements 102 with a predetermined coupling efficiency greater than 40%. In some embodiments, the at least one guiding contour 208 keeps and/or stabilizes electronic device 202 on the surface 206 of the housing 204. In some embodiments, the at least one guiding contour 208 aligns the electronic device 202 (e.g., one or more of (i) a body portion of the electronic device 202, and (ii) movable arms of the element device 202 when those movable arms are (in their respective fully folded positions)) in the center of the surface 206 of the housing 204 so that the matching criteria are satisfied (e.g., the RX antenna element 212 is a predetermined distance from at least one TX antenna element of the two or more TX antenna elements 102 and/or has a coupling efficiency greater than 40% with the at least one TX antenna element, as determined by the transmitter controller IC 160).

In some embodiments, a RX antenna element 212 couples with a respective TX antenna element of the two or more TX antenna elements 102 (e.g., TX antenna element 102 satisfying matching criteria) at a coupling efficiency greater than 40%, as measured and monitored by the transmitter controller IC 160. In some embodiments, the coupling efficiency is at least 70%, as measured and monitored by the transmitter controller IC 160, when the distance from the RX antenna element 212 and a TX antenna element of the two or more TX antenna elements 102 is less than 0.1 mm. In some embodiments, the coupling efficiency is at least 60%, as measured and monitored by the transmitter controller IC 160, when the distance from the RX antenna element 212 and a TX antenna element of the two or more TX antenna elements 102 is less than 2 mm. In some embodiments, the coupling efficiency is at least 42%, as measured and monitored by the transmitter controller IC 160, when the distance from the RX antenna element 212 and a TX antenna element of the two or more TX antenna elements 102 is less than 5 mm. In some embodiments, when the distance from the RX antenna element 212 and a TX antenna element of the two or more TX antenna elements 102 is greater than 5 mm the coupling efficiency varies from 40-50%, as measured and monitored by the transmitter controller IC 160.

In some embodiments, at least one TX antenna element of the two or more TX antenna elements 102 is symmetrical to a RX antenna element 212. In some embodiments, the symmetry is based at least in part on respective meandering patterns of the at least one TX antenna element 102 and the RX antenna element 212. For example, the at least one TX antenna element 102 and the RX antenna element 212 may have symmetrically-shaped meandering line patterns of conductive traces on both transmit and receive sides.

Figure 3:
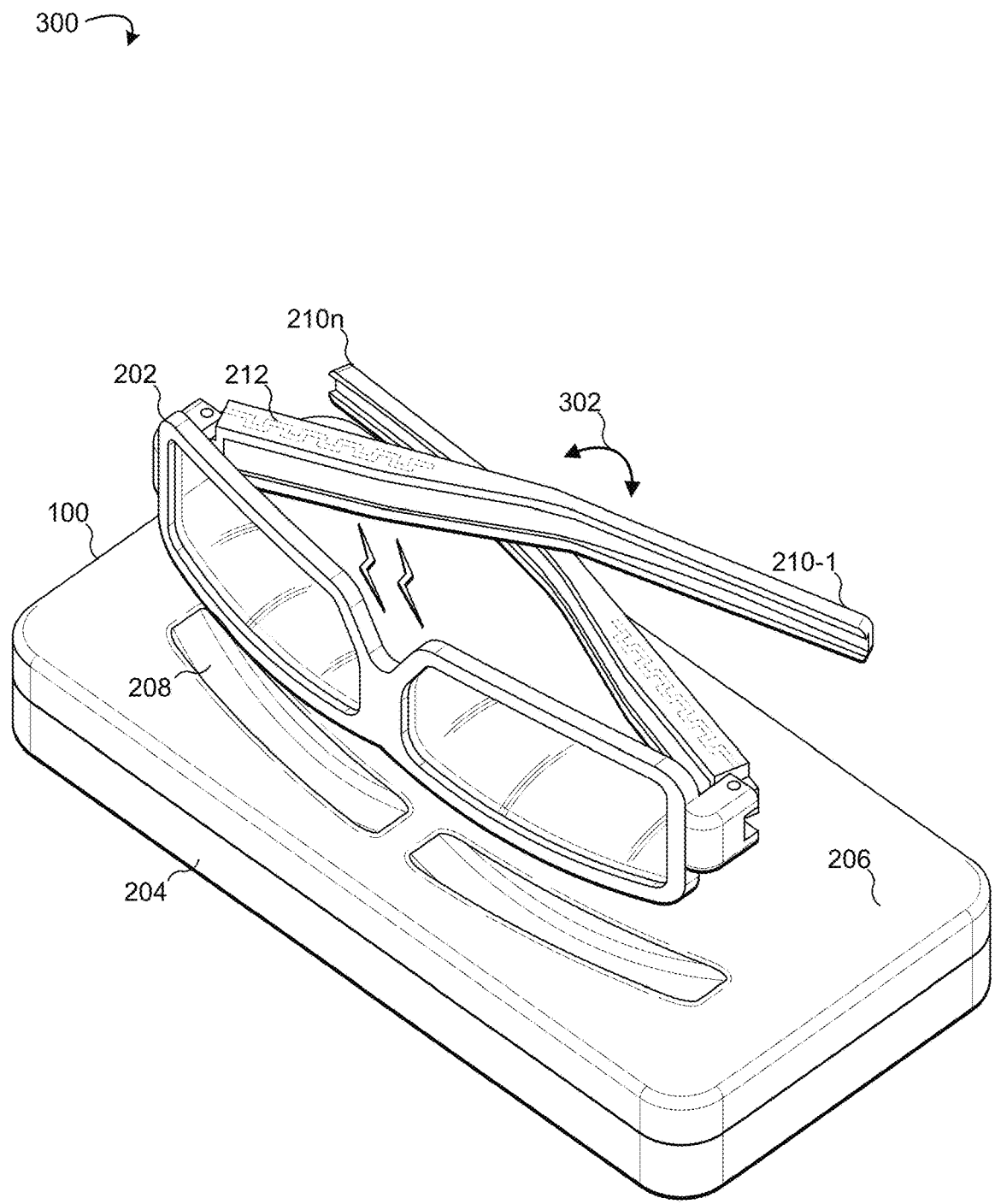
FIG. 3 illustrates another system for charging an electronic device on an RF charging pad, in accordance with some embodiments.

FIG. 3 illustrates a system for charging an electronic device on and/or near an RF charging pad in accordance with some embodiments. In some embodiments, system 300 includes RF charging pad 100 and electronic device 202 as described above in FIG. 2. For instance, in some embodiments, RF charging pad 100 includes a housing 204 with a surface 206 and at least one guiding contour 208 (e.g., impression and/or divot discussed in more detail below). The RF charging pad 100 includes two or more TX antenna elements (e.g., TX antenna elements 102; not shown) directly beneath the surface 206 of the RF charging pad 100. In some embodiments, electronic device 202 includes one or more movable arms 210-1, . . . 210n. The one or more movable arms 210-1, . . . 210n each include at least one RX antenna element 212.

In some embodiments, the RX antenna elements 212 of each movable arm 210 is configured to receive the radio-frequency power waves transmitted from the RF charging pad 100. In some embodiments, the RX antenna elements 212 of each movable arm 210 couples with the same TX antenna element(s) 102 and/or zone(s) as determined by the transmitter controller IC 160 (as described above). In some embodiments, the RX antenna elements 212 of each movable arm 210 couples with different respective TX antenna elements 102 and/or different zones as determined by the transmitter controller IC 160. For example, the respective TX antenna elements and/or zones are different transmitting antennas 102 and/or zones for the receiving antenna 212 of each movable arm 210. In some embodiments, that the different TX antenna element 102 are determined by the transmitter controller IC 160 (as described above). In some embodiments, radio-frequency power waves are transmitted to the RX antenna elements 212 of each movable arm 210 simultaneously.

In some embodiments, the one or more movable arms 210 are placed in different configurations. In some embodiments, the different configurations include folding a first movable arm followed by folding a second movable arm and vice versa. For example, as illustrated in FIG. 3, the one or more movable arms 210 fold inwardly and/or outwardly (e.g. around rotation 302) with movable arm 210-1 folded first followed by movable arm 210n. In some embodiments, the RF charging pad 100 provides an acceptable coupling efficiency for wireless charging (e.g., at least 40%, up to at least 70%) regardless of the different folding configurations. In some embodiments, the RF charging pad 100 selectively activates (e.g., via the transmitter controller IC 160 as described above) distinct respective TX antenna elements 102 based on the configuration of the one or more movable arms 210 (e.g., left arm folded before the right arm and vice versa).

FIG. 3 further illustrates the transmission of RF power from the RF charging pad 100 to the electronic device 202 irrespective of the position and/or orientation of electronic device 202 and/or configuration of the one or more movable arms 210. In some embodiments, electronic device 202 is improperly placed on the RF charging pad 100 and/or fails to properly fit in the at least on guiding contour 208 of the surface 206. For example, as illustrated in FIG. 3, the electronic device 202 is upside down and/or may not be properly received by the at least on guiding contour 208 of the surface 206 (e.g., electronic device 202 will not be flush with the surface 206 within the guiding contours 208 of the housing 204). In some embodiments, the RF charging pad 100 takes into account the position and/or location of RX antenna element 212 and selectively activates (via transmitter controller IC 160) a respective TX antenna element of the two or more TX antenna elements 102 to efficiently transfer energy to the electronic device 202 (via RX antenna element 212), even while the device 202 is in an improper position. In some embodiments, a user of the device 202 or charging pad 100 can be notified of the improper placement of the device 202, e.g., by flashing an LED on a surface of the pad 100, by providing audible feedback generated by the pad 100, by sending an electronic message to the user, etc., which will instruct the user to properly place the device 202 within the guiding contours 208.

Figure 4A:
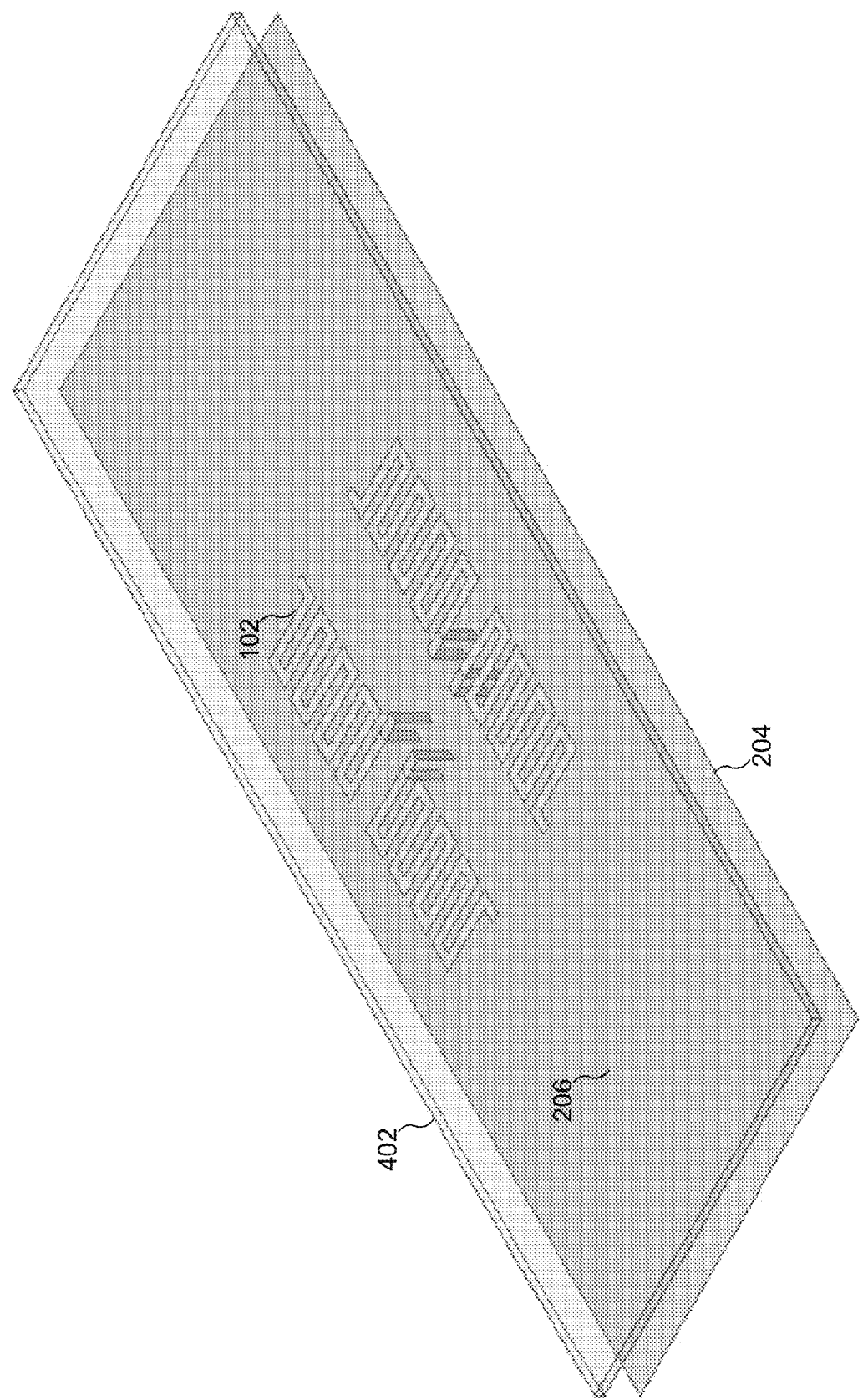
FIGS. 4A and 4B illustrate RF charging pad surfaces with transmitting antenna elements in accordance with some embodiments.

FIG. 4A illustrates a surface of the housing of the RF charging pad in accordance with some embodiments. In some embodiments, surface 206 of housing 204 is made of a radio-frequency-transparent dielectric material 402 that is positioned directly above the at least two or more TX antenna elements 102. In some embodiments, the dielectric material 402 is a thermoplastic or thermosetting polymer. In some embodiments, the dielectric material 402 is porcelain and/or ceramic, mica, glass, plastics, air, vacuums, oxides of various metals, gasses, and/or liquids. Additionally, FIG. 4A shows the at least two or more TX antenna elements 102 symmetrically positioned in RF charging pad 100. For example, as illustrated in FIG. 4A, the at least two or more TX antenna elements 102 are symmetric along the x and/or the y axes. In some embodiments, the at least two or more TX antenna elements 102 of FIG. 4A are configured as described above in FIGS. 1-3.

Figure 4B:
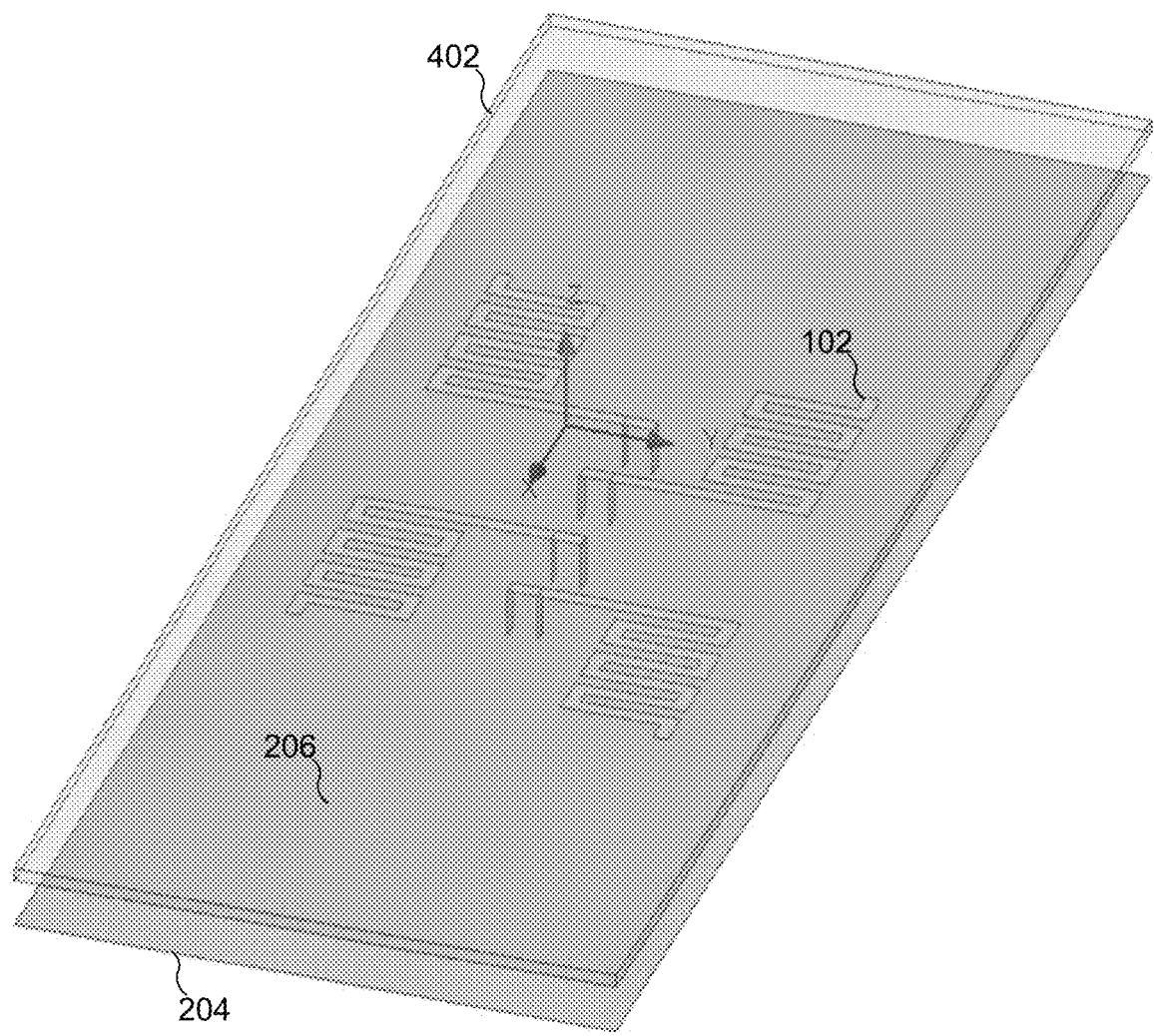

FIG. 4B illustrates another embodiment of the surface of the housing of the RF charging pad. The surface 206 of housing 204 shown in FIG. 4B includes the features discussed above with respect to FIGS. 1-4A. In some embodiments, the at least two or more TX antenna elements 102 are asymmetrically positioned in RF charging pad 100. For example, as illustrated in FIG. 4B, the at least two or more TX antenna elements 102 are asymmetric along the x and/or the y axes. In some embodiments, each TX antenna element of the at least two or more TX antenna elements 102 is a symmetrically shaped radiator. In other embodiments, each TX antenna element of the at least two or more TX antenna elements 102 is an asymmetrically shaped radiator. In some embodiments, the configurations of the at least two or more TX antenna elements 102 described herein form plane inverted F antenna (PIFA).

Figure 5A:
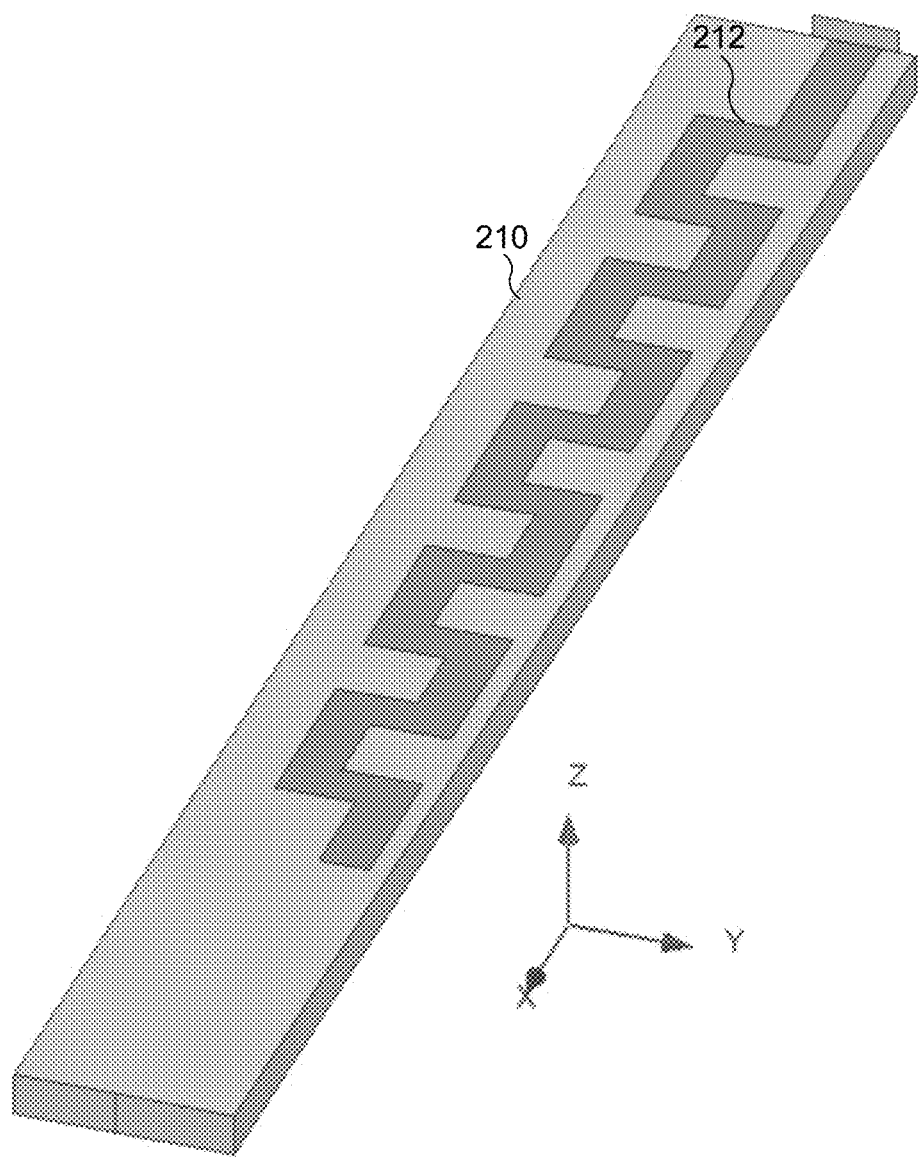
FIGS. 5A and 5B illustrate receiving antenna elements in or on a movable arm of an electronic device in accordance with some embodiments.
Figure 5B:
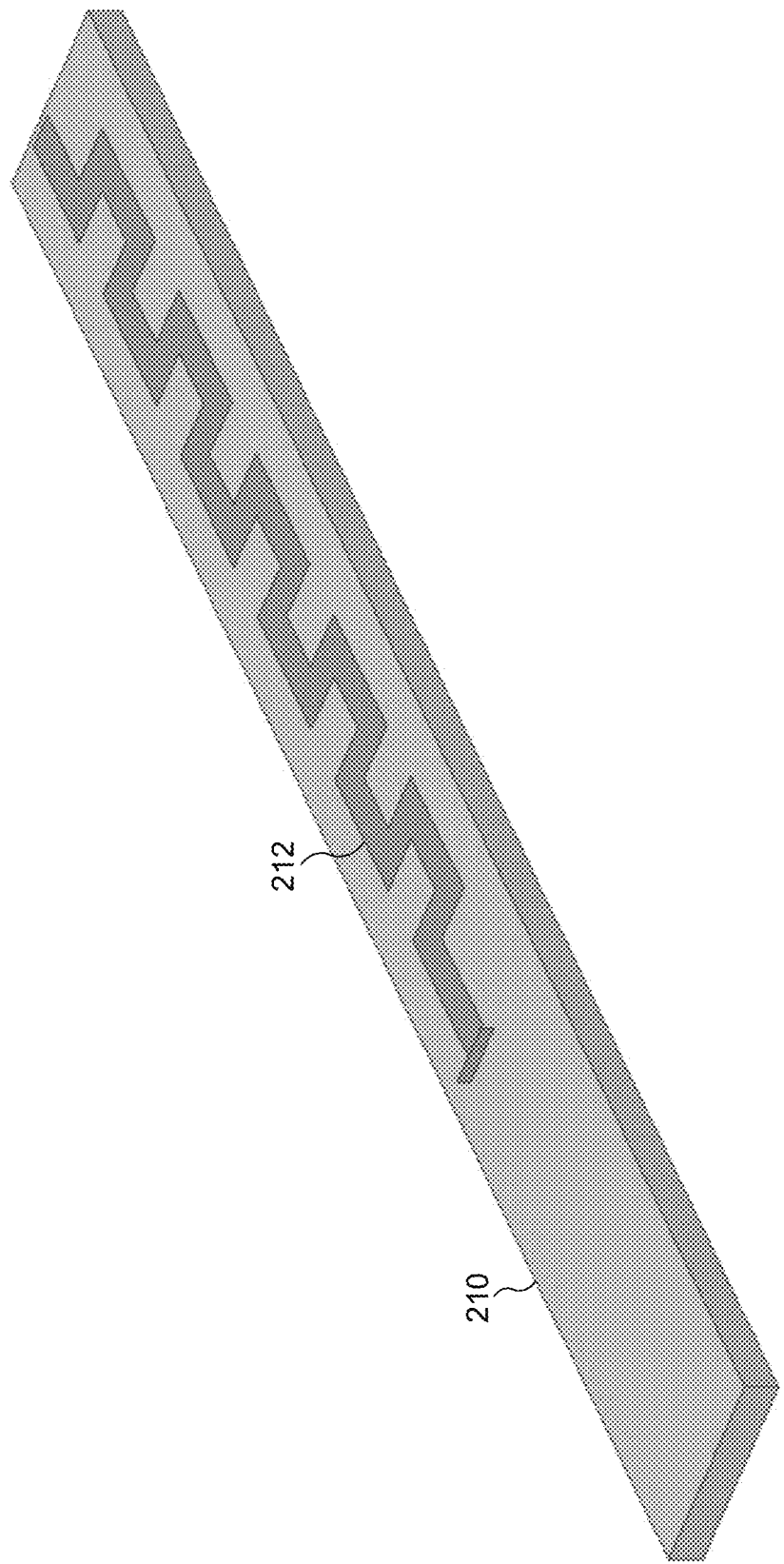

FIGS. 5A and 5B illustrate different views of an example RX antenna element of the one or more movable arms in accordance with some embodiments. In some embodiments, the RX antenna element 212 is a monopole antenna. In some embodiments, the RX antenna element 212 is internally and/or externally connected to one or more movable arms 210, as was discussed above. In some embodiments, the RX antenna element 212 extends a predetermined length of a movable arm 210-1 (e.g., a quarter, a third, half, three quarters, and/or the entire length of the movable arm). In some embodiments, the RX antenna element 212 includes a conductive line/contact (e.g., a metal wire or trace) that forms a meandered line pattern. For instance, the RX antenna element 212 has a meandering pattern of a conductive contact (e.g., curving, snaking, and/or winding pattern). In some embodiments, the meandering line pattern includes an n-number of turns. In some embodiments, the meandering line pattern has a uniform surface area across its predetermined length. Alternatively and/or additionally, in some embodiments, the meandering pattern of the conductive contact has a variable surface area across its predetermined length. For example, in some embodiments, the meandering pattern of the conductive contact has a surface area that is smaller at a first end and greater at the second end of the conductive line.

In some embodiments, a RX antenna element 212 is placed in each movable arm of the one or more movable arms 210. In some embodiments, each additional RX antenna element 212 is the same (e.g., same pattern, length, surface area, turns, etc.). For example, in some embodiments, a first RX antenna element 212 and an additional RX antenna element 212 are the same. in other embodiments, each additional RX antenna element 212 is distinct (e.g., different number of turns for the meandering line, patter, predetermined length, surface area, and/or other variations between RX antenna elements 212). For example, the first RX antenna element 212 may have a length that is longer and/or shorter than the additional RX antenna element 212; the meandering pattern of the first RX antenna element 212 may include a greater and/or smaller number of turns than the meandering pattern of the additional RX antenna element 212; the surface area of the meandering pattern of the first RX antenna element 212 may be greater and/or smaller than the surface area of the meandering pattern of the additional RX antenna element 212; the surface area of the meandering pattern of the first RX antenna element 212 may be uniform and the surface area of the meandering pattern of the additional RX antenna element 212 may vary across its length; and/or any variation thereof.

Figure 6A:
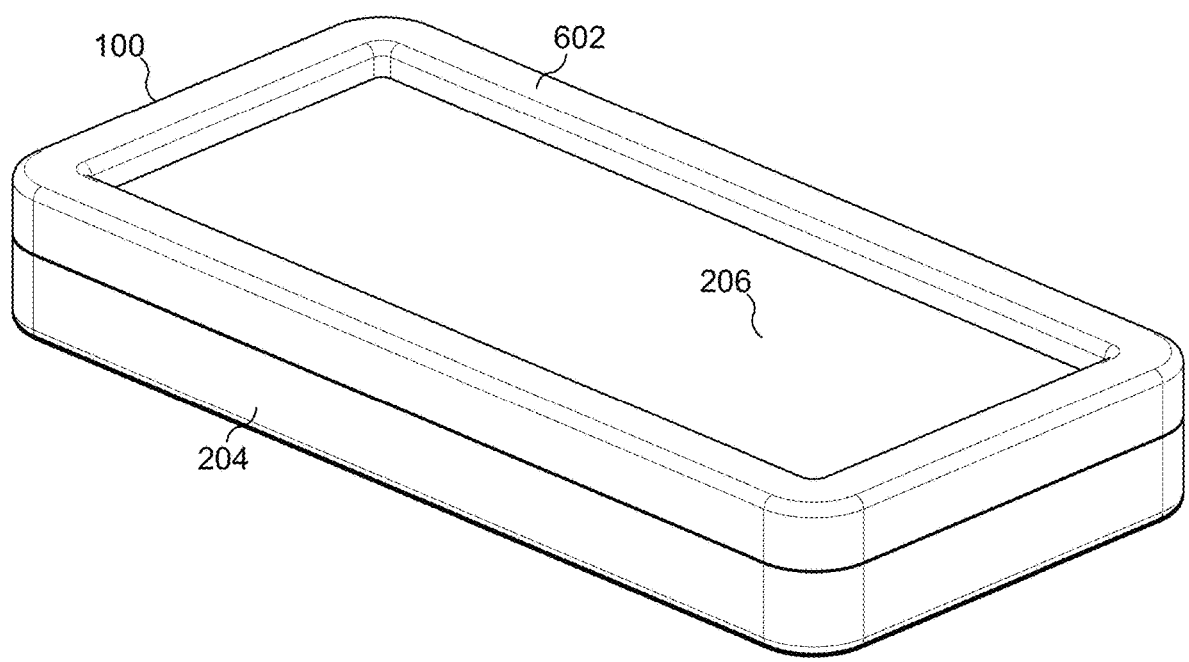
FIGS. 6A-6C illustrate an RF charging pad with a border-guiding contour used to align an electronic device in accordance with some embodiments.
Figure 6B:
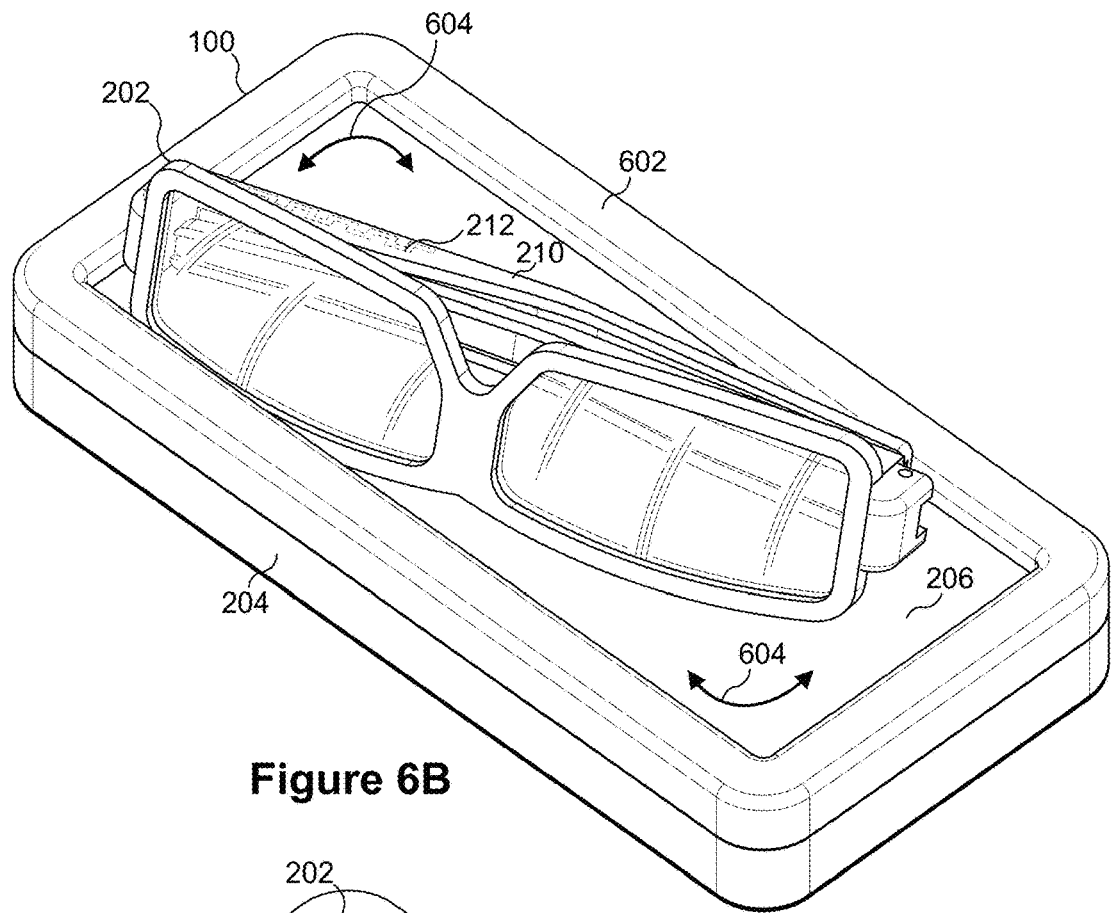
Figure 6C:
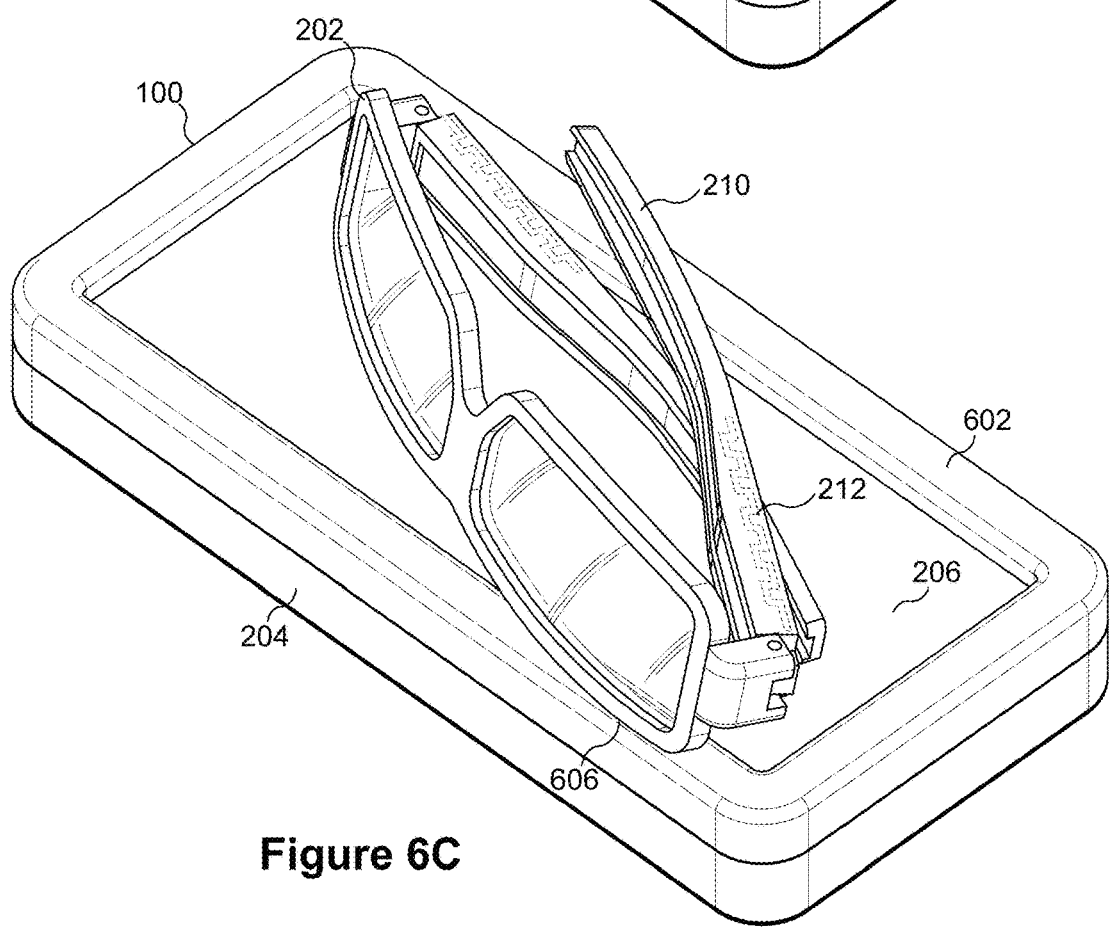

FIGS. 6A-6C show RF charging pad 100 with a border guiding contour in accordance with some embodiments. In some embodiments, the RF charging pad 100 includes a housing 204 with a surface 206. In some embodiments, the surface 206 has at least one guiding contour (e.g., border 602 as described below) that is configured to align a position of the electronic device 202 on the surface 206 of the housing 204. In some embodiments, the at least one guiding contour is a border 602. In some embodiments, the border 602 lines extends along a perimeter of the housing 204. For example, as shown in FIG. 6A, border 602 is on surface 206 and runs along the edges of the housing 204. Although FIG. 6A illustrates border 602 running along all of the edges of the housing 204, border 602 may run along less than all of the edges of the housing 204. Alternatively or additionally, in some embodiments, the at least one guiding contour includes a TX antenna element 102 (e.g., a TX antenna element 102 within border 602 or directly beneath border 602). In this way, RX antenna elements 212 of the one or more moveable arms of the electronic device 202 placed on and/or near the at least one guiding contour are able to couple a TX antenna element 102 included in the at least one guiding contour.

FIG. 6B illustrates the border contour for adjusting a position of electronic device on the RF charging pad in accordance with some embodiments. In some embodiments, the electronic device 202 is placed on the RF charging pad 100 at odd angles and/or different positions and the border contour 602 adjusts the position of electronic device 202 on the RF charging pad 100 to enable the transfer of energy and/or to improve the efficiency of the energy transferred. The electronic device 202 is not required to be perfectly centered and/or placed at set positions of the RF charging pad 100 to enable the transfer of energy. For example, as illustrated in FIG. 6B, border 602 is configured to allow the electronic device 202 to rotate and/or shift (e.g., rotation indicators 604), within the boundaries of border contour 602, while placed the RF charging pad 100. In some embodiments, border contour 602 is configured to keep the electronic device 202 on the surface 206 of the RF charging pad 100 (e.g., preventing electronic device 202 from falling off the of the RF charging pad 100, and also reminding a user to fold in both of the movable arms to ensure that the device 202 fits within the boundaries of border contour 602).

In some embodiments, border contour 602 is configured to enable electronic device 202 to move a predetermined amount while maintaining a desired coupling efficiency between the at least two TX antenna elements 102 of the RF charging pad 100 and the RX antenna element 212 of the one or more movable arms 210 of the electronic device 202. For example, border contour 602 allows for the electronic device 202 to rotate and/or shift on the RF charging pad 100 left or right at least 30 degrees (e.g., from one edge of the border 602 to an opposite edge of the border 602). Additionally and/or alternatively, in some embodiments, the electronic device 202 can be rotated 180 degrees from the position shown in FIG. 6B (e.g., electronic device 202 rotated 180 degrees to the left, right, and/or flipped by a 180 degrees). It should be noted that the electronic device 202 can be placed on and/or near the RF charging pad 100 in a number of distinct orientations, such as upright, upside down, the one or more movable arms folded and/or collapsed in different orientations and/or order, etc.

In some embodiments, the transmitter controller IC 160 is configured to selectively activate a TX antenna element of the two or more TX antenna elements 102 based on a determination that the TX antenna element satisfies matching criteria as discussed above in FIGS. 2 and 3.

FIG. 6C provides another depiction of placement of an electronic device on a charging pad with the border contour in accordance with some embodiments. As illustrated, even when the electronic device 202 is placed imperfectly on the charging pad (e.g., such that a portion of the device 202 is on top of a part of the border contour 602), the pad 100 can still provide wirelessly-delivered power to the device 202. As discussed above, the pad 100 can also be configured to notify the user of the improper placement of the device 202.

Figure 7A:
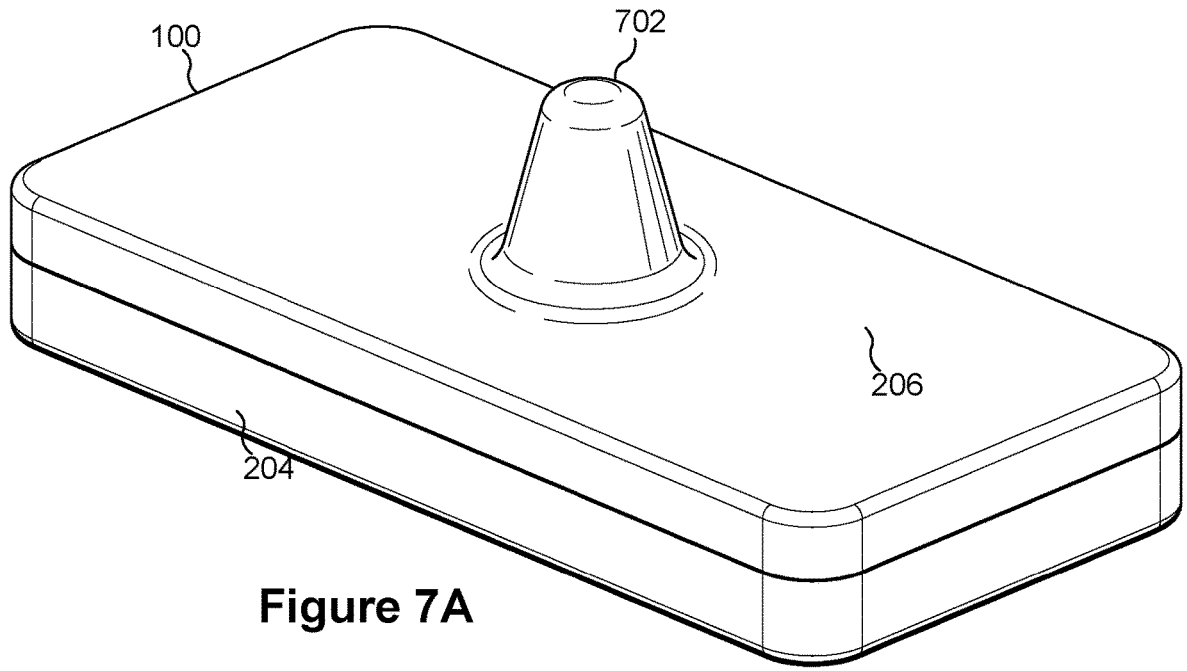
FIGS. 7A and 7B illustrate an RF charging pad with a rise-guiding contour used to align an electronic device in accordance with some embodiments.
Figure 7B:
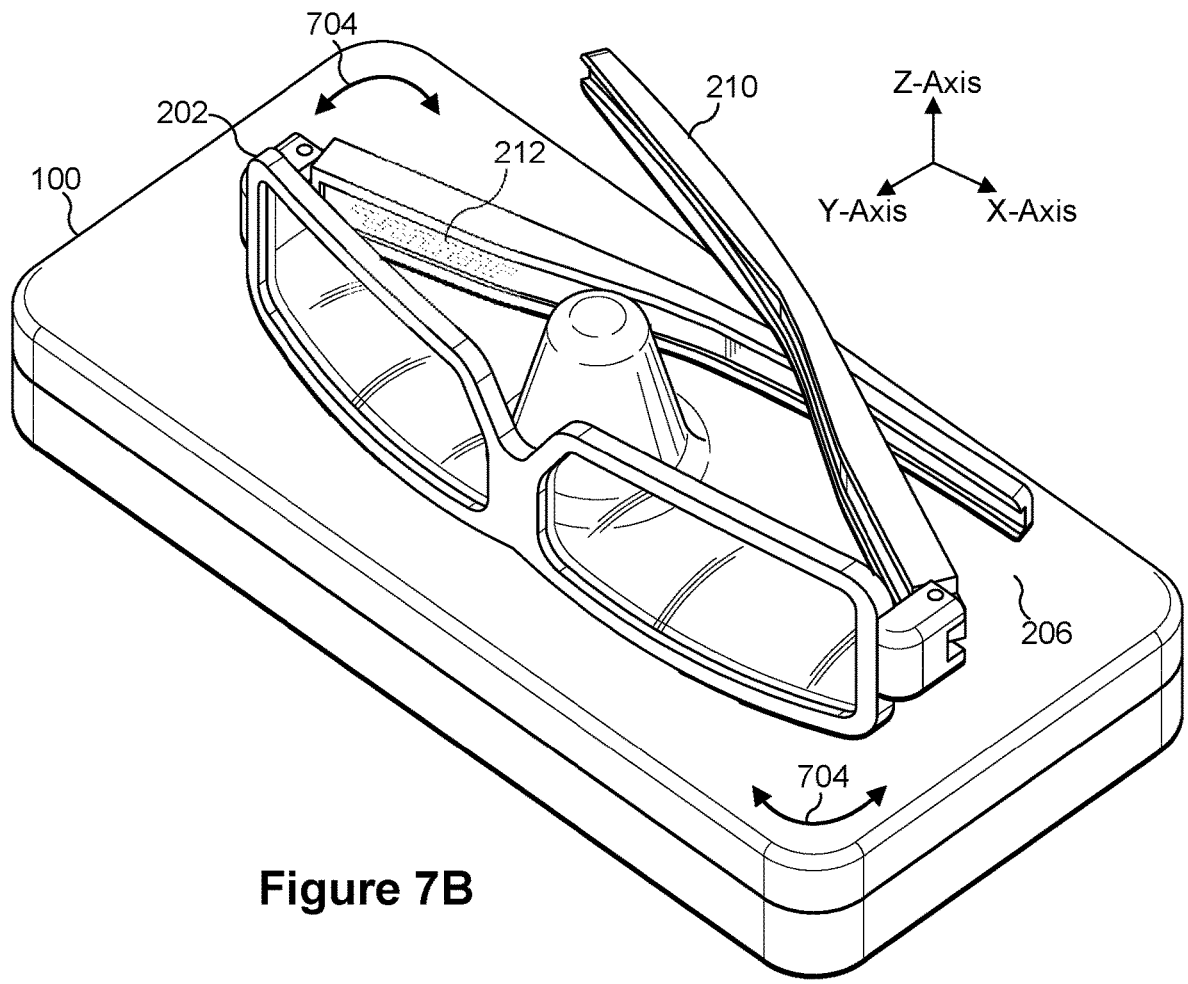

FIGS. 7A and 7B illustrate another embodiment of the at least one guiding contour of a surface of the RF charging pad. In some embodiments, the at least one guiding contour of the surface 206 is a rise 702. In some embodiments, the rise 702 is centrally located on the surface 206 and extends a predetermined height (e.g., 0.5 inches to 2.0 inches) from the surface 206 (e.g., along the shown z-axis). In some embodiments, the rise 702 extends along the longest length of the surface 206 (e.g., along the shown x-axis). In some embodiments, the rise 702 is configured to receive electronic device 202 and align a position of the electronic device 202 on the surface 206 of the housing 204. As mentioned above, the at least one guiding contour may include a TX antenna element 102. For example, a TX antenna element 102 may trace the exterior area and/or the circumference of the rise 702.

In some embodiments, the rise 702 enables the RF charging pad 100 to transfer energy and/or to improve the efficiency of the energy transferred to the electronic device 202. Rise 702 provides a visible and physical contour (e.g., rise 702) for placement of the electronic device 202 on surface 206. In this way, rise 702 provides a user with an indication of a secure position (e.g., unlikely to fall).

FIG. 7B illustrates the rise contour of an RF charging pad, around which an electronic device has been placed. As depicted, the rise 702 holds and/or keeps electronic device 202 on the surface 206 of the RF charging pad 100. In some embodiments, rise 702 allows for the electronic device 202 to rotate and/or shift (e.g., rotation arrows 704) on the RF charging pad 100 to the left or right a predetermined amount (e.g. 45 degrees or less in either direction). For example, in some embodiments, the rise 702 is large enough to prevent the electronic device 202 from having the one or more movable arms 210 floating and/or hanging off the surface 206 of charging pad 100. The rise 702 enables the electronic device 202 to move a predetermined amount while maintaining optimal connectivity between the at least two TX antenna elements 102 of the RF charging pad 100 and the RX antenna element 212 of the one or more movable arms 210 of the electronic device 202.

FIG. 7B also shows an embodiment of the electronic device 202 where a RX antenna element 212 has been placed on and/or in a side of movable arm 210 (e.g., RX antenna element 212 located in the interior of movable arm 210).

Figure 8A:
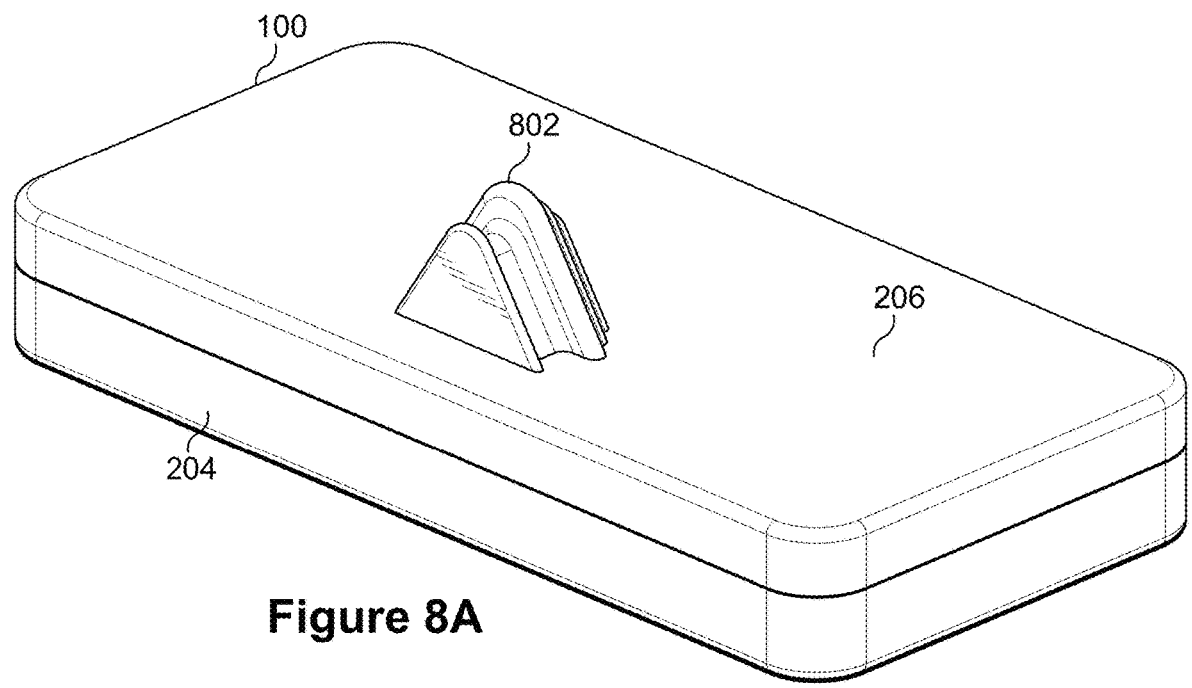
FIGS. 8A and 8B illustrate an RF charging pad with a mount-guiding contour used to align an electronic device in accordance with some embodiments.
Figure 8B:
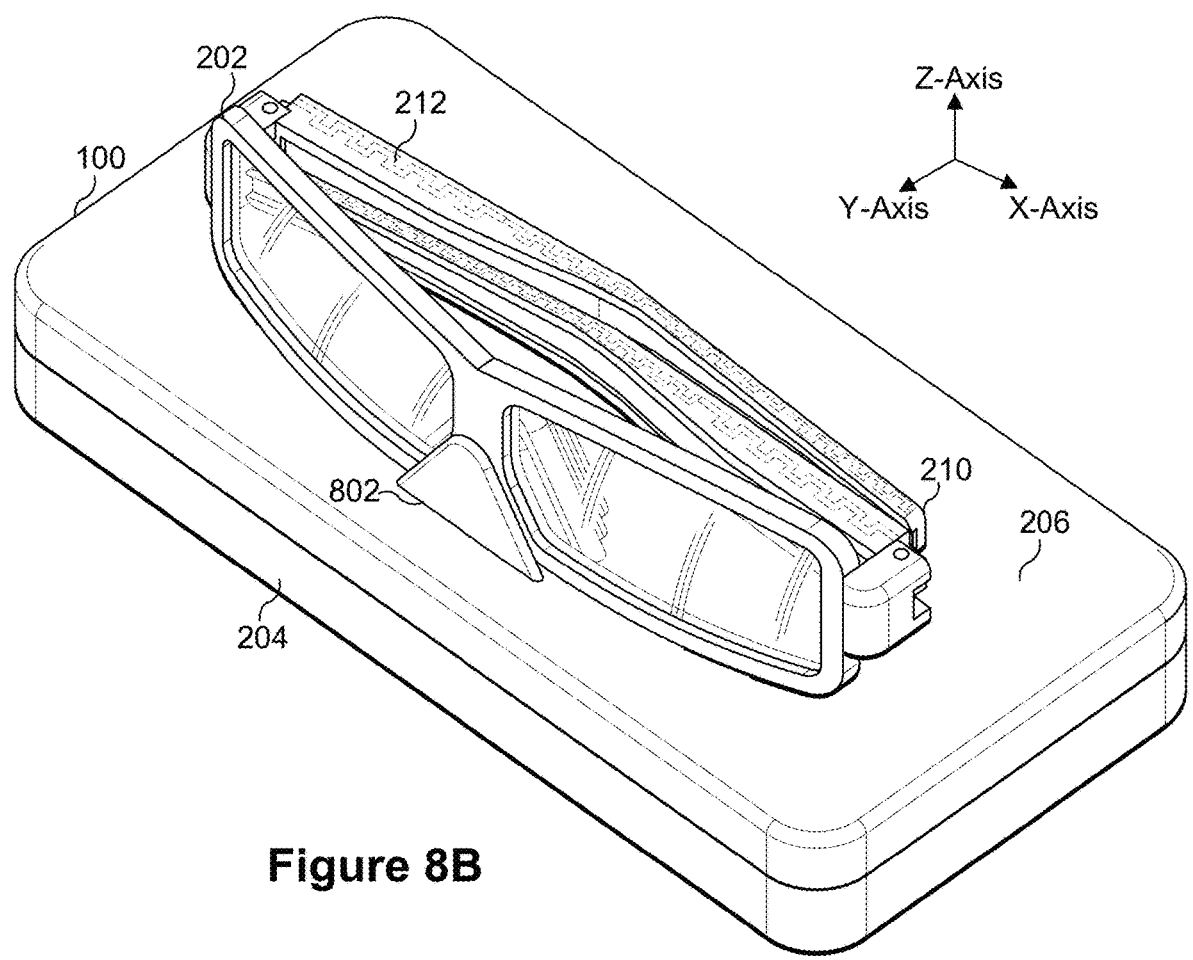

FIGS. 8A and 8B illustrates another embodiment of the at least one guiding contour on a surface of the RF charging pad. As shown, the at least one guiding contour of the surface 206 can be a mount and/or cradle 802. In some embodiments, mount 802 is configured to receive the electronic device 202 and position the electronic device 202 over the center of the surface 206 of the housing 204. In some embodiments, the mount 802 holds the electronic device 202 such that the one or more movable arms 210 of the electronic device 202 make contact with the surface 206 of the RF charging pad 100. Alternatively and/or additionally, in some embodiments, the mount 802 holds the electronic device over the surface 206 of the RF charging pad 100 without making contact with the surface 206. In some embodiments, the mount 802 is configured to position electronic device 202 and/or RX antenna element 212 in an optimal position with respect to the two or more TX antenna elements 102 (e.g., to produce a highest coupling efficiency). In this way, mount 802 enables the RF charging pad 100 to transfer energy and/or to improve the efficiency of the energy transferred to the electronic device 202 with minimal effort required by a user. Additionally, mount 802 provides a visible and/or physical contour to guide the placement of the electronic device 202 on surface 206. As mentioned above, the at least one guiding contour may include a TX antenna element 102. For example, a TX antenna element 102 may be included within the mount 802 or along the mount's 802 upper surface.

FIG. 8B illustrates the mount contour of a pad 100, when an electronic device has been placed on the mount. In some embodiments, the mount 802 holds and/or keeps electronic device 202 on the surface 206 of the RF charging pad 100. Mount 802 is configured to receive the electronic device 202 in different configurations. For example, in some embodiments, the electronic device 202 has the one or more movable arms 210 folded in different positions and/order (e.g., left arm folded before right arm and vice versa).

FIG. 8B further shows another embodiment of RX antenna element 212. In particular, FIG. 8B shows RX antenna element 212 extending the entire length of the one or more movable arms 210. Additionally, FIG. 8B shows the surface area of RX antenna element 212 varying as the RX antenna element 212 moves from wider portions of the one or more movable arms 210 to narrower portions.

Figure 9A:
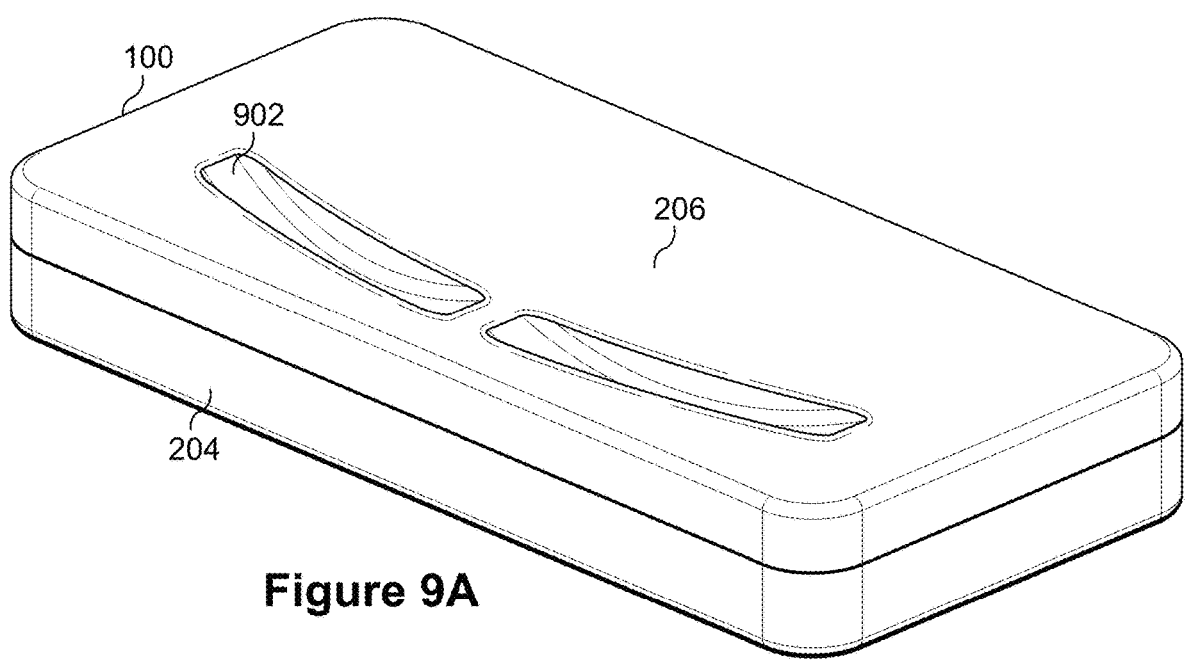
FIGS. 9A and 9B illustrate an RF charging pad with divots as guiding contours that align an electronic device in accordance with some embodiments.
Figure 9B:
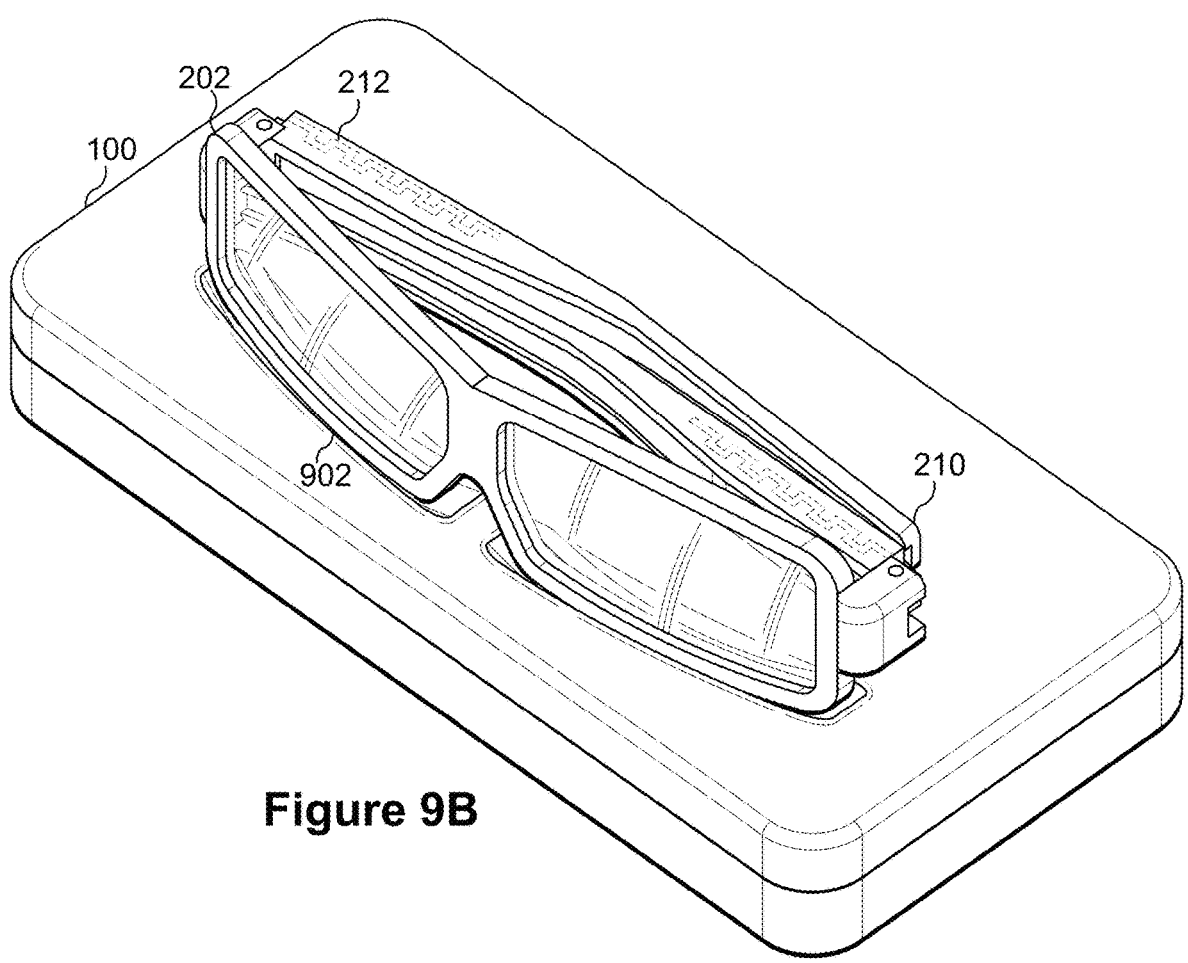

FIGS. 9A and 9B illustrates another embodiment of the at least one guiding contour of a surface of the RF charging pad, similar to the embodiment of the pad discussed above that has the guiding contour shown in FIG. 3. In some embodiments, the at least one guiding contour of the surface 206 is a set of impressions and/or divots 902. In some embodiments, the impressions 902 are configured to receive the electronic device 202 and position the electronic device 202 over the center of the surface 206 of the RF charging pad 100. In some embodiments, the impressions 902 hold the electronic device 202 such that the one or more movable arms 210 of the electronic device 202 are in contact with the surface 206 of the housing 204. In some embodiments, the impressions 902 are configured to position electronic device 202 in an optimal position with respect to the two or more TX antenna elements 102. In this way, the impressions 902 enable the RF charging pad 100 to transfer energy and/or to improve the efficiency of the energy transferred to the electronic device 202. Additionally, impressions 902 provide a visible and/or physical guide for placement of the electronic device 202 on surface 206 to reduce the effort needed by the user to charge the electronic device 202. As mentioned above, the at least one guiding contour may include a TX antenna element 102. For example, a TX antenna element 102 may be included within the impressions 902 or along the impressions' 902 upper surfaces.

FIG. 9B illustrates an embodiment of an impression and/or divot guiding contour of a surface of the RF charging pad with an electronic device placed in the impressions. FIG. 9B further shows the RX antenna element(s) 212 placed in and/or at the top of the one or more movable arms 210 (e) (e.g., on the z-axis).

Although FIGS. 6A-9B illustrate different guiding contours and adjustments to the position of electronic device 202 and/or RX antenna elements 212, any placement of the RX antenna element 212 on the RF charging pad 100 initiates the transmitter controller IC 160 to selectively activate a respective transmitting antenna and/or antennas that satisfies the matching criteria. In this way, RF charging pad 100 is able to transfer energy to charge a battery and/or directly power the electronic device 202 (via RX antenna elements 212) even if the electronic device 202 is not properly placed on the RF charging pad. In some embodiments, one or more of the RF charging pad 100 and the device 202 are configured to notify a user if the device 202 has not been properly placed on a surface of the pad 100 (e.g., the transmitter controller IC 160 can be configured to activate a visual alert in the form of one or more LEDs on a surface of the pad 100, the controller IC 160 can be configured to send an electronic message to the user, and/or the controller IC 160 can be configured to provide instructions to produce an audible alert to a user). In some embodiments, the transmitter controller IC 160 provides this notification if it is determined that the efficiency of energy wirelessly transferred to the device 202 falls below a predetermined threshold, such as a predetermined threshold of 40% coupling/transfer efficiency.

Furthermore, in addition to the various guiding contours discussed herein, some embodiments of the pad 100 can also include a visual outline of the device 202, which can provide another reminder to a user as to how to properly place the device 202 on the pad 100 (e.g., such a visual outline can include dashed lines representing the body and folded movable arm portions of the device 202).

Figure 10A:
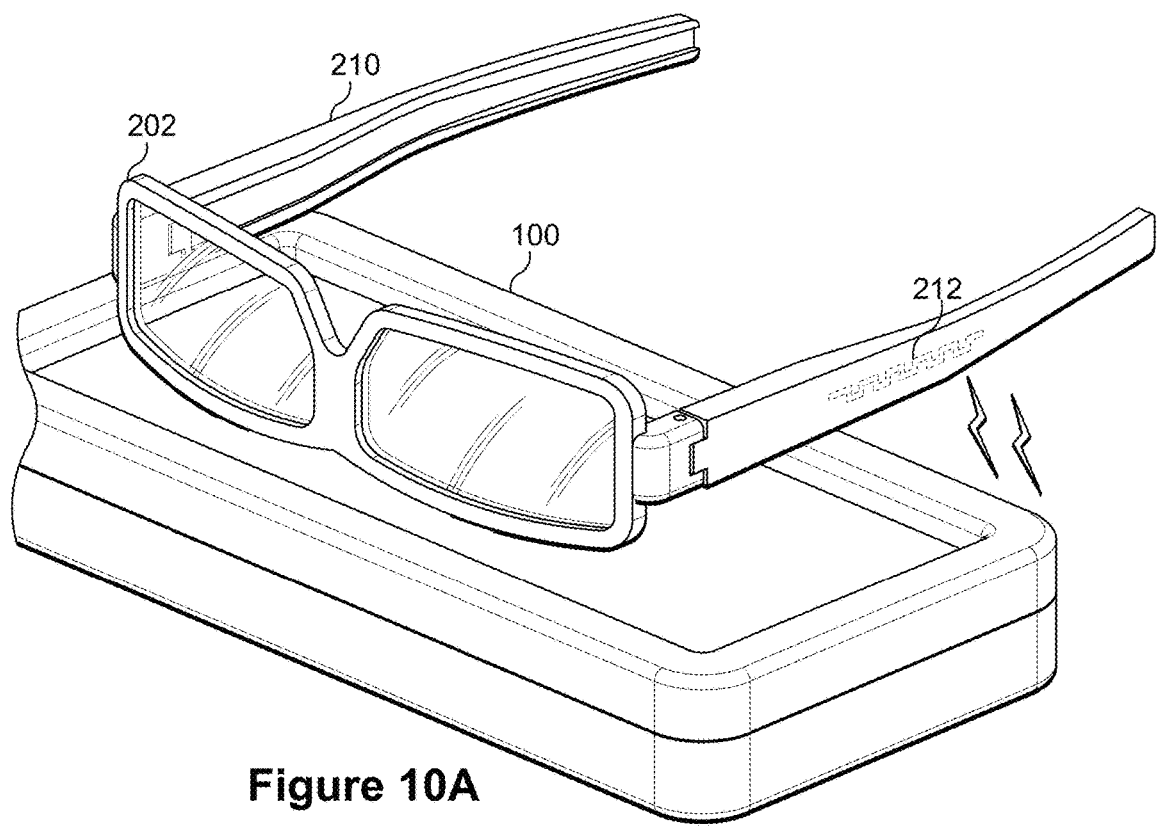
FIGS. 10A and 10B illustrate different configurations of a receiving antenna element on or in one or more movable arms of an electronic device in accordance with some embodiments.
Figure 10B:
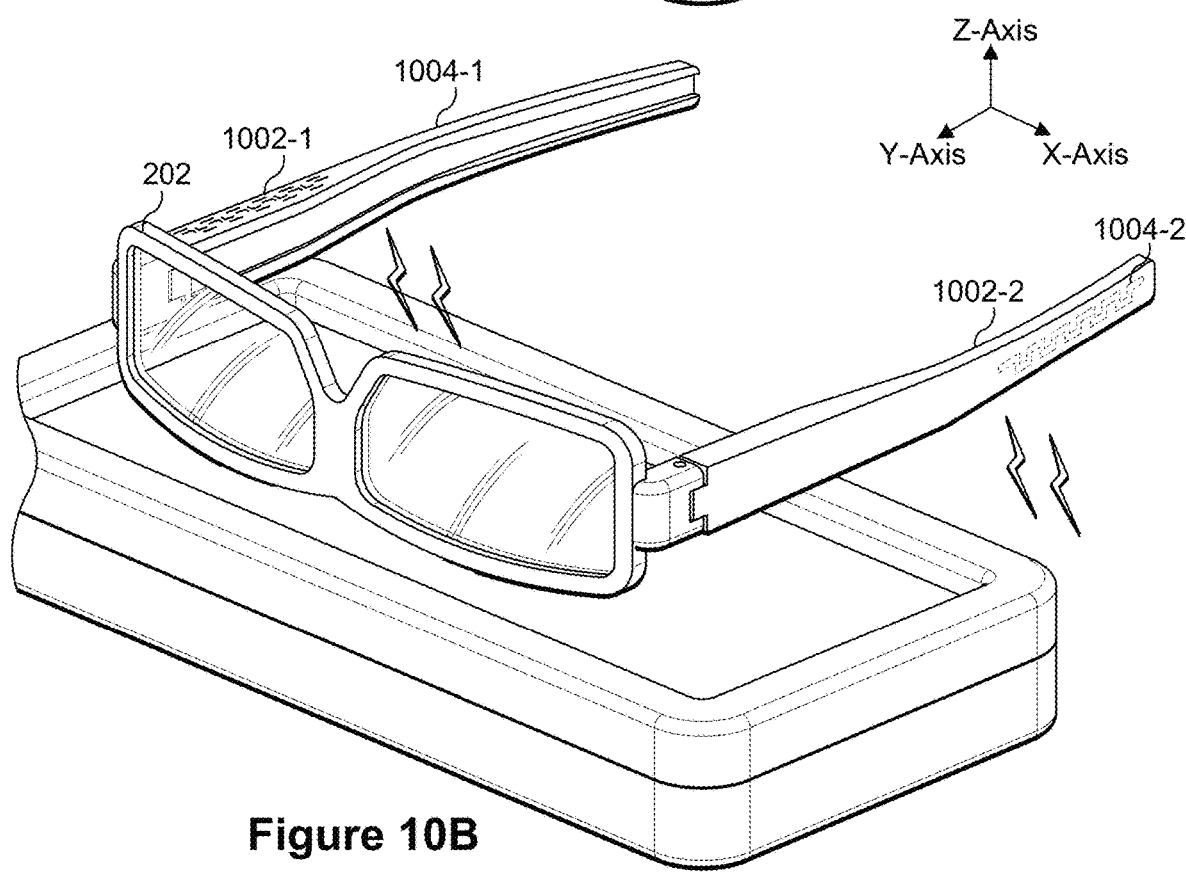

FIGS. 10A and 10B illustrate different configurations for the RX antenna element(s) on and/or in the one or more movable arms of electronic device in accordance with some embodiments. As described above, in some embodiments, a RX antenna element 212 is connected to the electronic device 202 via one or more movable arms 210. In some embodiments, a respective RX antenna element 212 is located in each movable arm of the one or more movable arms 210. In some embodiments the RX antenna element 212 couples to a respective transmitting element of the two or more TX antenna elements (e.g., TX antenna elements 102) to transfer energy from the RF charging pad 100 to the electronic device 202. The transferred energy is used to charge a battery and/or to directly power the electronic device 202.

As shown in FIG. 10A in some embodiments, a single RX antenna element 212 is internally and/or externally connected to electronic device 202 via the one or more movable arms 210-1. In some embodiments, the RX antenna element 212 is connected in different positions of the one or more movable arms 210 (e.g., as described above, RX antenna element 212 may be placed on either end of movable arm 210 and/or anywhere in between). In some embodiments, the RX antenna element 212 is positioned internally and/or externally on any side of the one or more movable arms 210 (e.g., along the x-axis, y-axis, and/or z-axis). For example, in some embodiments, the RX antenna element 212 is positioned internally and/or externally on at the left, right, top, and/or bottom of the one or more movable arms 210. In the embodiment shown in FIG. 10A, the RX antenna element 212 is positioned at the side and at the center of a movable arm 210. In some embodiments, the RX antenna element 212 extends the entire length of a movable arm of the one or more movable arms 210.

FIG. 10B illustrates another configuration of RX antenna elements within one or more movable arms of electronic device. In particular, as shown in the FIG. 10B embodiment, each movable arms 210 includes a respective RX antenna element 212 and the respective RX antenna elements 212 are placed at distinct locations in each movable arm 210. For instance, a first RX antenna element 1002-1 is located at the top of a first movable arm 1004-1 and a second RX antenna element 1002-2 is located at the side of a second movable arm 1004-2. As discussed above, the respective RX antenna elements 212 for each movable arm may be the same and/or distinct.

Figure 11:
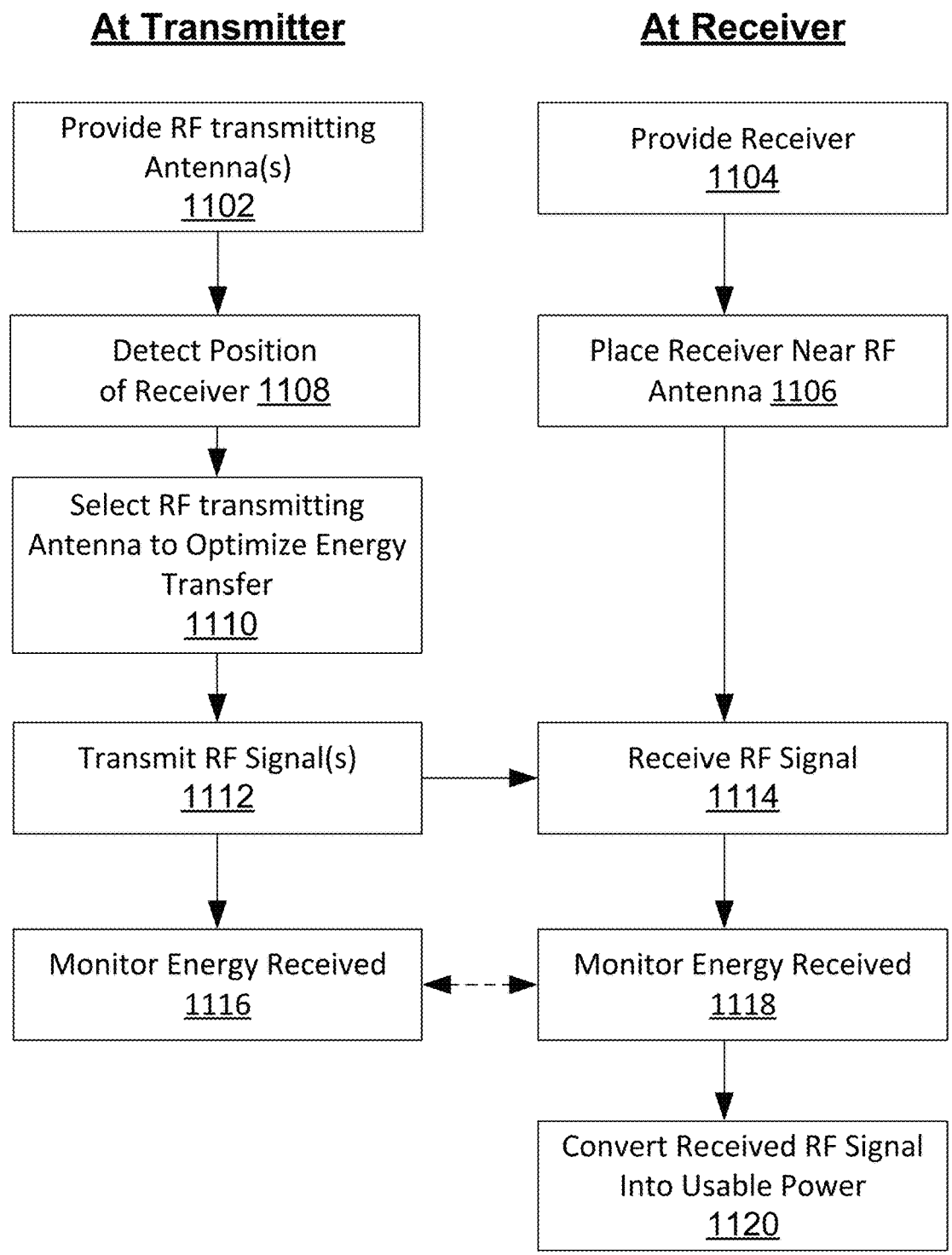
FIG. 11 is a flow chart of a method of charging an electronic device through radio frequency (RF) power transmission by using selected transmitting antennas of a RF charging pad in accordance with some embodiments.

FIG. 11, a flow chart of a method 1100 of charging an electronic device through radio frequency (RF) power transmission is provided. Initially, a transmitter (e.g., RF charging pad 100) is provided (1102) that includes at least two RF transmitting antennas (e.g., TX antenna elements 102, FIGS. 1-4B) for transmitting one or more RF signals or waves (e.g., an antenna designed to and capable of transmitting RF electromagnetic waves). In some embodiments, the at least two RF TX antenna elements 102 are arranged symmetrically and/or asymmetrically to one another or in a combination of thereof, thus forming an RF charging pad 100.

In some embodiments, a receiver (e.g., electronic device 202 including RX antenna element(s) 212, FIGS. 2, 3 and 5A-5B) is also provided (1104). The receiver includes one or more movable arms 210 that connect the RX antenna element(s) 212 to the electronic device 202. The RX antenna element(s) 212 are internally or externally included in the one or more movable arms 210. The RX antenna element(s) 212 are configured for receiving RF signals (1114). In some embodiments, the receiver uses the one or more RF signals to charge a battery and/or to directly power the electronic device 202. In use, the receiver is placed (1106) on and/or near the transmitter (e.g., TX antenna elements 102 of RF charger pad 100, FIGS. 1-4B). For example, the receiver may be placed on top of at least one RF transmitting antenna (e.g., TX antenna elements 102) or on top of a surface that is adjacent to at least one RF transmitting antenna, such as a surface of a RF charging pad 100.

The transmitter (via the transmitter controller IC 160) detects (1108) the location of the receiver placed on top of the at least one RF transmitting antenna (e.g., TX antenna elements 102) or on top of a surface that is adjacent to the at least one RF transmitting antenna (e.g., the surface of the charging pad 100). The transmitter (via the transmitter controller IC 160) selects (1110) a respective RF transmitting antenna (e.g., TX antenna elements 102) to transmit one or more RF signals. The respective TX antenna element is selected to optimize the energy transfer from the transmitter to the receiver (e.g., via RX antenna element 212). The respective RF transmitting antenna is selected based on matching criteria being satisfied by a detected receiver (e.g., RX antenna element 212). For example, as discussed above, the charging pad 100 (via the transmitter controller IC 160) may determine a location of the detected receiver based on the power received by the receiver and use the location to determine the respective RF transmitting antenna. More than one respective RF transmitting antenna may be selected at a time. In some embodiments, the transmitter (via the transmitter controller IC 160) selects a respective RF transmitting antenna based on information received from the receiver (e.g., RX antenna element 212 and/or electronic device 202). The information is provided to the transmitter via wireless communication components 110 (e.g., WIFI, BLUETOOTH, and/or other wireless data connections). For example, in some embodiments, the transmitter and the receiver exchange messages via wireless communication, and these messages may indicate location information that is used to select the respective RF transmitting antenna.

One or more RF signals are then transmitted (1112) via the selected respective RF transmitting antenna(s) and received (1114) by the receiver (e.g., RX antenna element 212). The system is then monitored (1116/1118) to determine the amount of energy that is transferred via the one or more RF signals from the selected respective RF transmitting antenna(s) to the electronic device 202 (e.g., via the RX antenna element 212). In some embodiments, this monitoring (1116) occurs at the transmitter, while in other embodiments the monitoring (1118) occurs at the electronic device 202 of the receiver which sends data back to the transmitter via wireless communication (e.g., WIFI, BLUETOOTH, and/or other wireless data connections). In some embodiments, the transmitter and the receiver exchange messages via wireless communication, and these messages may indicate energy transmitted and/or received. The received (1114) one or more RF signals are converted (1120) by the receiver into usable power. The usable power is used to charge a battery and/or directly power the receiver.

Figure 12A:
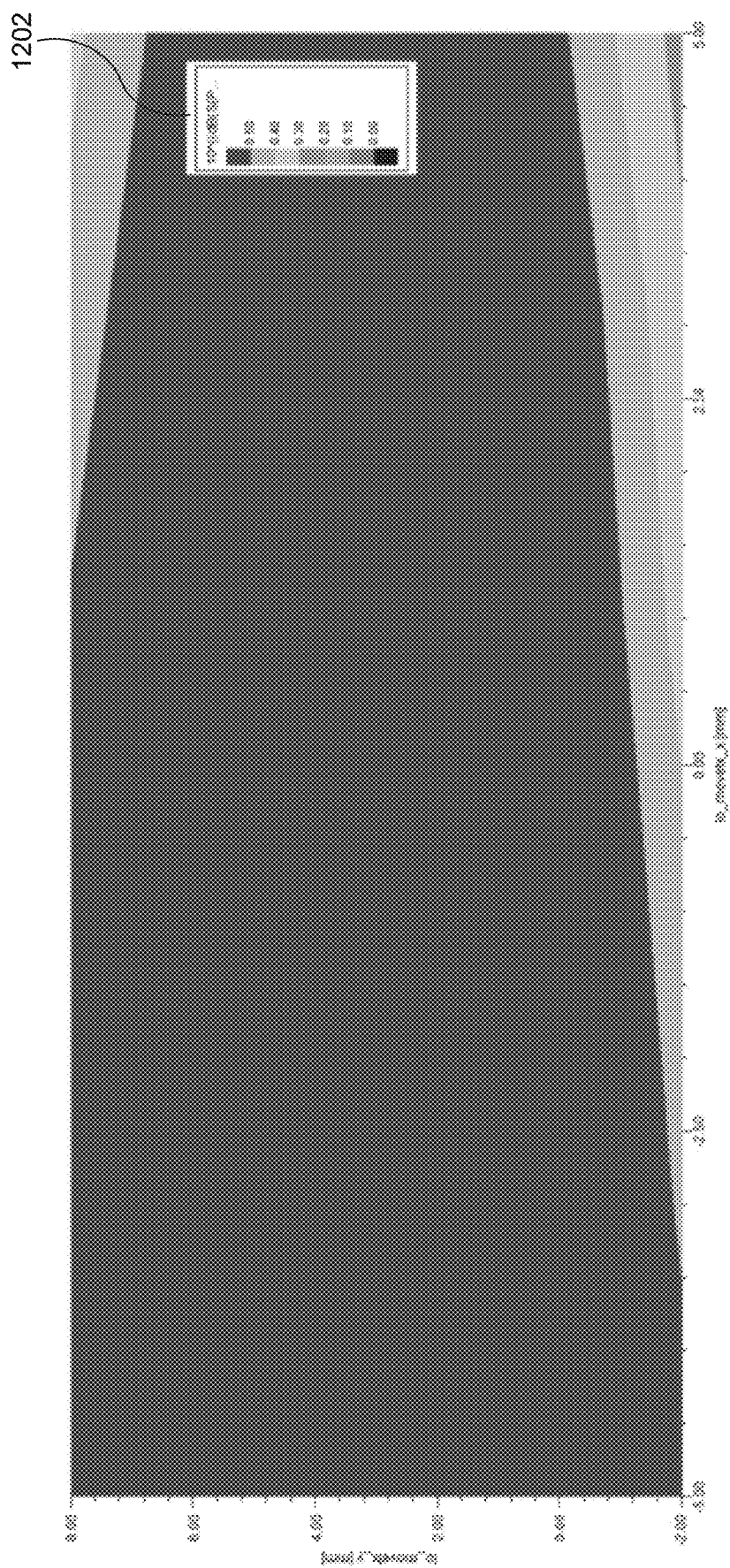
FIGS. 12A and 12B illustrate coupling efficiency on the surface of the charging when the movable arms of the electronic device are folded in different configurations in accordance with some embodiments.
Figure 12B:
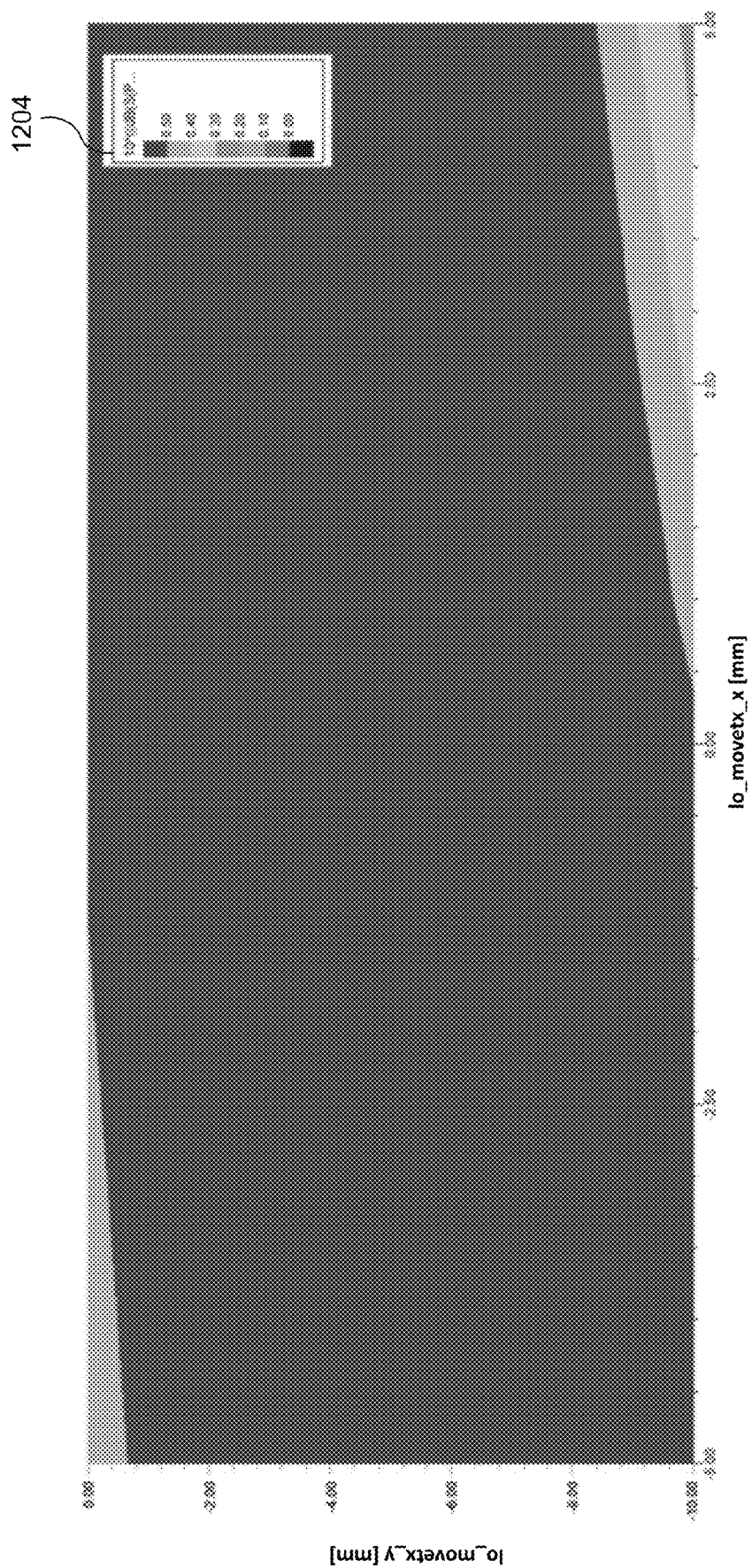

FIGS. 12A and 12B illustrate the coupling efficiency of the RF charging pad as measured at a RX antenna element in accordance with some embodiments. In particular, FIGS. 12A and 12B illustrate that the coupling efficiency is unaffected by the order in which a movable arm that includes a receiving element 212 is folded (e.g., in their respective fully folded positions as described above). FIG. 12A shows RF charging pad 100 the coupling efficiency for a particular electronic device 202 configuration overlaid on an x-y axis. In the embodiment shown in FIG. 12A, an electronic device 202 includes one or more movable arms 210 and a movable arm that includes a RX antenna element 212 (e.g., a single RX antenna element 212 in a movable arm of the one or more movable arms 210; see FIG. 10A). In FIG. 12A, the movable arm that includes the RX antenna element 212 is folded first. In this embodiment, the RX antenna element 212 is at 0 degrees from the center of electronic device 202 (e.g., planar). As illustrated in FIG. 12A, the coupling efficiency for the RX antenna element 212 folded first is at least 40-50% (e.g. see legend 1202). FIG. 12B illustrates the coupling efficiency of the RF charging pad with the electronic device in an different configuration. In particular, FIG. 12B shows, the movable arm that includes the RX antenna element 212 folded second. In this embodiment, the RX antenna element 212 is at 10 degrees from the center of electronic device 202 (e.g., 10 degrees from the plane). As illustrated in FIG. 12B, the coupling efficiency for the RX antenna element 212 folded second is at least 40-50% (e.g. see legend 1204). In comparing the coupling efficiency between FIGS. 12A-12B one of ordinary skill in the art would appreciate that there is minimal (e.g., either configuration remaining between a coupling efficiency of at least 40-50%) to no change in the coupling efficiency based on the order in which the one or more movable arms are folded and/or moved.

Figure 13:
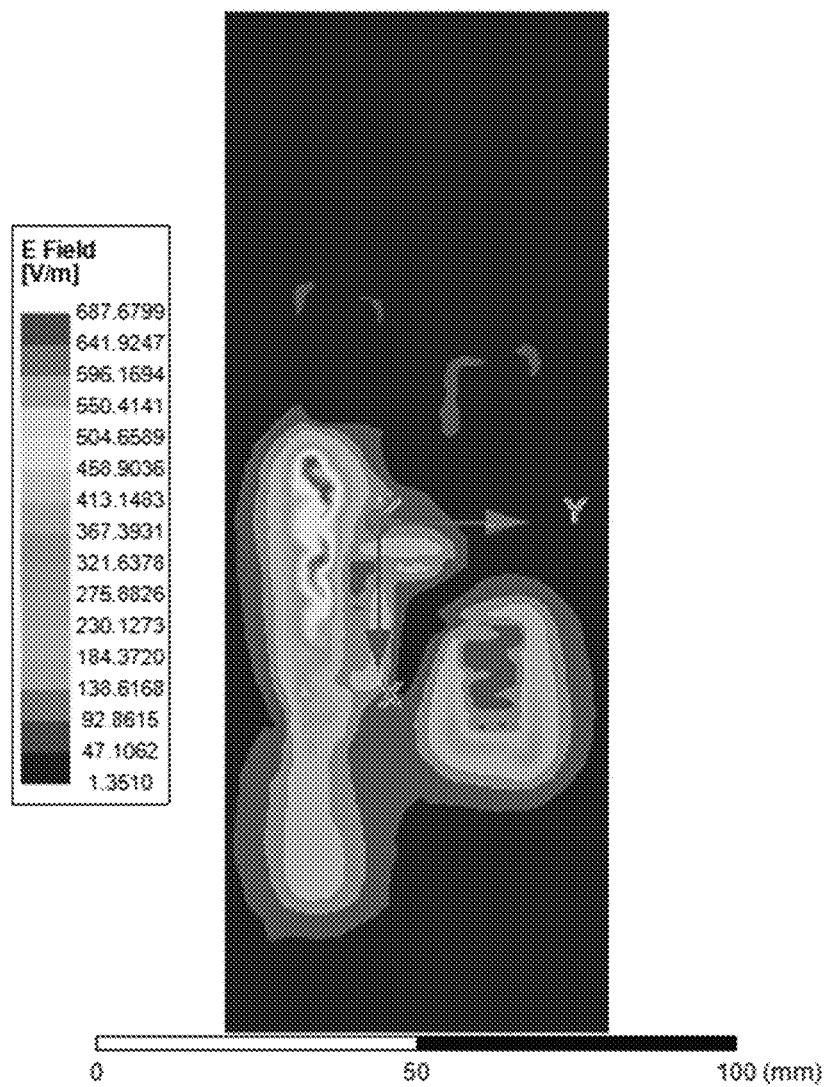
FIG. 13 illustrates an electromagnetic field plot of the electronic device on the RF charging pad in accordance with some embodiments.

FIG. 13 illustrates an electromagnetic field as measured at a single RX antenna element in a movable arm that is folded first (e.g., 0 degrees from the center or in the fully folded position as described above). In particular, FIG. 13 illustrates the transmission of energy to the location of the RX antenna element 212. The electromagnetic field is focused at the location of the RX antenna element 212 while portions of the RF charging pad 100 that do not include a RX antenna element 212 are not activated.

All of these examples are non-limiting and any number of combinations and multi-layered structures are possible using the example structures described above.

Further embodiments also include various subsets of the above embodiments including embodiments in FIGS. 1-13 combined or otherwise re-arranged in various embodiments, as one of skill in the art will readily appreciate while reading this disclosure.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

It will also be understood that, although the terms "first," "second," etc. may be used herein to describe various elements, these elements should not be limited by these terms. These terms are only used to distinguish one element from another. For example, a first region could be termed a second region, and, similarly, a second region could be termed a first region, without changing the meaning of the description, so long as all occurrences of the "first region" are renamed consistently and all occurrences of the "second region" are renamed consistently. The first region and the second region are both regions, but they are not the same region.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A system for charging an electronic device using wirelessly transmitted radio-frequency power (RF) waves, the system comprising:

the electronic device including one or more movable arms, wherein at least one movable arm includes a first receiving antenna element;

a charging pad, the charging pad including:

a housing having a surface, the housing including at least one guiding contour on the surface, the at least one guiding contour configured for aligning a position of the electronic device on the surface of the housing; and two or more transmitting antenna elements that are each configured to be selectively activated to transmit radio-frequency power waves to the first receiving antenna element of the electronic device; and a transmitter controller integrated circuit (IC) configured to selectively activate a respective transmitting antenna element of the two or more transmitting antenna elements based on a determination that the respective transmitting antenna element satisfies matching criteria, and activating the respective transmitting antenna element causes the respective transmitting antenna element to transmit the radio-frequency power waves to the first receiving antenna element of the electronic device, wherein the at least one guiding contour is configured to align the position of the electronic device on the surface of the housing such that the first receiving antenna element included in the at least one movable arm of the electronic device is a predetermined distance from the respective transmitting antenna element of the two or more transmitting antenna elements or has a predetermined coupling efficiency greater than 40%, the transmitter controller IC configured to determine that the matching criteria are satisfied upon detecting that the at least one movable arm of the electronic device is (i) the predetermined distance from the respective transmitting antenna element of the two or more transmitting antenna elements and (ii) couples with the respective transmitting antenna element of the two or more transmitting antenna elements at a predetermined coupling efficiency greater than 40%.

2. The system of claim 1, wherein the predetermined distance from the center of the surface of the housing is less than 5 mm and the predetermined coupling efficiency is at least 42%.

3. The system of claim 1, wherein the predetermined distance from the center of the surface of the housing is less than 2 mm and the predetermined coupling efficiency is at least 60%.

4. The system of claim 1, wherein the predetermined distance from the center of the surface of the housing is less than 0.1 mm and the predetermined coupling efficiency is at least 70%.

5. The system of claim 1, wherein the electronic device includes a second movable arm of the one or more movable arms and the second movable arm includes a second receiving antenna element.

6. The system of claim 5, wherein the first receiving antenna element includes a first meandering pattern of a conductive contact that has a first number of turns and the second receiving antenna element includes a second meandering pattern of a conductive contact that has a second number of turns.

7. The system of claim 6, wherein the first meandering pattern of the conductive contact and the second meandering pattern of the conductive contact are the same.

8. The system of claim 6, wherein the first meandering pattern of the conductive contact and the second meandering pattern of the conductive contact are distinct.

9. The system of claim 8, wherein the first meandering pattern of the conductive contact has a first number of turns and the second meandering pattern of the conductive contact has a second number of turns.

10. The system of claim 8, wherein the first meandering pattern of the conductive contact has a larger surface area than the second meandering pattern of the conductive contact.

11. The system of claim 5, wherein the first receiving antenna element and the second receiving antenna element are configured to receive the radio-frequency power waves transmitted from the respective transmitting antenna element.

12. The system of claim 5, wherein the transmitter controller integrated circuit is configured to selectively activate a different transmitting antenna element to provide power to the second receiving antenna based on a determination that the different transmitting antenna element satisfies matching criteria, and activating the different transmitting antenna element causes the different transmitting antenna element to transmit the radio-frequency power waves to the second receiving antenna element of the electronic device.

13. The system of claim 5, wherein the transmitter controller integrated circuit is configured to selectively activate the respective transmitting antenna to provide power to the second receiving antenna based on a determination that the respective transmitting antenna element satisfies matching criteria, and activating the respective transmitting antenna element causes the respective transmitting antenna element to transmit the radio-frequency power waves to the second receiving antenna element of the electronic device.

14. The system of claim 1, wherein the at least one movable arm is configured to fold into a first or second configuration, and when the at least one movable arm is folded in either the first or second configuration, the first receiving antenna element is coupled with the respective transmitting antenna element of the two or more transmitting antenna elements at the predetermined coupling efficiency.

15. The system of claim 12, wherein the respective and the different transmitting antenna elements are symmetrically-shaped radiators.

16. The system of claim 12, wherein the respective and the different transmitting antenna elements are asymmetrically-shaped radiators.

17. The system of claim 1, wherein the at least one guiding contour is a border, the border lining at least one edge of the housing.

18. A method of charging an electronic device using wirelessly transmitted radio-frequency power waves, the method comprising:
providing the electronic device, the electronic device including one or more movable arms, wherein at least one movable arm includes a first receiving antenna element;
providing a charging pad, the charging pad including:
a housing having a surface, the housing including at least one guiding contour on the surface, the at least one guiding contour configured for aligning a position of the electronic device on the surface of the housing; and
two or more transmitting antenna elements that are each selectively activated to transmit radio-frequency power waves to the first receiving antenna element of the electronic device; and
selectively activating a respective transmitting antenna element of the two or more transmitting antenna elements based on a determination that the respective transmitting antenna element satisfies matching criteria, and activating the respective transmitting antenna element causes the respective transmitting antenna element to transmit the radio-frequency power waves to the first receiving antenna element of the electronic device,
wherein the at least one guiding contour is configured to align the position of the electronic device on the surface of the housing such that the first receiving antenna element included in the at least one movable arm of the electronic device is a predetermined distance from the respective transmitting antenna element of the two or more transmitting antenna elements or has a predetermined coupling efficiency greater than 40%, the transmitter controller IC determining that the matching criteria are satisfied upon detecting that the at least one movable arm of the electronic device is (i) the predetermined distance from the respective transmitting antenna element of the two or more transmitting antenna elements and (ii) couples with the respective transmitting antenna element of the two or more transmitting antenna elements at a predetermined coupling efficiency greater than 40%.

19. The method of claim 18, wherein the predetermined distance from the center of the surface of the housing is less than 5 mm and the predetermined coupling efficiency is at least 42%.

20. The method of claim 18, wherein the predetermined distance from the center of the surface of the housing is less than 2 mm and the predetermined coupling efficiency is at least 60%.

21. The method of claim 18, wherein the predetermined distance from the center of the surface of the housing is less than 0.1 mm and the predetermined coupling efficiency is at least 70%.

22. The method of claim 18, wherein the electronic device includes a second movable arm of the one or more movable arms and the second movable arm includes a second receiving antenna element.

23. The method of claim 22, wherein the first receiving antenna element includes a first meandering pattern of a conductive contact that has a first number of turns and the second receiving antenna element includes a second meandering pattern of a conductive contact that has a second number of turns.

24. The method of claim 23, wherein the first meandering pattern of the conductive contact and the second meandering pattern of the conductive contact are the same.

25. The method of claim 23, wherein the first meandering pattern of the conductive contact and the second meandering pattern of the conductive contact are distinct.

26. The method of claim 25, wherein the first meandering pattern of the conductive contact has a first number of turns and the second meandering pattern of the conductive contact has a second number of turns.

27. The method of claim 25, wherein the first meandering pattern of the conductive contact has a larger surface area than the second meandering pattern of the conductive contact.

28. The method of claim 22, wherein the first receiving antenna element and the second receiving antenna element are configured to receive the radio-frequency power waves transmitted from the respective transmitting antenna element.

29. The method of claim 22, further comprising, selectively activating a different transmitting antenna element to provide power to the second receiving antenna based on a determination that the different transmitting antenna element satisfies matching criteria, and activating the different transmitting antenna element causes the different transmitting antenna element to transmit the radio-frequency power waves to the second receiving antenna element of the electronic device.

30. The method of claim 22, further comprising, selectively activating the respective transmitting antenna to provide power to the second receiving antenna based on a determination that the respective transmitting antenna element satisfies matching criteria, and activating the respective transmitting antenna element causes the respective transmitting antenna element to transmit the radio-frequency power waves to the second receiving antenna element of the electronic device.

31. The method of claim 18, wherein the at least one movable arm folds into a first or second configuration, and when the at least one movable arm is folded in either the first or second configuration, the first receiving antenna element is coupled with the respective transmitting antenna element of the two or more transmitting antenna elements at the predetermined coupling efficiency.

32. The method of claim 29, wherein the respective and the different transmitting antenna elements are symmetrically-shaped radiators.

33. The method of claim 29, wherein the respective and the different transmitting antenna elements are asymmetrically-shaped radiators.

34. The method of claim 18, wherein the at least one guiding contour is a border, the border lining at least one edge of the housing.

35. A non-transitory computer-readable storage medium comprising executable instructions that, when executed by one or more processors that are coupled with a radio frequency (RF) charging pad that includes two or more transmitting antenna elements, cause the one or more processors to:
   at the RF charging pad, wherein the RF charging pad includes a housing having a surface, the housing including at least one guiding contour on the surface, the at least one guiding contour configured for aligning a position of an electronic device on the surface of the housing; and (ii) two or more transmitting antenna elements that are each selectively activated to transmit radio-frequency power waves to a first receiving antenna element of the electronic device;
   identify the position the electronic device on the surface of the housing, the electronic device including one or more movable arms, wherein at least one movable arm includes the first receiving antenna element; and
   selectively activate a respective transmitting antenna element of two or more transmitting antenna elements of the RF charging pad based on a determination that the respective transmitting antenna element satisfies matching criteria, and activating the respective transmitting antenna element causes the respective transmitting antenna element to transmit the radio-frequency power waves to the first receiving antenna element of the electronic device,
   wherein the at least one guiding contour aligns the position of the electronic device on the surface of the housing such that the first receiving antenna element included in the at least one movable arm of the electronic device is a predetermined distance from the respective transmitting antenna element of the two or more transmitting antenna elements or has a predetermined coupling efficiency greater than 40%, the transmitter controller IC is configured to determine that the matching criteria are satisfied upon detecting that the at least one movable arm of the electronic device is (i) the predetermined distance from the respective transmitting antenna element of the two or more transmitting antenna elements and (ii) couples with the respective transmitting antenna element of the two or more transmitting antenna elements at a predetermined coupling efficiency greater than 40%.

36. The non-transitory computer-readable storage medium of claim 35, wherein the predetermined distance from the center of the surface of the housing is less than 5 mm and the predetermined coupling efficiency is at least 42%.

37. The non-transitory computer-readable storage medium of claim 35, wherein the predetermined distance from the center of the surface of the housing is less than 2 mm and the predetermined coupling efficiency is at least 60%.

38. The non-transitory computer-readable storage medium of claim 35, wherein the predetermined distance from the center of the surface of the housing is less than 0.1 mm and the predetermined coupling efficiency is at least 70%.

39. The non-transitory computer-readable storage medium of claim 35, wherein the electronic device includes a second movable arm of the one or more movable arms and the second movable arm includes a second receiving antenna element.

40. The non-transitory computer-readable storage medium of claim 39, wherein the first receiving antenna element includes a first meandering pattern of a conductive contact that has a first number of turns and the second receiving antenna element includes a second meandering pattern of a conductive contact that has a second number of turns.

41. The non-transitory computer-readable storage medium of claim 40, wherein the first meandering pattern of the conductive contact and the second meandering pattern of the conductive contact are the same.

42. The non-transitory computer-readable storage medium of claim 40, wherein the first meandering pattern of the conductive contact and the second meandering pattern of the conductive contact are distinct.

43. The non-transitory computer-readable storage medium of claim 42, wherein the first meandering pattern of the conductive contact has a first number of turns and the second meandering pattern of the conductive contact has a second number of turns.

44. The non-transitory computer-readable storage medium of claim 42, wherein the first meandering pattern of the conductive contact has a larger surface area than the second meandering pattern of the conductive contact.

45. The non-transitory computer-readable storage medium of claim 40, wherein the first receiving antenna element and the second receiving antenna element are configured to receive the radio-frequency power waves transmitted from the respective transmitting antenna element.

46. The non-transitory computer-readable storage medium of claim 40, wherein the transmitter controller integrated circuit is configured to selectively activate a different transmitting antenna element to provide power to the second receiving antenna based on a determination that the different transmitting antenna element satisfies matching criteria, and activating the different transmitting antenna element causes the different transmitting antenna element to transmit the radio-frequency power waves to the second receiving antenna element of the electronic device.

47. The non-transitory computer-readable storage medium of claim 40, wherein the transmitter controller integrated circuit is configured to selectively activate the respective transmitting antenna to provide power to the second receiving antenna based on a determination that the respective transmitting antenna element satisfies matching criteria, and activating the respective transmitting antenna element causes the respective transmitting antenna element to transmit the radio-frequency power waves to the second receiving antenna element of the electronic device.

48. The non-transitory computer-readable storage medium of claim 35, wherein the at least one movable arm is configured to fold into a first or second configuration, and when the at least one movable arm is folded in either the first or second configuration, the first receiving antenna element is coupled with the respective transmitting antenna element of the two or more transmitting antenna elements at the predetermined coupling efficiency.

49. The non-transitory computer-readable storage medium of claim 46, wherein the respective and the different transmitting antenna elements are symmetrically-shaped radiators.

50. The non-transitory computer-readable storage medium of claim 46, wherein the respective and the different transmitting antenna elements are asymmetrically-shaped radiators.

51. The non-transitory computer-readable storage medium of claim 35, wherein the at least one guiding contour is a border, the border lining at least one edge of the housing.

* * * * *

UNITED STATES PATENT AND TRADEMARK OFFICE
CERTIFICATE OF CORRECTION

PATENT NO. : 11,355,966 B2
APPLICATION NO. : 17/120003
DATED : June 7, 2022
INVENTOR(S) : Muryanto et al.

It is certified that error appears in the above-identified patent and that said Letters Patent is hereby corrected as shown below:

In the Claims

Claim 35, Column 27, Line 8, delete "includes a housing having" and insert --includes (i) a housing having--.

Signed and Sealed this
Sixteenth Day of August, 2022

Katherine Kelly Vidal
*Director of the United States Patent and Trademark Office*